United States Patent
Fujimoto

(10) Patent No.: US 8,112,123 B2
(45) Date of Patent: Feb. 7, 2012

(54) INFORMATION PROCESSING APPARATUS

(75) Inventor: Yuji Fujimoto, Hino (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 925 days.

(21) Appl. No.: 11/770,550

(22) Filed: Jun. 28, 2007

(65) Prior Publication Data

US 2008/0139250 A1    Jun. 12, 2008

(30) Foreign Application Priority Data

Dec. 8, 2006  (JP) ................................ P2006-332385

(51) Int. Cl.
*H04B 1/38* (2006.01)
*H04W 24/00* (2009.01)

(52) U.S. Cl. ....................................... 455/566; 455/457

(58) Field of Classification Search .................. 455/566, 455/567, 457, 575.1–575.4, 412.1–414.3, 455/415

See application file for complete search history.

(56) References Cited

U.S. PATENT DOCUMENTS

| | | | |
|---|---|---|---|
| 6,965,786 B2 * | 11/2005 | Qu et al. | 455/566 |
| 7,802,206 B1 * | 9/2010 | Davis et al. | 715/864 |
| 2006/0121938 A1 * | 6/2006 | Hawkins et al. | 455/556.1 |
| 2007/0188471 A1 * | 8/2007 | Mak-Fan et al. | 345/167 |

FOREIGN PATENT DOCUMENTS

| | | |
|---|---|---|
| JP | 8-298541 A | 11/1996 |
| JP | 2000-194473 A | 7/2000 |
| JP | 2005-072945 A | 3/2005 |
| JP | 2006-279664 A | 10/2006 |

OTHER PUBLICATIONS

Japanese Office Action dated Mar. 10, 2009 (2 pp.), and English translation thereof (3 pp.), issued in counterpart Japanese Application U.S. Appl. No. 2006-332385.

* cited by examiner

*Primary Examiner* — Michael Faragalla
(74) *Attorney, Agent, or Firm* — Maschoff Gilmore & Israelsen

(57) ABSTRACT

According to an aspect of the invention, there is provided an information processing apparatus including: a first display unit configured to display on a standby screen a first indicative information indicating a first unconfirmed information having higher priority than a short-cut function of activating a predetermined function associated beforehand by being selected on the standby screen; a second display unit configured to display on the standby screen a second indicative information indicating the short-cut function; and a third display unit configured to display on the standby screen a third indicative information indicating a second unconfirmed information having lower priority than the short-cut function.

12 Claims, 31 Drawing Sheets

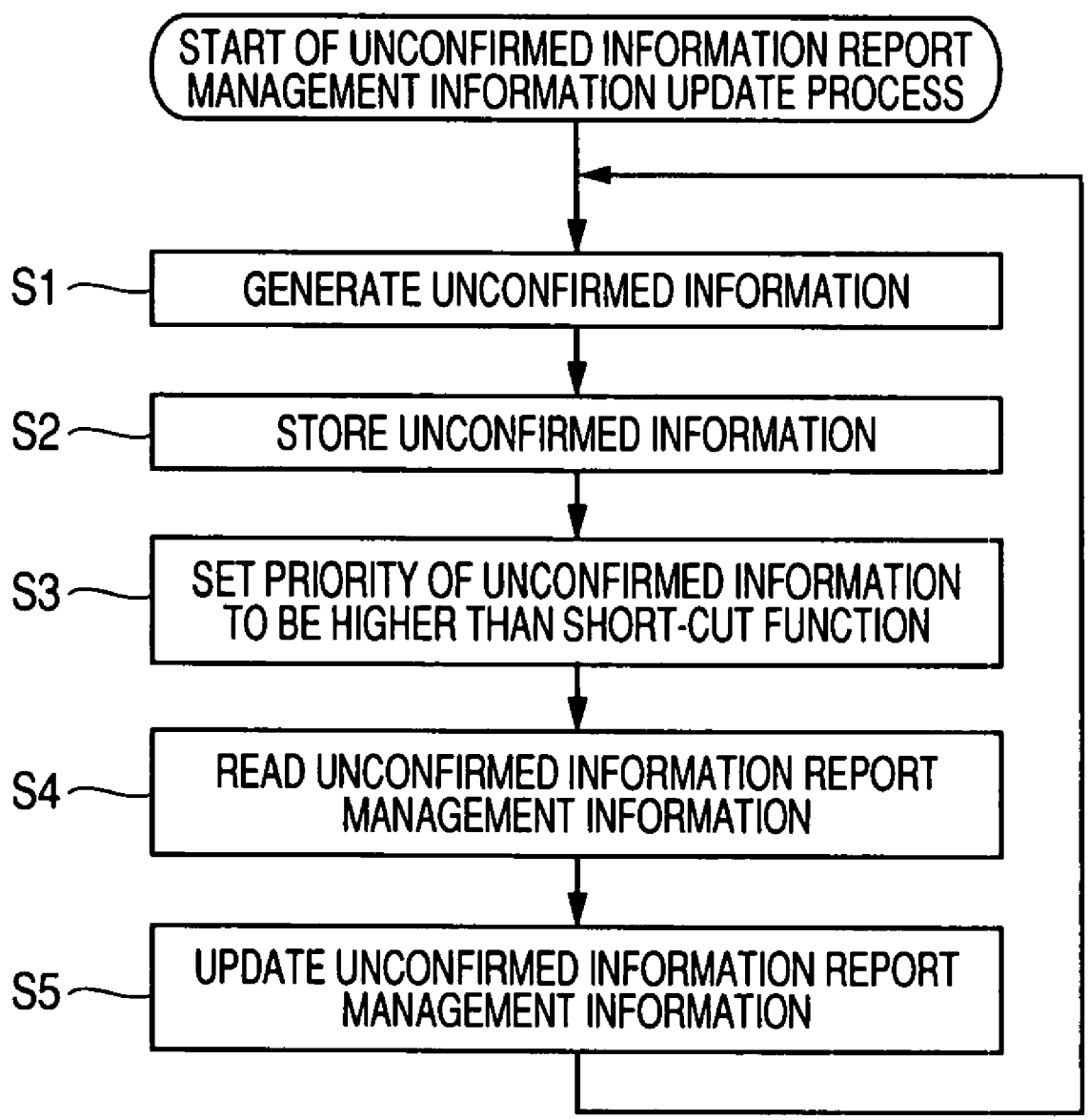

FIG. 5A

UNCONFIRMED INFORMATION REPORT MANAGEMENT INFORMATION

| KIND OF UNCONFIRMED INFORMATION | NUMBER OF CASES HAVING HIGHER PRIORITY THAN SHORT-CUT FUNCTION | NUMBER OF CASES HAVING LOWER PRIORITY THAN SHORT-CUT FUNCTION |
|---|---|---|
| MISSED INCOMING CALL | 9 | 0 |
| NEW INCOMING MAIL | 5 | 0 |
| MESSAGE | 3 | 0 |
| ⋮ | ⋮ | 0 |

FIG. 5B

UNCONFIRMED INFORMATION REPORT MANAGEMENT INFORMATION

| KIND OF UNCONFIRMED INFORMATION | NUMBER OF CASES HAVING HIGHER PRIORITY THAN SHORT-CUT FUNCTION | NUMBER OF CASES HAVING LOWER PRIORITY THAN SHORT-CUT FUNCTION |
|---|---|---|
| MISSED INCOMING CALL | 10 | 0 |
| NEW INCOMING MAIL | 5 | 0 |
| MESSAGE | 3 | 0 |
| ⋮ | ⋮ | 0 |

FIG. 5C

UNCONFIRMED INFORMATION REPORT MANAGEMENT INFORMATION

| KIND OF UNCONFIRMED INFORMATION | NUMBER OF CASES HAVING HIGHER PRIORITY THAN SHORT-CUT FUNCTION | NUMBER OF CASES HAVING LOWER PRIORITY THAN SHORT-CUT FUNCTION |
|---|---|---|
| MISSED INCOMING CALL | 0 | 10 |
| NEW INCOMING MAIL | 0 | 5 |
| MESSAGE | 0 | 3 |
| ⋮ | 0 | ⋮ |

FIG. 5D

UNCONFIRMED INFORMATION REPORT MANAGEMENT INFORMATION

| KIND OF UNCONFIRMED INFORMATION | NUMBER OF CASES HAVING HIGHER PRIORITY THAN SHORT-CUT FUNCTION | NUMBER OF CASES HAVING LOWER PRIORITY THAN SHORT-CUT FUNCTION |
|---|---|---|
| MISSED INCOMING CALL | 5 | 5 |
| NEW INCOMING MAIL | 0 | 5 |
| MESSAGE | 2 | 1 |
| ⋮ | ⋮ | 0 |

FIG. 5E

UNCONFIRMED INFORMATION REPORT MANAGEMENT INFORMATION

| KIND OF UNCONFIRMED INFORMATION | NUMBER OF CASES HAVING HIGHER PRIORITY THAN SHORT-CUT FUNCTION | NUMBER OF CASES HAVING LOWER PRIORITY THAN SHORT-CUT FUNCTION |
|---|---|---|
| MISSED INCOMING CALL | 2 | 0 |
| NEW INCOMING MAIL | 0 | 2 |
| MESSAGE | 0 | 0 |
| ⋮ | ⋮ | ⋮ |

FIG. 5F

UNCONFIRMED INFORMATION REPORT MANAGEMENT INFORMATION

| KIND OF UNCONFIRMED INFORMATION | NUMBER OF CASES HAVING HIGHER PRIORITY THAN SHORT-CUT FUNCTION | NUMBER OF CASES HAVING LOWER PRIORITY THAN SHORT-CUT FUNCTION |
|---|---|---|
| MISSED INCOMING CALL | 0 | 2 |
| NEW INCOMING MAIL | 0 | 2 |
| MESSAGE | 0 | 0 |
| ⋮ | ⋮ | ⋮ |

FIG. 5G

UNCONFIRMED INFORMATION REPORT MANAGEMENT INFORMATION

| KIND OF UNCONFIRMED INFORMATION | NUMBER OF CASES HAVING HIGHER PRIORITY THAN SHORT-CUT FUNCTION | NUMBER OF CASES HAVING LOWER PRIORITY THAN SHORT-CUT FUNCTION |
|---|---|---|
| MISSED INCOMING CALL | 1 | 0 |
| NEW INCOMING MAIL | 0 | 2 |
| MESSAGE | 0 | 0 |
| ⋮ | ⋮ | ⋮ |

FIG. 5H

UNCONFIRMED INFORMATION REPORT MANAGEMENT INFORMATION

| KIND OF UNCONFIRMED INFORMATION | NUMBER OF CASES HAVING HIGHER PRIORITY THAN SHORT-CUT FUNCTION | NUMBER OF CASES HAVING LOWER PRIORITY THAN SHORT-CUT FUNCTION |
|---|---|---|
| MISSED INCOMING CALL | 10 | 0 |
| NEW INCOMING MAIL | 5 | 2 |
| MESSAGE | 3 | 0 |
| ⋮ | ⋮ | ⋮ |

FIG. 5I

UNCONFIRMED INFORMATION REPORT MANAGEMENT INFORMATION

| KIND OF UNCONFIRMED INFORMATION | NUMBER OF CASES HAVING HIGHER PRIORITY THAN SHORT-CUT FUNCTION | NUMBER OF CASES HAVING LOWER PRIORITY THAN SHORT-CUT FUNCTION |
|---|---|---|
| MISSED INCOMING CALL | 10 | 0 |
| NEW INCOMING MAIL | 3 | 2 |
| MESSAGE | 3 | 0 |
| ⋮ | ⋮ | ⋮ |

FIG. 5J

UNCONFIRMED INFORMATION REPORT MANAGEMENT INFORMATION

| KIND OF UNCONFIRMED INFORMATION | NUMBER OF CASES HAVING HIGHER PRIORITY THAN SHORT-CUT FUNCTION | NUMBER OF CASES HAVING LOWER PRIORITY THAN SHORT-CUT FUNCTION |
|---|---|---|
| MISSED INCOMING CALL | 7 | 0 |
| NEW INCOMING MAIL | 5 | 2 |
| MESSAGE | 3 | 0 |
| ⋮ | ⋮ | ⋮ |

FIG. 5K

UNCONFIRMED INFORMATION REPORT MANAGEMENT INFORMATION

| KIND OF UNCONFIRMED INFORMATION | NUMBER OF CASES HAVING HIGHER PRIORITY THAN SHORT-CUT FUNCTION | NUMBER OF CASES HAVING LOWER PRIORITY THAN SHORT-CUT FUNCTION |
|---|---|---|
| MISSED INCOMING CALL | 0 | 10 |
| NEW INCOMING MAIL | 0 | 7 |
| MESSAGE | 0 | 3 |
| ⋮ | ⋮ | ⋮ |

FIG. 5L

UNCONFIRMED INFORMATION REPORT MANAGEMENT INFORMATION

| KIND OF UNCONFIRMED INFORMATION | NUMBER OF CASES HAVING HIGHER PRIORITY THAN SHORT-CUT FUNCTION | NUMBER OF CASES HAVING LOWER PRIORITY THAN SHORT-CUT FUNCTION |
|---|---|---|
| MISSED INCOMING CALL | 1 | 1 |
| NEW INCOMING MAIL | 0 | 2 |
| MESSAGE | 0 | 0 |
| ⋮ | ⋮ | ⋮ |

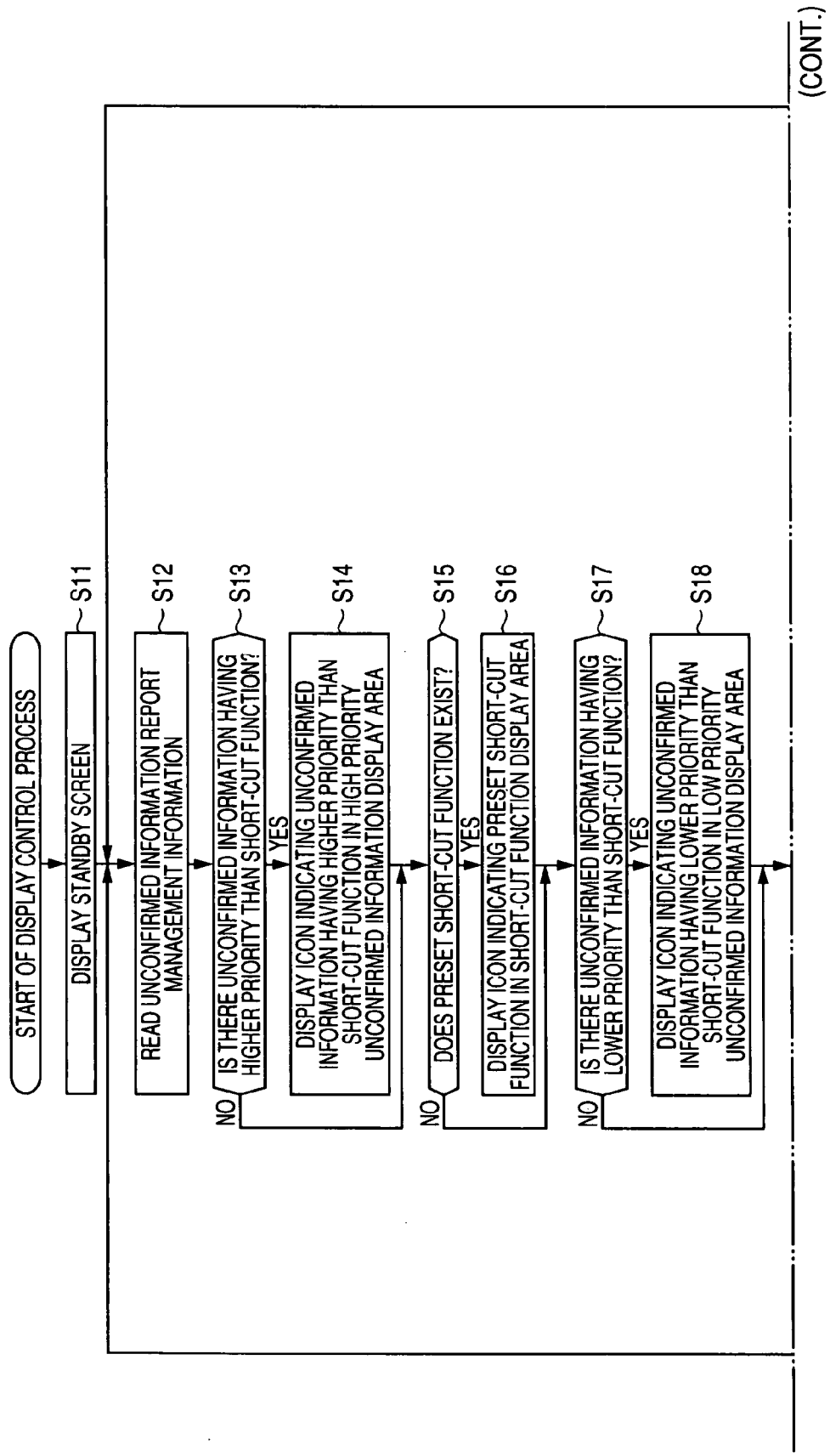

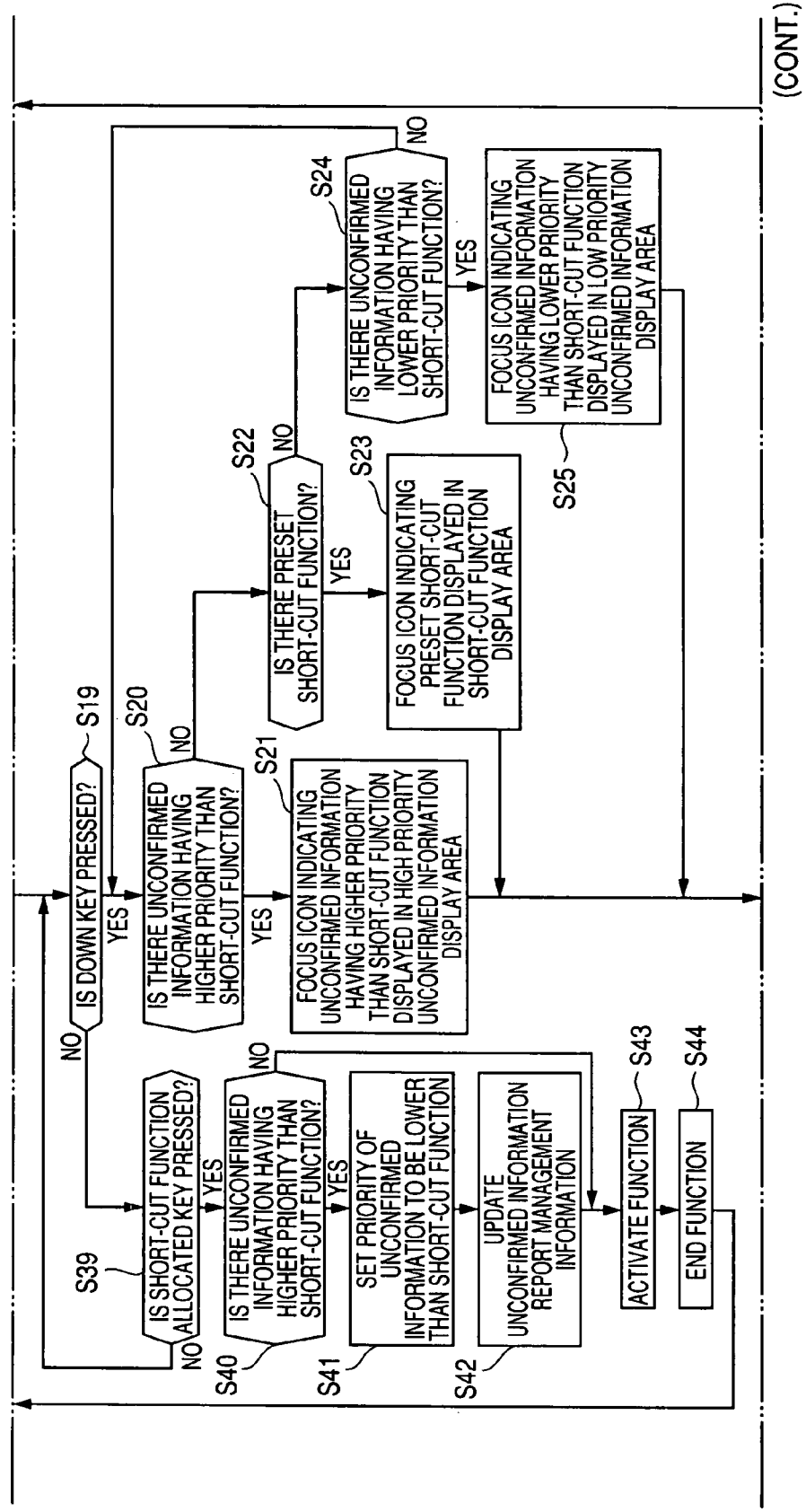

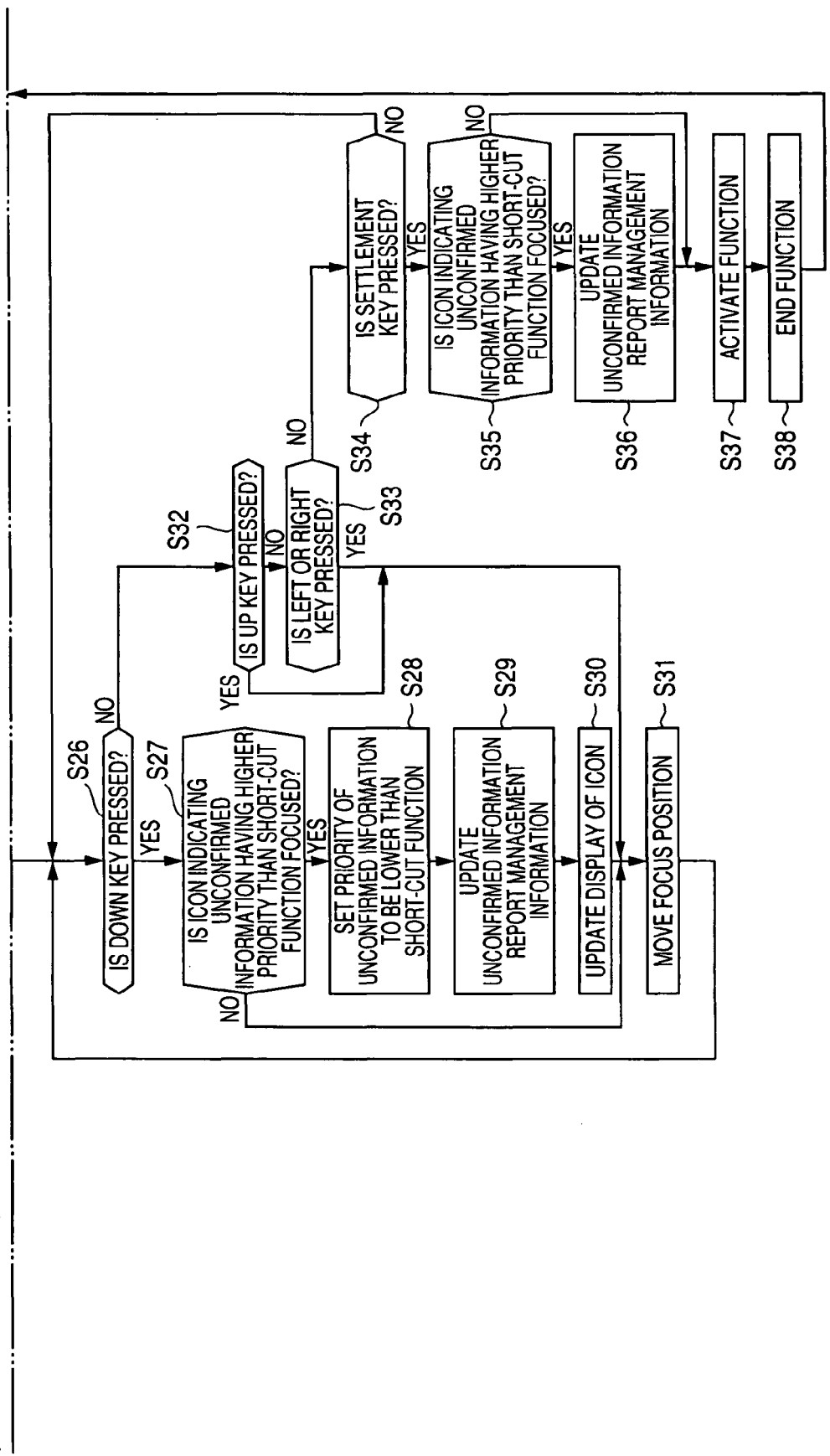
(FIG. 6 CONTINUED)

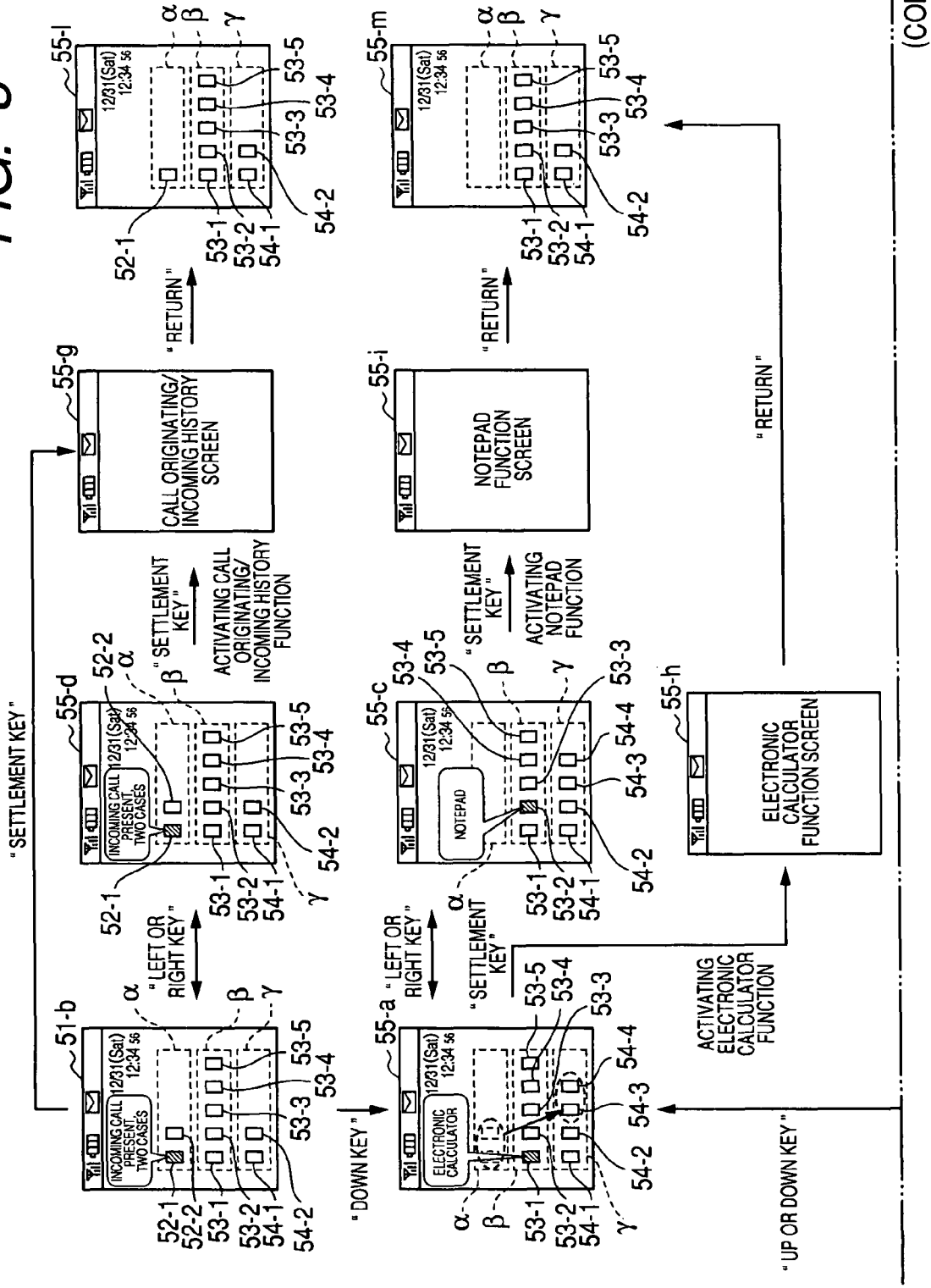

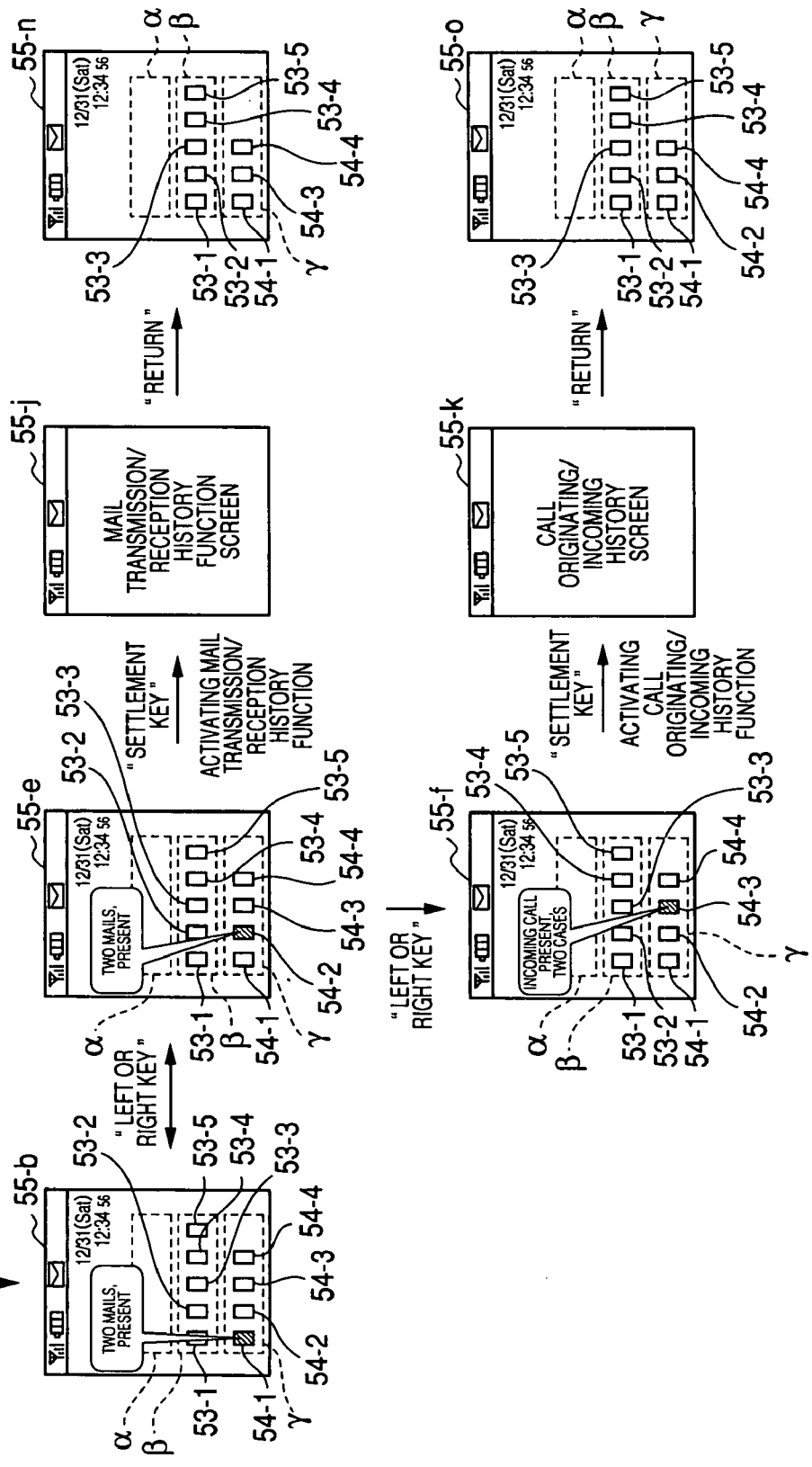

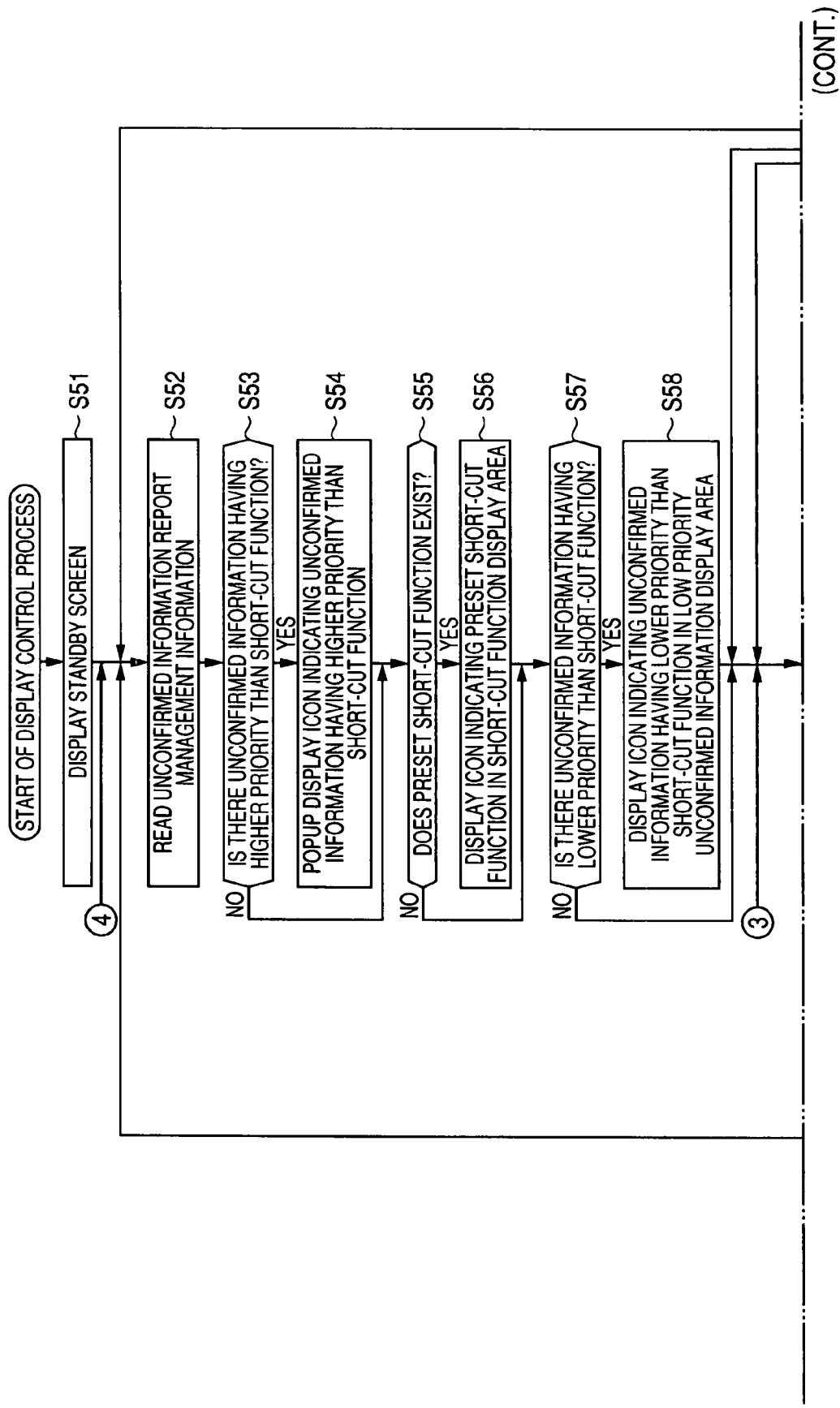

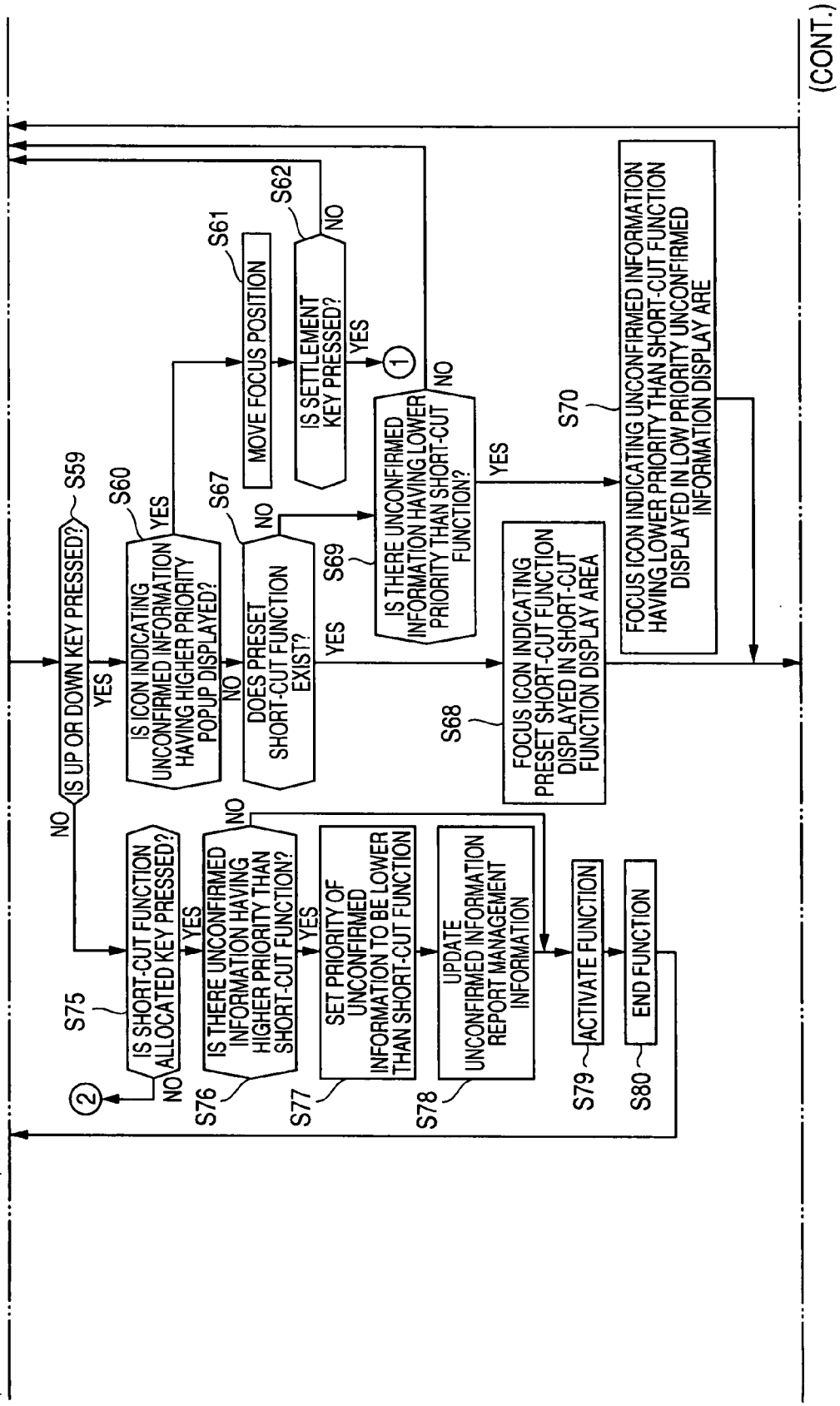

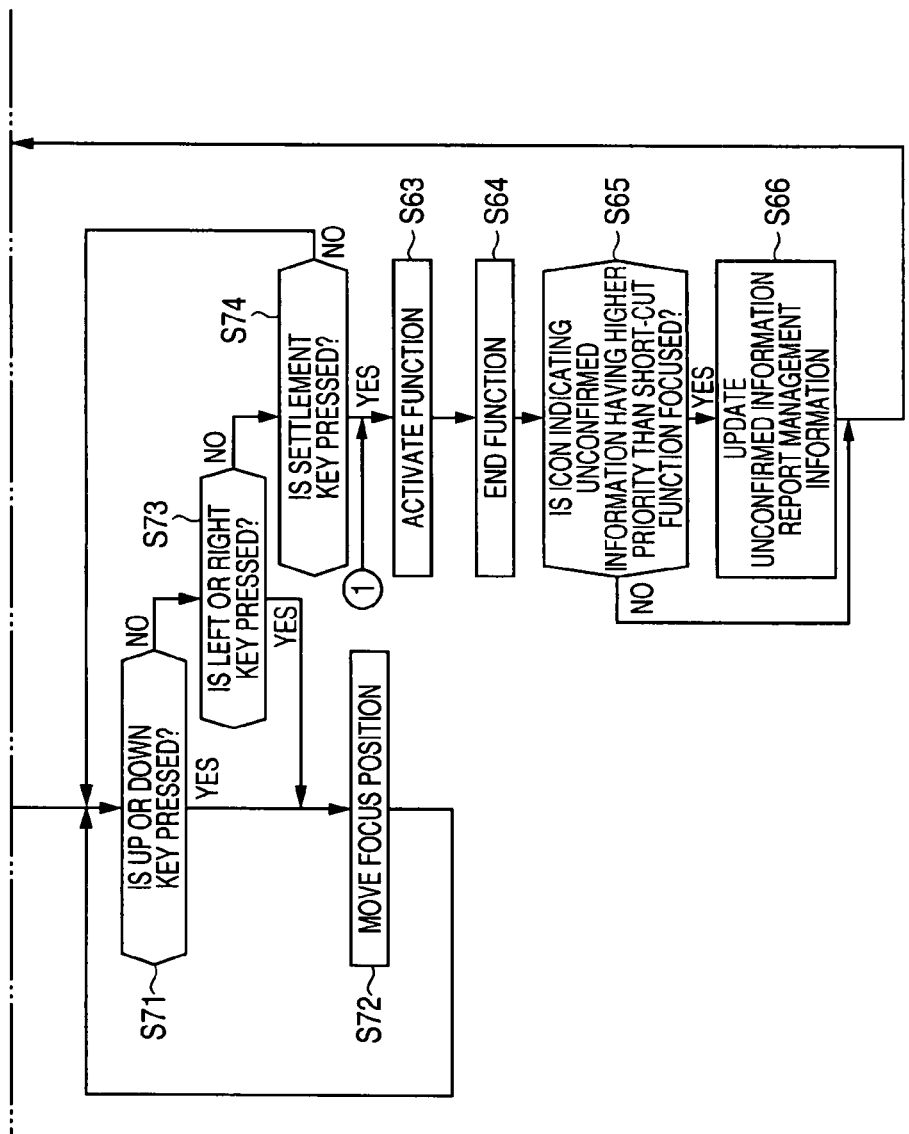
(FIG. 9 CONTINUED)

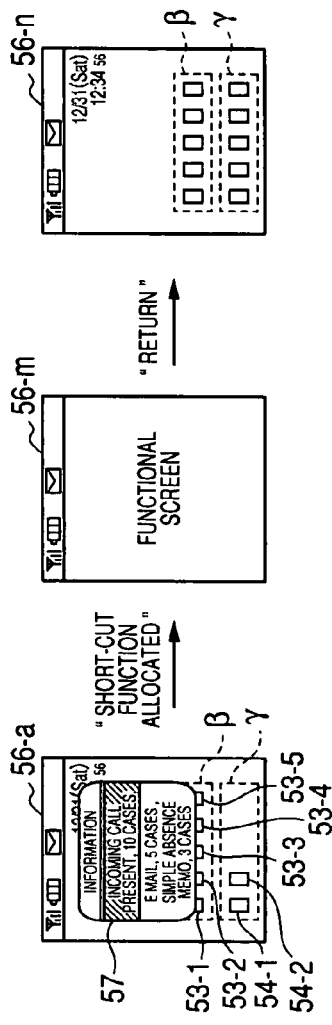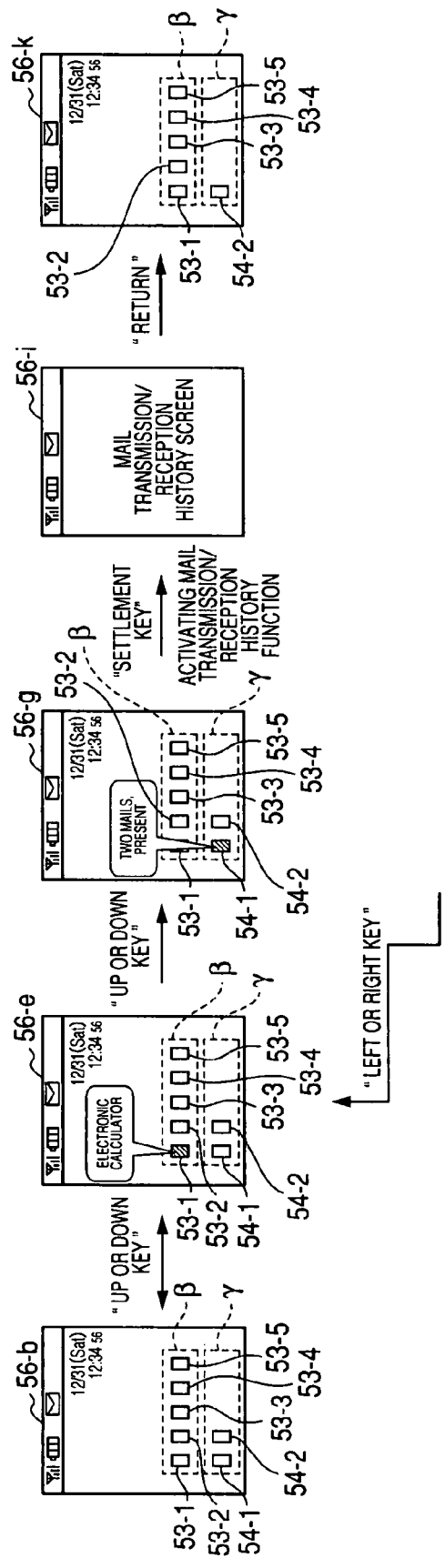

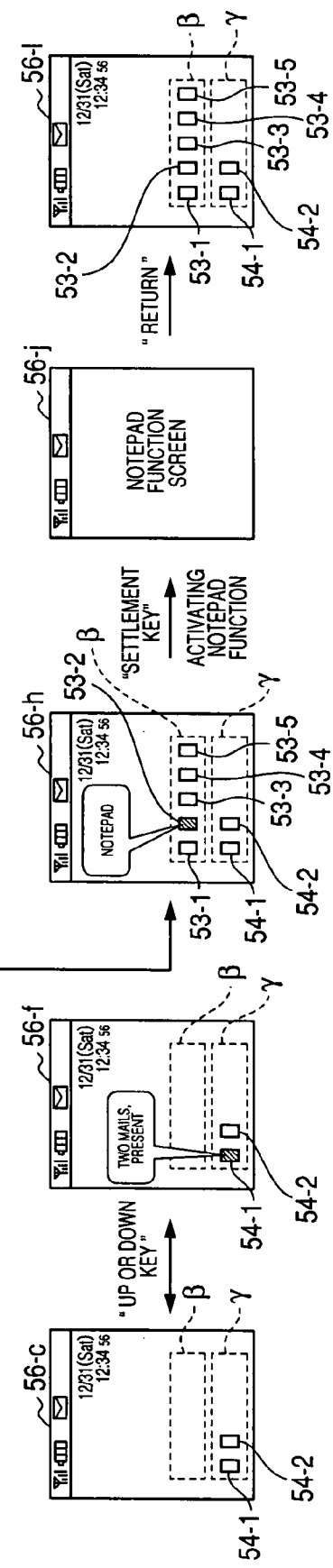

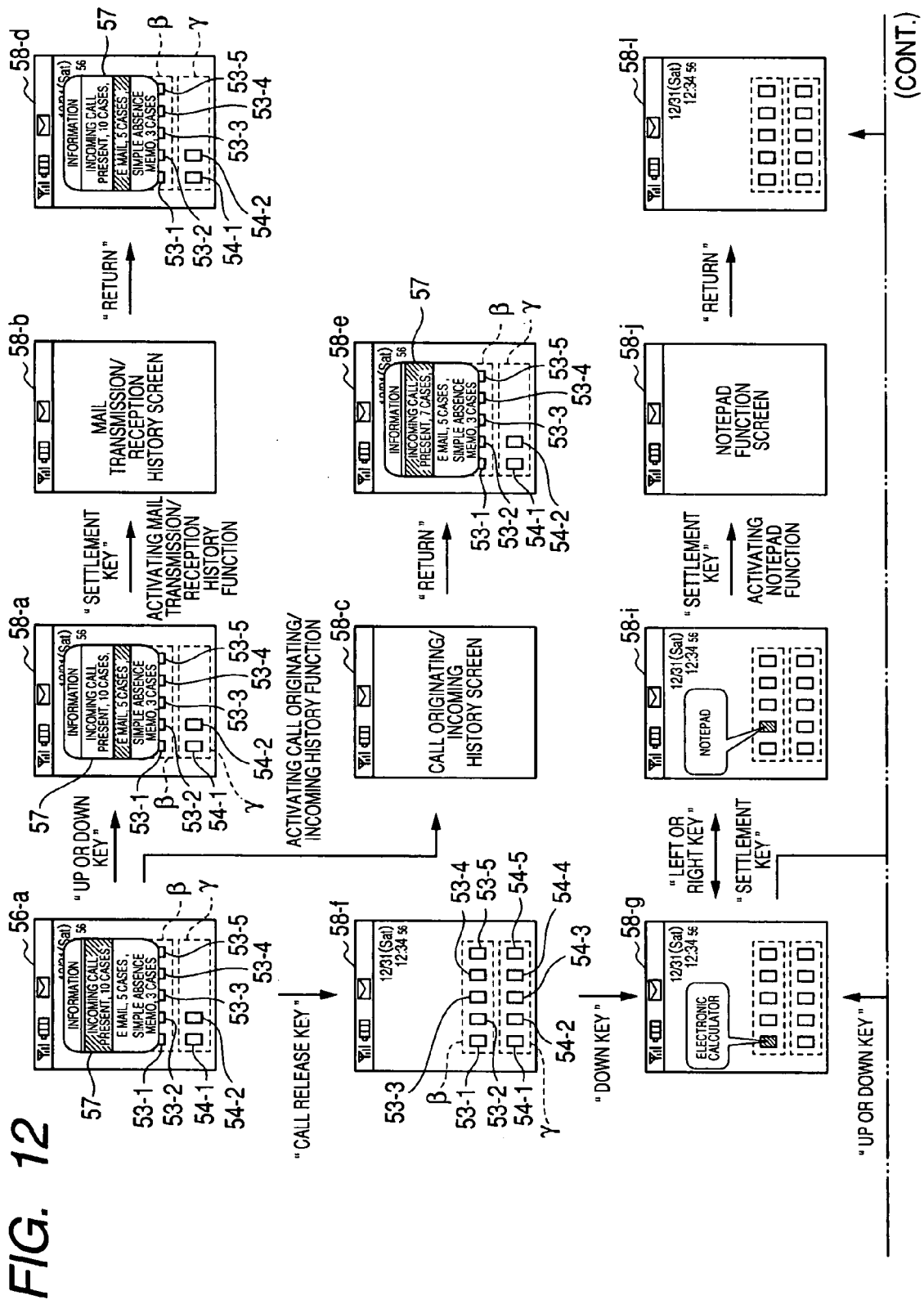

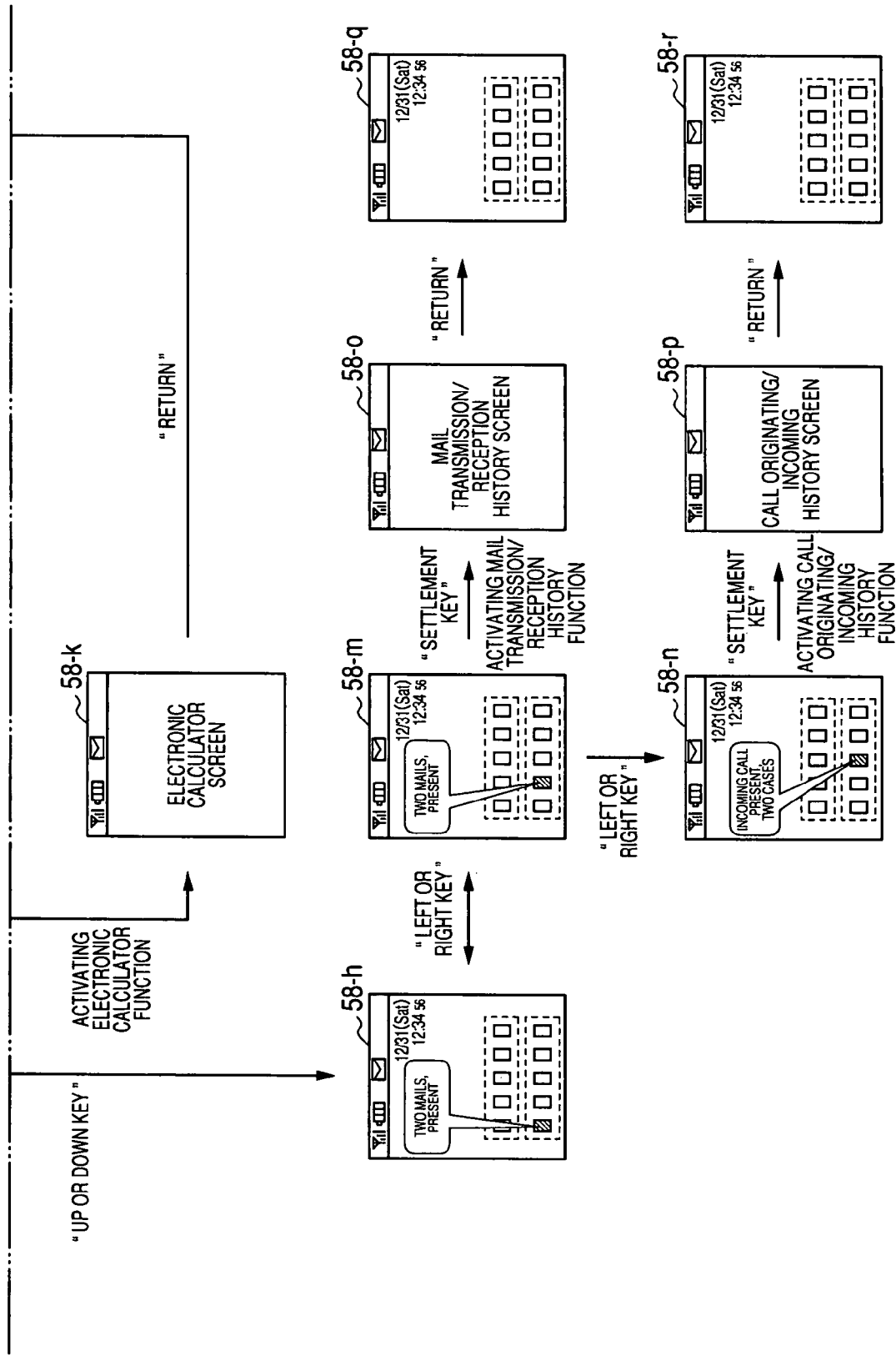

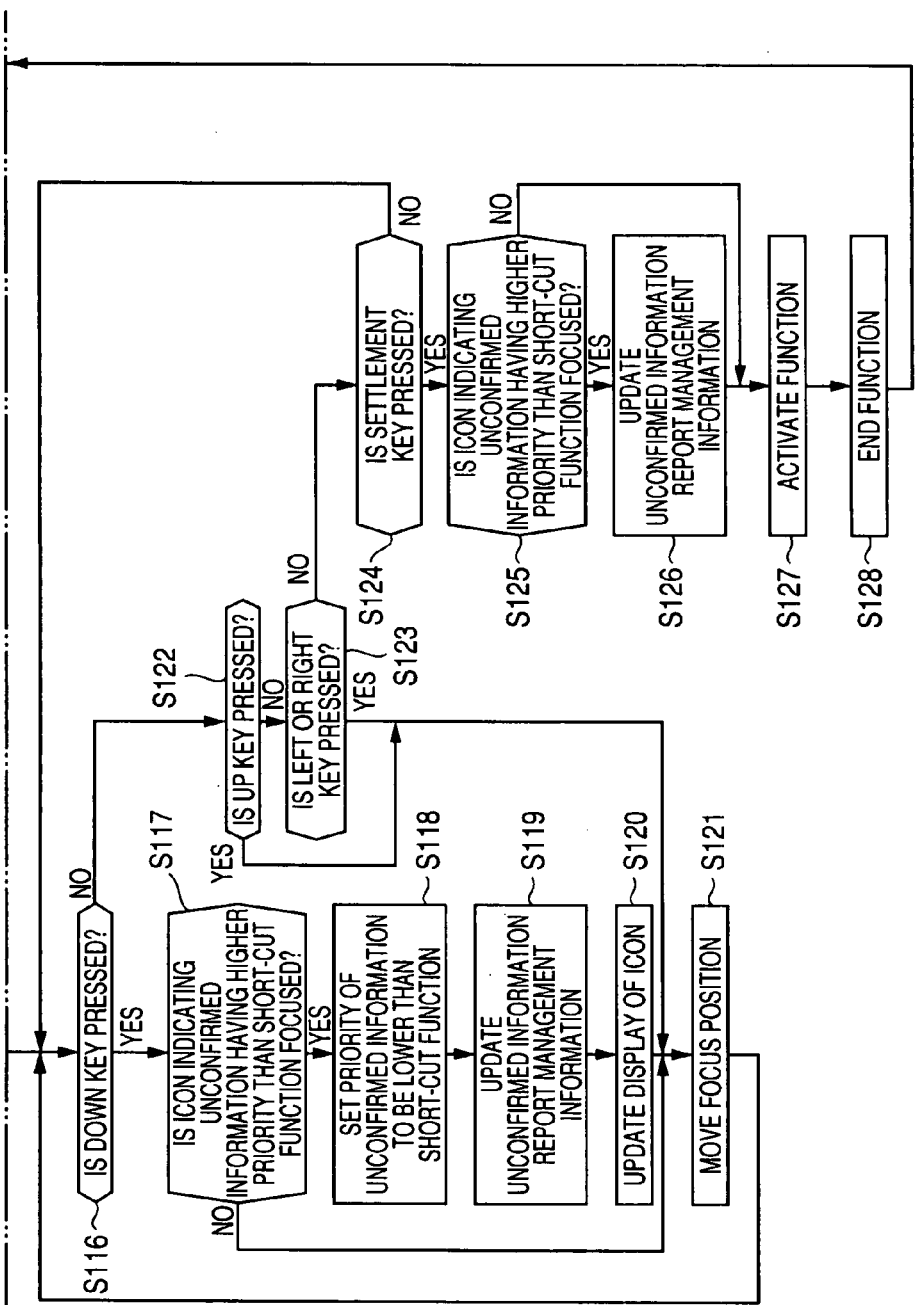
(FIG. 13 CONTINUED)

INFORMATION PROCESSING APPARATUS

CROSS-REFERENCE TO RELATED APPLICATIONS

This application is based on and claims the benefit of priority from the prior Japanese Patent Application No. 2006332385, filed on Dec. 8, 2006; the entire contents of which are incorporated herein by reference.

The present invention relates to an information processing apparatus, and more particularly to an information processing apparatus that can report a missed incoming call or a mail in absentia to the user.

BACKGROUND

In recent years, a portable telephone has various functions, including not only a communication function by simple talk, but also an address book function, a mail function via the network such as the Internet, and a browser function of perusing the Web page.

For example, when an incoming call is missed, an icon indicating the missed incoming call, as unconfirmed information, is displayed on a standby screen, the unconfirmed information (e.g., new incoming call) is reported to the user. The user can easily confirm the unconfirmed information by clicking the icon by using an operation key. After the unconfirmed information is confirmed by the user, the icon indicating the missed incoming call displayed on the standby screen is erased.

It is disclosed by, for example JP-A-8-298541, that there is a technique for informing that the incoming call is missed even without a response operation of the user.

With the technique disclosed in JP-A-298541, when the telephone is disconnected with no response to the incoming call, the time information based on the incoming call such as time or time zone when there is the incoming call is stored, whereby the user can know when the incoming call is missed.

On the other hand, in the latest portable phone, a function frequently used by the user can be set as a short-cut, and an icon indicating the function set for the short-cut can be displayed on the standby screen. The user can easily activate the function set for the short-cut by clicking the icon indicating the function set for the short-cut displayed on the standby screen using an operation key.

According to the above-described related art, in the case where the unconfirmed information such as a missed incoming call is reported to the user and a case where the function frequently used by the user is set as the short-cut, the icon (icon indicating the missed incoming call or icon indicating the function set for the short-cut) to be operated by the user must be displayed on the standby screen. When there is an operational contention between these two operations, one of the operations has to be given priority, so that it is more difficult for the user to perform the other operation not given priority.

Of course, when the operation for reporting the unconfirmed information, such as a missed incoming call, to the user is given priority, the icon indicating the missed incoming call displayed on the standby screen is erased after the unconfirmed information is confirmed by the user, whereby the operational contention between these two operations is resolved. However, the user cannot leave the unconfirmed information on the standby screen intentionally to confirm the unconfirmed information later on, and thereafter operate preferentially the icon indicating the function set for the short-cut displayed on the standby screen.

SUMMARY

The present invention has been made in view of the above circumstances and provides an information processing apparatus. According to an aspect of the invention, there is provided an information processing apparatus including a first display unit configured to display on a standby screen a first indicative information indicating a first unconfirmed information having higher priority than a short-cut function of activating a predetermined function associated beforehand by being selected on the standby screen; a second display unit configured to display on the standby screen a second indicative information indicating the short-cut function; and a third display unit configured to display on the standby screen a third indicative information indicating a second unconfirmed information having lower priority than the short-cut function.

BRIEF DESCRIPTION OF THE DRAWINGS

In the accompanying drawings:

FIG. 4 is an exemplary flowchart for explaining an unconfirmed information report management information update process in the portable telephone of FIG. 3;

FIGS. 5A to 5L are exemplary views showing the data configuration of the unconfirmed information report management information stored in the storage part of FIG. 3;

FIG. 6 is an exemplary flowchart for explaining a display control process in the portable telephone 1 of FIG. 3;

FIG. 8 is an exemplary transition view of the display screen displayed on the liquid crystal display of FIG. 3;

FIG. 9 is an exemplary flowchart for explaining another display control process in the portable telephone 1 of FIG. 3;

FIGS. 11A to 11D are exemplary transition views of the display screen displayed on the liquid crystal display of FIG. 3;

FIG. 12 is an exemplary transition view of the display screen displayed on the liquid crystal display of FIG. 3;

DESCRIPTION OF THE EMBODIMENTS

The embodiments of the present invention will be described below with reference to the drawings.

Figure 1A:
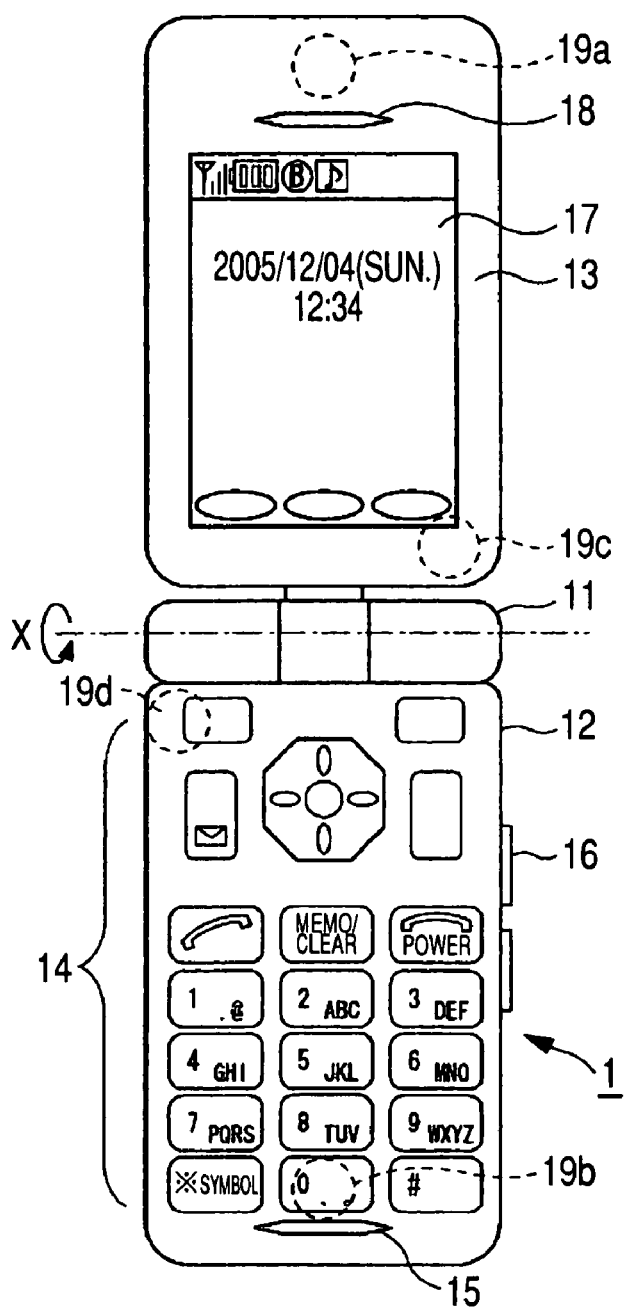
FIGS. 1A, 1B are exemplary appearance views showing an appearance configuration of a portable telephone according to an embodiment.
Figure 1B:
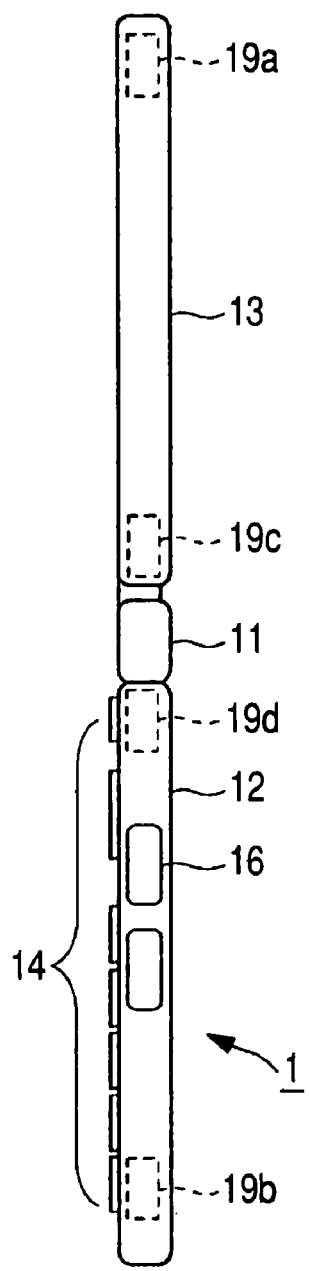

FIG. 1A shows the appearance configuration of the portable telephone 1 when opened about 180 degrees, as seen from the front face, and FIG. 1B shows the appearance configuration of the portable telephone 1 when opened, as seen from the side face.

The portable telephone 1 has a first package 12 and a second package 13 hinged around a central hinge portion 11 as boundary, and formed to be foldable in a direction of the arrow X via the hinge portion 11, as shown in FIGS. 1A and 1B. A transmitting/receiving antenna (antenna 44 of FIG. 3 as will be described later) is provided at a predetermined position inside the portable telephone 1 to transmit or receive electric wave to or from a base station (not shown) via the built-in antenna.

The first package 12 is provided on its surface with the operation keys, including the numeric keys of "0" to "9", a call out key, a redial key, a call release/power key, a clear key, and an electronic mail key, whereby various kinds of instruction can be inputted, employing the operation keys 14.

The first package 12 is provided with a cross key and a settlement key as the operation keys 14 on its top. When the user presses the cross key up, down, left or right, the cursor can be moved up, down, left or right. More specifically, it is possible to make various kinds of operation such as a scroll operation of a telephone directory list or an electronic mail displayed on a liquid crystal display 17 provided for the second package 13, a page turning operation for the simple home page and an image shift operation.

Also, various functions can be settled by pressing the settlement key. For example, in the first package 12, a desired telephone number is selected from among a plurality of telephone numbers in the telephone directory list displayed on the liquid crystal display 17 by the user operating the cross key, in which if the settlement key is pressed in the inner direction of the first package 12, the selected telephone number is settled and a calling process for the telephone number is performed.

Further, the first package 12 is provided with an electronic mail key left adjacently to the cross key and the settlement key, in which if the electronic mail key is pressed in the inner direction of the first package 12, a mail transmission/reception function can be called. A browser key is provided right adjacently to the cross key and the settlement key, in which if the browser key is pressed in the inner direction of the first package 12, data of a Web page can be perused. The electronic mail key and the browser key provided left and right adjacently to the cross key and the settlement key can have various functions such as "Yes" and "No", for example, on a screen displayed on the liquid crystal display 17, and therefore are called a soft 1 key and a soft 2 key, respectively.

Also, the first package 12 is provided with a microphone 15 in the lower part of the operation keys 14. The voice of the user is collected by the microphone 15 during a telephone conversation. Also, the first package 12 is provided with a side key 16 for manipulating the portable telephone 1.

The first package 12 inserts a battery pack, not shown, into the back face, in which if the call release/power key is turned on, power is supplied from the battery pack to each circuit so that the portable telephone is started up to be operable.

On the other hand, the second package 13 is provided with the liquid crystal display 17 (main display) on its front face. The liquid crystal display 17 can display, in addition to a receiving condition of electric wave, a remaining amount of battery, the partner names or telephone numbers registered in the telephone directory, and a transmission history, the contents of electronic mail, a simple home page, an image taken by a CCD (Charge Coupled Device) camera (CCD camera 20 of FIG. 2A as will be described later), the contents received from an external contents server (not shown), and the contents stored in a memory card (memory card 46 of FIG. 3 as will be described later).

Also, a speaker 18 is provided at a predetermined position on top of the liquid crystal display 17, whereby the user can make a telephone conversation by voice.

Further, the magnetic sensors 19a, 19b, 19c and 19d for detecting the conditions of the portable telephone 1 are provided at the predetermined positions inside the first package 12 and the second package 13.

Figure 2A:
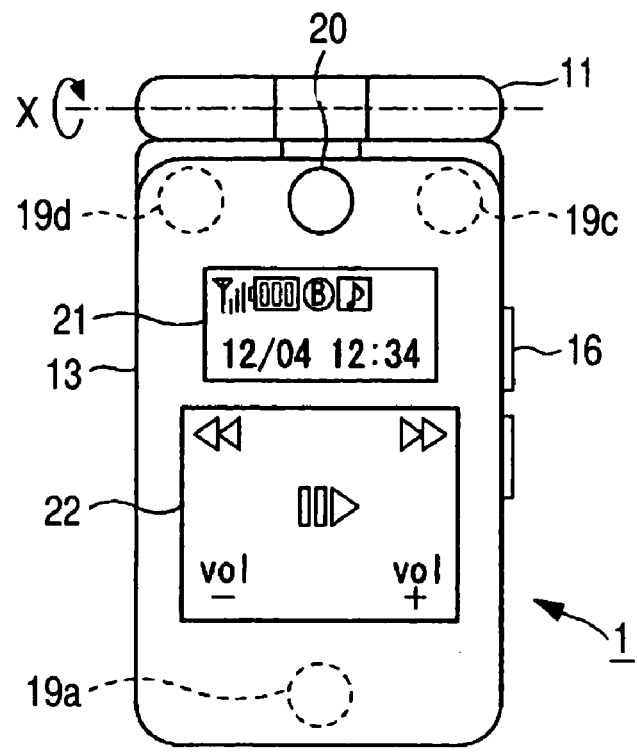
FIGS. 2A, 2B are exemplary appearance views showing another appearance configuration of the portable telephone according to the embodiment.
Figure 2B:
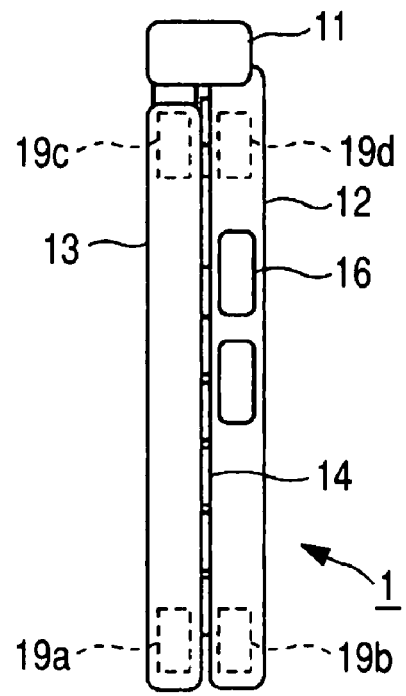

The state of the portable telephone 1, as shown in FIGS. 2A, 2B, is rotated in a direction of the arrow X from the state of the portable telephone 1 of FIG. 1A, 1B. FIG. 2A shows the appearance configuration of the portable telephone 1 when closed, as seen from the front face, and FIG. 2B shows the appearance configuration of the portable telephone 1 when closed, as seen from the side face.

A CCD camera 20 is provided on the top of the second package 13, and thereby can pick up an image of a desired object of photographing. A sub-display 21 is provided in the lower part of the CCD camera 20, and displays an antenna pict indicating the current sensitivity level of the antenna, a battery pict indicating the current remaining amount of battery in the portable telephone 1, and the current time.

Further, an electrostatic touch pad 22 is provided in the lower part of the sub-display 21. Though the electrostatic touch pad 22 is apparently one sheet of touch pad, the sensors, not shown, are provided at plural positions, in which if the user touches the touch pad near the sensor, the sensor detects it so that a rewind function, a fast forward function, a volume down operation, a volume up operation, a reproduction operation or a pause operation is performed.

Figure 3:
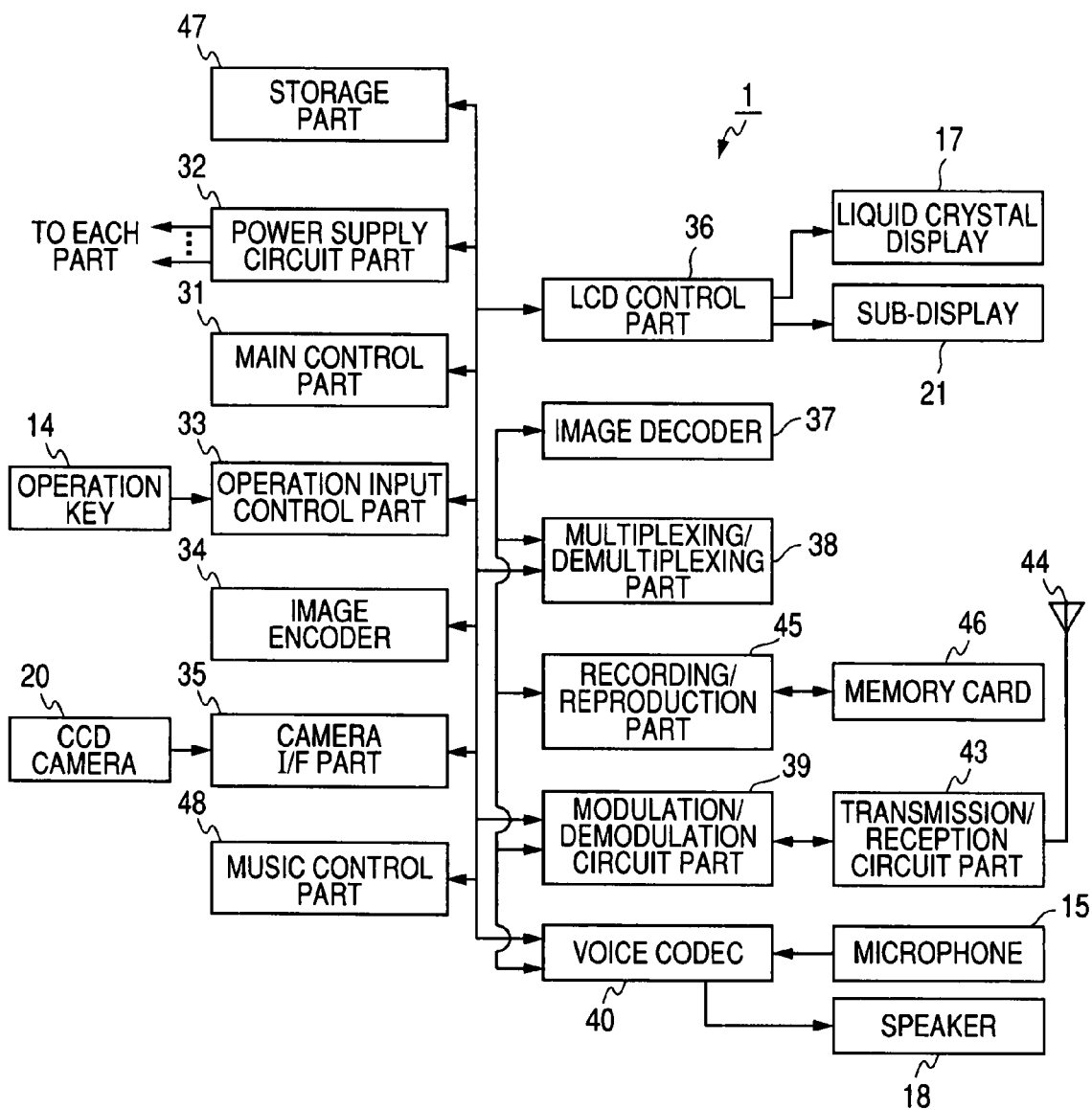
FIG. 3 is an exemplary block diagram showing the internal configuration of the portable telephone according to the embodiment.

As shown in FIG. 3, the portable telephone 1 has a main control part 31 for generally controlling each part of the first package 12 and the second package 13, to which a power supply circuit part 32, an operation input control part 33, an image encoder 34, a camera interface part 35, an LCD (Liquid Crystal Display) control part 36, a multiplexing/demultiplexing part 38, a modulation/demodulation circuit part 39, a voice codec 40, a storage part 47, and a music control part 48 are interconnected via a main bus 41, and to which the image encoder 34, an image decoder 37, the multiplexing/demultiplexing part 38, the modulation/demodulation circuit part 39, the voice codec 40 and a recording/reproduction part 45 are interconnected via a synchronous bus 42.

The power supply circuit part 32 activates the portable telephone 1 to be ready for operation by supplying power from the battery pack to each part, if the call release/power key is turned on by an operation of the user.

The main control part 31 comprises a CPU (Central Processing Unit), a ROM (Read Only Memory), and a RAM (Random Access Memory). The CPU performs various kinds of processing in accordance with a program stored in the ROM or various kinds of application program loaded from the storage part 47 into the RAM, as well as generally controls the portable telephone 1 by generating and supplying various kinds of control signal to each part. The RAM properly stores data required for the CPU to perform various kinds of processing.

The main control part 31 contains a timer for measuring the current date and time correctly.

The portable telephone 1 converts and compresses a voice signal collected by the microphone 15 in a speech communication mode into a digital voice signal in the voice codec 40 under the control of the main control part 31, makes a spread spectrum process in the modulation/demodulation circuit part 39, and makes a digital analog conversion process and a frequency conversion process in the transmission/reception circuit part 43 to transmit the signal via the antenna 44.

Also, the portable telephone 1 amplifies a received signal received at the antenna 44 in the speech communication mode, makes the frequency conversion process and the analog digital conversion process, makes an inverse spread spectrum process in the modulation/demodulation circuit part 39, expands the signal in the voice codec 40, converts it into an analog voice signal, and outputs the converted analog voice signal from the speaker 18.

Further, when the portable telephone 1 transmits an electronic mail in a data communication mode, it sends out text data of the electronic mail inputted by operating the operation keys 14 via the operation input control part 33 to the main control part 31. The main control part 31 makes the spread spectrum process for the text data in the modulation/demodulation circuit part 39, and after making the digital analog conversion process and the frequency conversion process in the transmission/reception circuit part 43, transmits the signal via the antenna 44 to the base station (not shown).

On the contrary, when the portable telephone 1 receives an electronic mail in the data communication mode, the modulation/demodulation circuit part 39 makes the inverse spread spectrum process for a received signal received from the base station (not shown) via the antenna 44 to restore original text data, and then displays the electronic mail on the liquid crystal display 17 via the LCD control part 36.

Thereafter, the portable telephone 1 can record the received electronic mail in the memory card 46 via the recording/reproduction part 45 in accordance with an operation of the user.

When the portable telephone 1 does not transmit the image signal, it directly displays the image signal taken by the CCD camera 20 via the camera interface part 35 and the LCD control part 36 on the liquid crystal display 17.

When the portable telephone 1 transmits the image signal in the data communication mode, it supplies the image signal taken by the CCD camera 20 via the camera interface part 35 to the image encoder 34.

The image encoder 34 compresses and encodes the image signal supplied from the CCD camera 20 in accordance with a predetermined encoding method such as an MPEG (Moving Picture Experts Group) 4 for conversion into an encoded image signal and sends the converted encoded image signal to the multiplexing/demultiplexing part 38. At the same time, the portable telephone 1 sends the voice collected by the microphone 15 during image pickup of the CCD camera 20 as the digital voice signal via the voice codec 40 to the multiplexing/demultiplexing part 38.

The multiplexing/demultiplexing part 38 multiplexes the encoded image signal supplied from the image encoder 34 and the voice signal supplied from the voice codec 40 in accordance with a predetermined method, makes the spread spectrum process for the resultant multiplexed signal in the modulation/demodulation circuit part 39, and after making the digital analog conversion process and the frequency conversion process in the transmission/reception circuit part 43, transmits the signal via the antenna 44.

On the contrary, the portable telephone 1 can receive data of a Web page in the data communication mode.

That is, if the portable telephone 1 issues a request for data of a Web page, for example, in the data communication mode, the data of the Web page is transmitted via the base station (not shown) in response to the request. The data of the Web page is received via the antenna 44 by the transmission/reception circuit part 43 and the modulation/demodulation circuit part 39. The transmission/reception circuit part 43 and the modulation/demodulation circuit part 39 send out the received data of the Web page to the main control part 31.

The main control part 31 makes an interpretation of the data of the Web page, and creates a screen (image) based on the interpretation. The created screen is supplied from the main control part 31 via the LCD control part 36 to the liquid crystal display 17 and displayed thereon. That is, an application program of the Web browser is at least installed in the ROM of the main storage part 31 or the storage part 47, whereby the CPU of the main control part 31 functions as the Web browser by executing the application program of the Web browser on the RAM to interpret the data of the Web page.

Also, when the portable telephone 1 receives data of a moving picture file linked to the Web page, for example, in the data communication mode, the modulation/demodulation circuit part 39 makes the inverse spread spectrum process for a received signal received via the antenna 44 from the base station (not shown), and sends out the resultant multiplexed signal to the multiplexing/demultiplexing part 38.

The multiplexing/demultiplexing part 38 demultiplexes the multiplexed signal into the encoded image signal and the voice signal to supply the encoded image signal via the synchronous bus 42 to the image decoder 37 and supply the voice signal to the voice codec 40. The image decoder 37 decodes the encoded image signal in accordance with a decoding method corresponding to a predetermined encoding method such as an MPEG4 to generate a reproduced moving picture signal and supply the generated reproduced moving picture signal via the LCD control part 36 to the liquid crystal display 17. Thereby, the moving picture data contained in the moving picture file linked to the Web page, for example, is displayed.

At the same time, the voice codec 40 converts the voice signal into the analog voice signal, and then supplies the analog voice signal to the speaker 18, whereby the voice signal contained in the moving picture file linked to the Web page, for example, is reproduced. In this case, the portable telephone 1 can record the received data linked to the Web page via the recording/reproduction part 45 in the memory card 46 by the operation of the user, as in the case of the electronic mail.

The storage part 47 is composed of a flash memory element that is an electrically rewritable or erasable non-volatile memory, or an HDD (Hard Disc Drive), for example, and stores various application programs performed by the CPU of the main control part 31 and various kinds of data groups. Also, the storage part 47 may store the electronic mail received in accordance with the operation of the user, or the moving picture data contained in the moving picture file linked to the received Web page, as needed.

Also, in the case where there is an incoming call when the user is absent, for example, the storage part 47 stores successively the information concerning the incoming call as the unconfirmed information (information not yet confirmed by the user), if the incoming call is disconnected without speech communication for the incoming call. Further, in the case where the user does not order the display of the mail contents when the receiving operation of the new mail is completed, the storage part 47 stores successively the information concerning the mail as the unconfirmed information. Also, the storage part 47 stores the unconfirmed information report management information that is information for managing the report of these unconfirmed information, in which these unconfirmed information are collectively managed by the unconfirmed information report management information stored in the storage part 47. The unconfirmed information report management information is properly updated.

The music control part 48 controls the reproduction operation and the pause operation of audio data stored in the storage part 47, as well as the rewind function, the fast forward function, the volume down operation and the volume up operation.

Referring to FIG. 4, an unconfirmed information report management information update process in the portable telephone 1 of FIG. 3 will be described below. This unconfirmed information report management information update process is started, for example, in the case where there is an incoming call while the user is absent and the incoming call is disconnected without speech conversation for the incoming call, or in the case where the receiving operation of the new mail is completed and the user does not order the display of the mail contents.

At step S1, the main control part 31 generates the information on the incoming call (unconfirmed incoming call information) or information on the mail (unconfirmed mail information) as the new unconfirmed information (information not yet confirmed by the user) in the case where there is an incoming call via the base station (not shown) while the user is absent and the incoming call is disconnected without speech conversation for the incoming call, or in the case where the receiving operation of the new mail is completed via the base station (not shown) and the user does not order the display of the mail contents, for example.

This unconfirmed information includes information on the date and time when the incoming call occurs, information on the incoming call partner (e.g., partner's name, telephone number of another portable telephone 1 owned by the partner) in the case of the information on the incoming call, for example, or includes information on the date and time of receiving the new mail, information on the mail partner (e.g., partner's name, mail address allocated to another portable telephone 1 owned by the partner) in the case of the information on the new mail, for example.

At step S2, the main control part 31 stores the generated new unconfirmed information in the storage part 47. The storage part 47 stores the generated new unconfirmed information under the control of the main control part 31.

At step S3, the main control part 31 sets the priority of the generated new unconfirmed information to be higher than the preset short-cut function.

At step S4, the main control part 31 reads the unconfirmed information report management information (information for managing the report of unconfirmed information) stored in the storage part 47.

FIG. 5A shows the data configuration of the unconfirmed information report management information stored in the storage part 47.

The first to third columns of the unconfirmed information report management information of FIG. 5A describe the "kind of unconfirmed information", the "number of cases having higher priority than the short-cut function" and the "number of cases having lower priority than the short-cut function", which indicate the kind of unconfirmed information (e.g., missed incoming call, new incoming mail, and a message stored in a message center (not shown)) stored in the storage part 47, the number of cases having higher priority than the short-cut function in the unconfirmed information stored in the storage part 47, and the number of cases having lower priority than the short-cut function in the unconfirmed information stored in the storage part 47.

In the unconfirmed information report management information of FIG. 5A, in the first row, it is indicated that the number of cases having higher priority than the short-cut function is "9" and the number of cases having lower priority than the short-cut function is "0" in the unconfirmed information where the kind of unconfirmed information is "missed incoming call". In the second row, it is indicated that the number of cases having higher priority than the short-cut function is "5" and the number of cases having lower priority than the short-cut function is "0" in the unconfirmed information where the kind of unconfirmed information is "new incoming mail" In the third row, it is indicated that the number of cases having higher priority than the short-cut function is "3" and the number of cases having lower priority than the short-cut function is "0" in the unconfirmed information where the kind of unconfirmed information is "message".

At step S5, the main control part 31 updates the unconfirmed information report management information, based on the set priority of the unconfirmed information (i.e., priority set higher than the short-cut function).

For example, in the case where there is an incoming call via the base station (not shown) while the user is absent and the incoming call is disconnected without speech conversation for the incoming call, the unconfirmed information report management information as shown in FIG. 5A is updated to the unconfirmed information report management information as shown in FIG. 5B, and in the first row, the number of cases having higher priority than the short-cut function is updated from "9" to "10".

Thereafter, the operation returns to step S1, whereby the process following the step S1 is repeated. Thereby, in the case where there is an incoming call via the base station (not shown) while the user is absent and the incoming call is disconnected without speech conversation for the incoming call, or in the case where the receiving operation of the new mail is completed via the base station (not shown) and the user does not order the display of the mail contents, for example, the new unconfirmed information is generated, in which the priority of the generated unconfirmed information is set to be higher than the short-cut function, and the unconfirmed information report management information stored in the storage part 47 is updated.

Referring now to a flowchart of FIG. 6, a display control process in the portable telephone 1 of FIG. 3 will be described below. This display control process is started when the portable telephone 1 is operated by the user, for example, when the portable telephone 1 is turned from the closed state to the open state, or when the portable telephone 1 is kept open beyond a predetermined time (e.g., one minute) to turn off the light of the liquid crystal display 17 and make the portable telephone 1 standby, and then the user operates the operation key 14 provided on the portable telephone 1 to turn on the light of the liquid crystal display 17.

At step S11, the main control part 31 controls the LCD control part 36 to display the standby screen preset by the user (or a default standby screen if it is not preset by the user) on the liquid crystal display 17. The liquid crystal display 17 controls the LCD control part 36 to display the standby screen preset by the user.

At step S12, the main control part 31 reads the unconfirmed information report management information stored in the storage part 47.

For example, if any unconfirmed information report management information as shown in FIGS. 5B to 5E is stored in the storage part 47, any unconfirmed information report management information as shown in FIGS. 5B to 5E is read.

For example, in the case of the unconfirmed information report management information of FIG. 5B, in the first row, it is indicated that the number of cases having higher priority than the short-cut function is "10" and the number of cases having lower priority than the short-cut function is "0" in the unconfirmed information where the kind of unconfirmed information is "missed incoming call". In the second row, it is indicated that the number of cases having higher priority than the short-cut function is "5" and the number of cases having lower priority than the short-cut function is "0" in the unconfirmed information where the kind of unconfirmed information is "new incoming mail". In the third row, it is indicated that the number of cases having higher priority than the short-cut function is "3" and the number of cases having lower priority than the short-cut function is "0" in the unconfirmed information where the kind of unconfirmed information is "message".

In the case of the unconfirmed information report management information of FIG. 5C, in the first row, it is indicated that the number of cases having higher priority than the short-cut function is "0" and the number of cases having lower priority than the short-cut function is "10" in the unconfirmed information where the kind of unconfirmed information is "missed incoming call". In the second row, it is indicated that the number of cases having higher priority than the short-cut function is "0" and the number of cases having lower priority than the short-cut function is "5" in the unconfirmed information where the kind of unconfirmed information is "new incoming mail". In the third row, it is indicated that the number of cases having higher priority than the short-cut function is "0" and the number of cases having lower priority than the short-cut function is "3" in the unconfirmed information where the kind of unconfirmed information is "message".

In the case of the unconfirmed information report management information of FIG. 5D, in the first row, it is indicated that the number of cases having higher priority than the short-cut function is "5" and the number of cases having lower priority than the short-cut function is "5" in the unconfirmed information where the kind of unconfirmed information is "missed incoming call" In the second row, it is indicated that the number of cases having higher priority than the short-cut function is "0" and the number of cases having lower priority than the short-cut function is "5" in the unconfirmed information where the kind of unconfirmed information is "new incoming mail". In the third row, it is indicated that the number of cases having higher priority than the short-cut function is "2" and the number of cases having lower priority than the short-cut function is "1" in the unconfirmed information where the kind of unconfirmed information is "message".

In the case of the unconfirmed information report management information of FIG. 5E, in the first row, it is indicated that the number of cases having higher priority than the short-cut function is "2" and the number of cases having lower priority than the short-cut function is "0" in the unconfirmed information where the kind of unconfirmed information is "missed incoming call". In the second row, it is indicated that the number of cases having higher priority than the short-cut function is "0" and the number of cases having lower priority than the short-cut function is "2" in the unconfirmed information where the kind of unconfirmed information is "new incoming mail". In the third row, it is indicated that the number of cases having higher priority than the short-cut function is "0" and the number of cases having lower priority than the short-cut function is "0" in the unconfirmed information where the kind of unconfirmed information is "message".

In the unconfirmed information report management information as shown in FIGS. 5C to 5E, there is unconfirmed information having lower priority than the short-cut function in the unconfirmed information such as "missed incoming call" or "new incoming mail", which shows that the priority of unconfirmed information set at higher priority than the short-cut key is set to be lower than the short-cut function because the display control process as described using the flowchart of FIG. 6 is already performed.

To simplify the explanation in the following, the display control process performed using the unconfirmed information report management information as shown in FIG. 5E, for example, will be described below.

At step S13, the main control part 31 determines whether or not there is unconfirmed information having higher priority than the short-cut function, based on the read unconfirmed information report management information.

In the case of FIG. 5E, for example, there are two cases of "missed incoming call" as the unconfirmed information having higher priority than the short-cut function, whereby it is determined that there is unconfirmed information having higher priority than the short-cut function.

If it is determined at step S13 that there is unconfirmed information having higher priority than the short-cut function, the main control part 31 controls the LCD control part 36 so that the liquid crystal display may display an icon indicating the unconfirmed information having higher priority than the short-cut function in the high priority unconfirmed information display area on the liquid crystal display 17 at step S14. The liquid crystal display 17 displays an icon indicating the unconfirmed information having higher priority than the short-cut function in the high priority unconfirmed information display area on the liquid crystal display 17 under the control of the LCD control part 36.

Figure 7A:
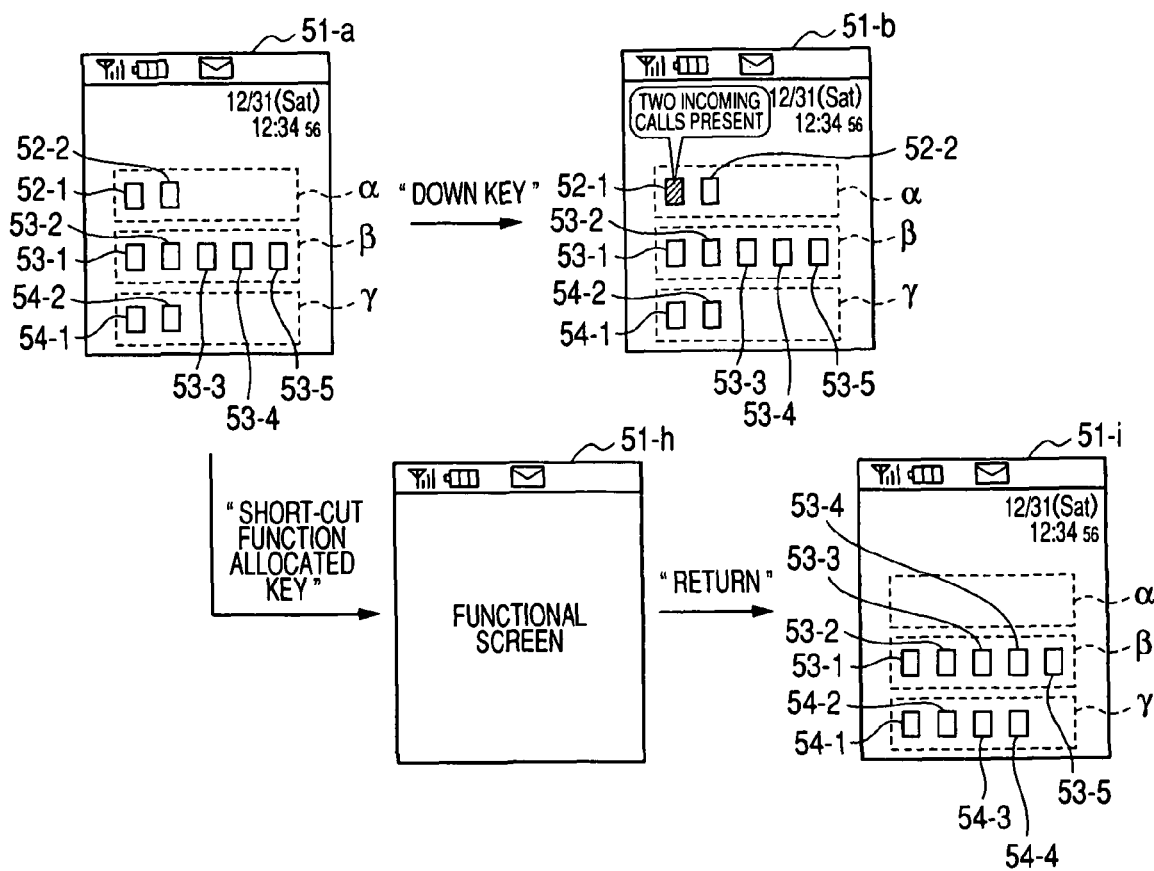
FIGS. 7A to 7D are exemplary transition views of a display screen displayed on the liquid crystal display of FIG. 3.

The icons 52-1 and 52-2 indicating the unconfirmed information having higher priority than the short-cut function are displayed in the high priority unconfirmed information display area α of a display screen 51-a displayed on the liquid crystal display 17, as shown in FIG. 7A, for example. This shows that there are two pieces of unconfirmed information having higher priority than the short-cut function at present. Accordingly, the user can know that there are two pieces of unconfirmed information having higher priority than the short-cut function by seeing the icons 52-1 and 52-2 displayed in the high priority unconfirmed information display area α.

In the case where two or more pieces of unconfirmed information having higher priority than the short-cut function exist and can not be displayed in the high priority unconfirmed information display area α at a time, the most recently stored unconfirmed information may be firstly displayed, and successively slid to the left or right on the liquid crystal display 17 by the user operating the operation key 14. Thereby, even if there are so many pieces of unconfirmed information that can not be displayed in the high priority unconfirmed information display area α at a time, they can be reported to the user successively. A short-cut function display area or a low priority unconfirmed information display area on the standby screen (display screen) as will be described later is also treated in the same manner.

On the other hand, if it is determined at step S13 that there is no unconfirmed information having higher priority than the short-cut function, the display process at step S14 is skipped.

Figure 7B:
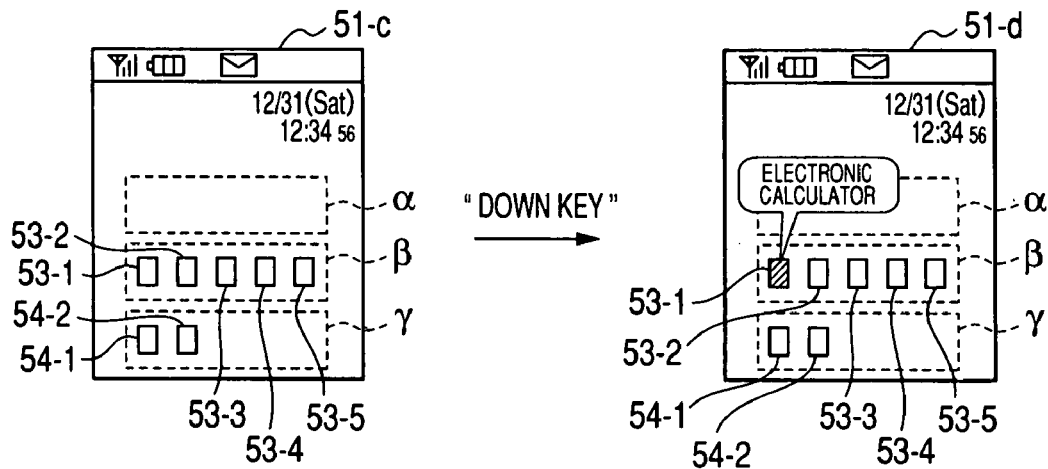

Thereby, no icon indicating the unconfirmed information having higher priority than the short-cut function is displayed in the high priority unconfirmed information display area a of the display screen 51-*c* displayed on the liquid crystal display 17, as shown in FIG. 7B, for example.

At step S15, the main control part 31 reads the settings of the short-cut function prestored in the storage part 47, and determines whether or not the preset short-cut function (e.g., an electronic calculator function, a notepad function, etc.) exists based on the read settings of the short-cut function.

If it is determined at step S15 that the preset short-cut function exists, the main control part 31 controls the LCD control part 36 so that the liquid crystal display may display the icon indicating the preset short-cut function in the short-cut function display area on the liquid crystal display 17 at step S16. The liquid crystal display 17 displays the icon indicating the preset short-cut function in the short-cut function display area on the liquid crystal display 17 under the control of the LCD control part 36.

The icons 53-1 and 53-5 indicating the preset short-cut functions are displayed in the short-cut function display area β of the display screen 51-*a* displayed on the liquid crystal display 17, as shown in FIG. 7A, for example. This shows that there are five preset short-cut functions at present. Accordingly, the user can know that there are five preset short-cut functions by seeing the icons 53-1 and 53-5 displayed in the short-cut function display area β.

On the other hand, if it is determined at step S15 that there is no preset short-cut function, the display process at step S16 is skipped.

Figure 7C:
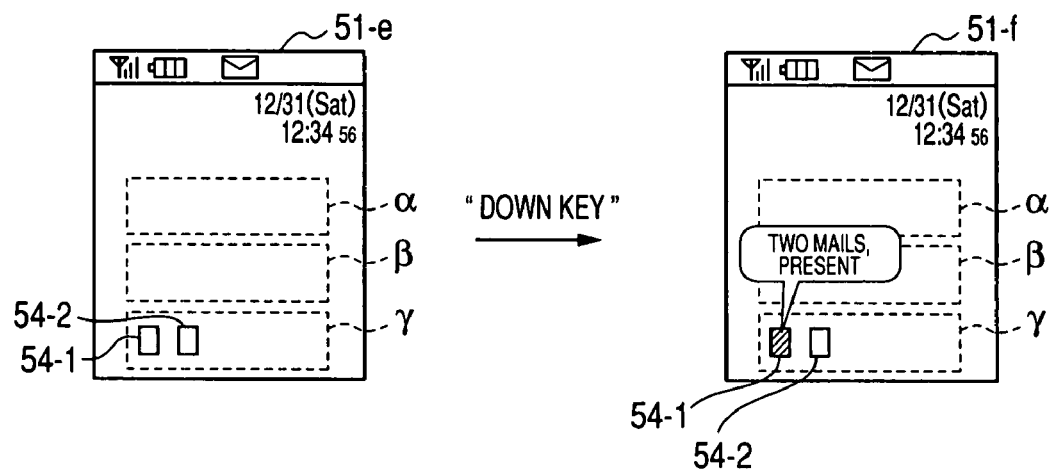

Thereby, no icon indicating the preset short-cut function is displayed in the short-cut function display area β of the display screen 51-*e* displayed on the liquid crystal display 17, as shown in FIG. 7C, for example.

At step S17, the main control part 31 determines whether or not there is unconfirmed information having lower priority than the short-cut function based on the read unconfirmed information report management information.

For example, in the case of FIG. 5E, there are two cases of "new incoming mails" as the unconfirmed information having lower priority than the short-cut function, whereby it is determined that there is unconfirmed information having lower priority than the short-cut function.

If it is determined at step S17 that there is unconfirmed information having lower priority than the short-cut function, the main control part 31 controls the LCD control part 36 so that the liquid crystal display may display the icon indicating the unconfirmed information having lower priority than the short-cut function in the low priority unconfirmed information display area on the liquid crystal display 17 at step S18. The liquid crystal display 17 displays the icon indicating the unconfirmed information having lower priority than the short-cut function in the low priority unconfirmed information display area on the liquid crystal display 17 under the control of the LCD control part 36.

The icons 54-1 and 54-2 indicating the unconfirmed information having lower priority than the short-cut function are displayed in the low priority unconfirmed information display area γ of the display screen 51-*a* displayed on the liquid crystal display 17, as shown in FIG. 7A, for example. This shows that there are two pieces of unconfirmed information having lower priority than the short-cut function at present.

Accordingly, the user can know that there are two pieces of unconfirmed information having lower priority than the short-cut function by seeing the icons 54-1 and 54-2 displayed in the low priority unconfirmed information display area γ.

On the other hand, if it is determined at step S17 that there is no unconfirmed information having lower priority than the short-cut function, the display process at step S18 is skipped.

Figure 7D:
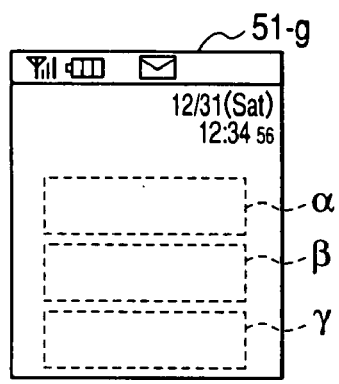

Thereby, no icon indicating the unconfirmed information having lower priority than the short-cut function is displayed in the low priority unconfirmed information display area γ of the display screen 51-*g* displayed on the liquid crystal display 17, as shown in FIG. 7D, for example.

At step S19, the main control part 31 determines whether or not the down key of the operation keys 14, for example, is pressed by the user via the operation input control part 33.

If it is determined at step S19 that the down key of the operation keys 14, for example, is pressed by the user, the main control part 31 determines whether or not there is unconfirmed information having higher priority than the short-cut function based on the read unconfirmed information report management information at step S20.

If it is determined at step S20 that there is unconfirmed information having higher priority than the short-cut function, the main control part 31 controls the LCD control part 36 to focus the icon indicating the unconfirmed information having higher priority than the short-cut function displayed in the high priority unconfirmed information display area on the liquid crystal display 17 at step S21. The liquid crystal display 17 focuses the icon indicating the unconfirmed information having higher priority than the short-cut function displayed in the high priority unconfirmed information display area under the control of the LCD control part 36.

The display screen 51-*a* transfers to the display screen 51-*b*, and the icon 52-1 indicating the unconfirmed information having higher priority than the short-cut function displayed in the high priority unconfirmed information display area α of the display screen 51-*b* is focused, as shown in FIG. 7A, for example. At this time, a message of "incoming call present, two cases", for example, is displayed near the icon 52-1. In this case, both the icons 52-1 and 52-2 are unconfirmed information of "missed incoming call", in which even if any of the icons (e.g., icon 52-1) is focused, it is possible to inform the user that there are two cases of unconfirmed information of "missed incoming call".

If both the icons 52-1 and 52-2 are unconfirmed information of "new incoming mail", a message of "mail present, two cases", for example, is displayed near the icon. Also, in the case where the icon 52-1 is unconfirmed information of "missed incoming call" and the icon 52-2 is unconfirmed information of "new incoming mail", a message of "missed incoming call, one case" is displayed near the icon 52-1, if the icon 52-1 is focused, and a message of "mail present, one case" is displayed near the icon 52-2, if the icon 52-2 is focused.

Of course, the contents of unconfirmed information may be reported to the user by other methods.

If it is determined at step S20 that there is no unconfirmed information having higher priority than the short-cut function, the main control part 31 reads the settings of the short-cut function stored in the storage part 47, and determines whether or not the preset short-cut function exists, based on the read settings of the short-cut function at step S22.

If it is determined at step S22 that the preset short-cut function exists, the main control part 31 controls the LCD control part 36 to focus the icon indicating the short-cut function displayed in the short-cut function display area on the liquid crystal display 17 at step S23. The liquid crystal display 17 focuses the icon indicating the preset short-cut function displayed in the short-cut function display area under the control of the LCD control part 36.

The display screen 51-*c* transfers to the display screen 51-*d*, and the icon 53-1 indicating the preset short-cut function displayed in the short-cut function display area β of the display screen 51-*d* is focused, as shown in FIG. 7B, for example. At this time, a message of "electronic calculator", for example, is displayed near the icon 53-1. Thereby, it is possible to inform the user that the short-cut function indicated by the focused icon 53-1 is "electronic calculator".

On the other hand, if it is determined at step S22 that there is no preset short-cut function, the main control part 31 determines whether or not there is unconfirmed information having lower priority than the short-cut function, based on the read unconfirmed information report management information at step S24.

If it is determined at step S24 that there is unconfirmed information having lower priority than the short-cut function, the main control part 31 controls the LCD control part 36 to focus the icon indicating the unconfirmed information having lower priority than the short-cut function displayed in the low priority unconfirmed information display area on the liquid crystal display 17 at step S25. The liquid crystal display 17 focuses the icon indicating the unconfirmed information having lower priority than the short-cut function displayed in the low priority unconfirmed information display area under the control of the LCD control part 36.

The display screen 51-*e* transfers to the display screen 51-*f*, and the icon 54-1 indicating the unconfirmed information having lower priority than the short-cut function displayed in the low priority unconfirmed information display area γ of the display screen 51-*e* is focused, as shown in FIG. 7C, for example. At this time, a message of "mail present, two cases", for example, is displayed near the icon 54-1. In this case, both the icons 54-1 and 54-2 are unconfirmed information of "new incoming mail", in which even if any of the icons (e.g., icon 54-1) is focused, it is possible to inform the user that there are two cases of unconfirmed information of "new incoming mail".

The detailed description of the message displayed near each icon is fundamentally the same as for the high priority unconfirmed information display area α as described using the display screen 51-*b* of FIG. 7A, and is omitted because the explanation is repeated.

If it is determined at step S24 that there is unconfirmed information having lower priority than the short-cut function, the operation returns to step S19, and the process following the step S19 is repeated.

Herein, the process following the step S26 will be described below, using a transition diagram of the display screen of FIG. 8. The transition diagram of the display screen of FIG. 8 shows the transition of the display screen started from the display screen 51-*a* of FIG. 7A through the display screen 51-*b* of FIG. 7B.

At step S26, the main control part 31 determines whether or not the down key of the operation keys 14, for example, is pressed by the user via the operation input control part 33. If it is determined at step S26 that the down key of the operation keys 14, for example, is pressed by the user, the main control part 31 determines whether or not the icon indicating the unconfirmed information having higher priority than the short-cut function is focused on the display screen displayed on the liquid crystal display 17 at step S27.

Since the icon 52-1 indicating the unconfirmed information having higher priority than the short-cut function is focused on the display screen 51-*b* of FIG. 8, for example, it is determined that the icon indicating the unconfirmed information having higher priority than the short-cut function is focused on the display screen displayed on the liquid crystal display 17.

If it is determined at step S27 that the icon indicating the unconfirmed information having higher priority than the short-cut function is focused, the main control part 31 sets the priority of unconfirmed information set at higher priority than the short-cut function to be lower than the short-cut function at step S28, judging that the use of the short-cut function is given higher priority although the icon indicating the unconfirmed information having higher priority than the short-cut function is displayed and focused because the down key of the operation keys 14, for example, is pressed by the user.

At step S29, the main control part 31 updates the read unconfirmed information report management information. That is, the main control part 31 updates the number of cases of unconfirmed information that is managed in the read unconfirmed information report management information. More specifically, the unconfirmed information report management information as shown in FIG. 5E is updated to the unconfirmed information report management information as shown in FIG. 5F, and the number of cases having higher priority than the short-cut function is updated from "2" to "0" and the number of cases having lower priority than the short-cut function is updated from "0" to "2" in the unconfirmed information where the kind of unconfirmed information is "missed incoming call".

At step S30, the main control part 31 controls the LCD control part 36 to update the display of the icon set at lower priority than the short-cut function displayed in the low priority unconfirmed information display area on the liquid crystal display 17. The liquid crystal display 17 updates the display of the icon set at lower priority than the short-cut function displayed in the low priority unconfirmed information display area of the liquid crystal display 17 under the control of the LCD control part.

For example, in the case of FIG. 8, the display screen 51-*b* transfers to the display screen 55-*a*. On the display screen 55-*a*, the icons 54-3 and 54-4 corresponding to the icons 52-1 and 52-2 displayed in the high priority unconfirmed information display area α of the display screen 51-*b* are additionally displayed in the low priority unconfirmed information display area γ. Thereby, when the user presses the down key of the operation keys 14, for example, the priority of unconfirmed information set at higher priority than the short-cut function is set to be lower than the short-cut function, whereby it is possible to know that the number of cases of unconfirmed information set at lower priority than the short-cut function is 4.

When the icons (e.g., icons 54-3 and 54-4) are added, they may be arranged in time series or by each category of mail or incoming call.

At step S31, the main control part 31 controls the LCD control part 36 to move the position of focus displayed on the liquid crystal display 17. The liquid crystal display 17 moves the position of focus displayed on the liquid crystal display 17 under the control of the LCD control part 36.

For example, in the case of FIG. 8, the display screen 51-*b* transfers to the display screen 55-*a*, so that the position of focus is moved from the icon 52-1 displayed in the high priority unconfirmed information display area to the icon 53-1 displayed in the short-cut function display area β.

Thereby, the user can activate the desired short-cut function immediately without confirming the unconfirmed information having higher priority than the short-cut function, even it the icon is firstly displayed in the high priority unconfirmed information display area on the standby screen, because there is unconfirmed information having higher priority than the short-cut function.

Thereafter, the operation returns to step S26, and the process following the step S26 is repeated.

If it is determined at step S26 that the down key of the operation keys 14, for example, is not pressed by the user, the main control part 31 determines whether or not an up key of the operation keys 14, for example, is pressed by the user via the operation input control part 33 at step S32.

If it is determined at step S32 that the up key of the operation keys 14, for example, is pressed by the user, the operation goes to step S31. A process for moving the focus position is performed at step S31.

For example, in the case of FIG. 8, after the display screen 55-a transfers to the display screen 55-b, if the up key of the operation keys 14, for example, is pressed by the user, the display screen 55-b further transfers to the display screen 55-a. At this time, the position of focus is moved from the icon 54-1 displayed in the low priority unconfirmed information display area γ to the icon 53-1 displayed in the short-cut function display area β. Thereafter, if the up or down key (up key or down key) of the operation keys 14, for example, is pressed by the user while the display screen 55-a or 55-b is displayed, the display screen transfers between the display screens 55-a and 55-b.

If it is determined at step S32 that the up key of the operation keys 14, for example, is not pressed by the user, the main control part 31 determines whether or not the left or right key (left key or right key) of the operation keys 14, for example, is pressed by the user at step S33.

If it is determined at step S33 that the left or right key of the operation keys 14, for example, is pressed by the user, the operation goes to step S31. The process for moving the focus position is performed at step S31.

For example, in the case of FIG. 8, after the display screen 55-b transfers to the display screen 55-a, if the left or right key (right key) of the operation keys 14, for example, is pressed by the user, the display screen 55-a transfers to the display screen 55-c. At this time, the position of focus is moved from the icon 53-1 displayed in the short-cut function display area β to the icon 53-2. Thereafter, if the left or right key of the operation keys 14, for example, is pressed by the user while the display screen 55-a or 55-c is displayed, the display screen transfers between the display screens 55-a and 55-c.

Also, if the left or right key (right key) of the operation keys 14, for example, is pressed by the user while the display screen 55-b is displayed, the display screen 51-b transfers to the display screen 55-d. At this time, the position of focus is moved from the icon 52-1 displayed in the high priority unconfirmed information display area a to the icon 52-2. Thereafter, if the left or right key of the operation keys 14, for example, is pressed by the user while the display screen 51-b or 55-d is displayed, the display screen transfers between the display screens 51-b and 55-d.

Further, after the display screen 51-b transfers via the display screen 55-a to the display screen 55-b, if the left or right key (right key) of the operation keys 14, for example, is pressed by the user, the display screen 55-b transfers to the display screen 55-e. At this time, the position of focus is moved from the icon 54-1 displayed in the low priority unconfirmed information display area γ to the icon 54-2. Thereafter, if the left or right key of the operation keys 14, for example, is pressed by the user while the display screen 55-b or 55-e is displayed, the display screen transfers between the display screens 55-b and 55-e.

Also, after the display screen 51-b transfers via the display screen 55-b to the display screen 55-e, if the left or right key (right key) of the operation keys 14, for example, is pressed by the user, the display screen 55-e transfers to the display screen 55-f. At this time, the position of focus is moved from the icon 54-2 displayed in the low priority unconfirmed information display area γ to the icon 54-3. Thereafter, if the left or right key of the operation keys 14, for example, is pressed by the user while the display screen 55-e or 55-f is displayed, the display screen transfers between the display screens 55-e and 55-f.

If it is determined at step S33 that the left or right key of the operation keys 14, for example, is not pressed by the user, the main control part 31 determines whether or not the settlement key of the operation keys 14, for example, is pressed by the user via the operation input control part 33 at step S34.

If it is determined at step S34 that the settlement key of the operation keys 14, for example, is not pressed by the user, the operation returns to step S26. Thereafter, the process following the step S26 is repeated.

If it is determined at step S34 that the settlement key of the operation keys 14, for example, is pressed by the user, the main control part 31 determines whether or not the icon indicating the unconfirmed information having higher priority than the short-cut function is focused at step S35.

For example, on the display screen 51-b of FIG. 8, since the icon 52-1 indicating the unconfirmed information having higher priority than the short-cut function is focused, it is determined that the icon indicating the unconfirmed information having higher priority than the short-cut function is focused on the display screen displayed on the liquid crystal display 17.

If it is determined at step S35 that the icon indicating the unconfirmed information having higher priority than the short-cut function is focused, the main control part 31 updates the read unconfirmed information report management information at step S36, judging that the confirmation of the unconfirmed information having higher priority than the short-cut function focused on the display screen is dictated because the settlement key of the operation keys 14, for example, is pressed by the user. That is, the main control part 31 updates the number of cases of unconfirmed information managed in the read unconfirmed information report management information.

More specifically, if the settlement key, for example, is pressed by the user while the display screen 51-b is displayed, and the icon 52-1 displayed in the high priority unconfirmed information display area α is focused, the unconfirmed information report management information as shown in FIG. 5E is updated to the unconfirmed information report management information as shown in FIG. 5G, and the number of cases having higher priority than the short-cut function is updated from "2" to "0" in the unconfirmed information where the kind of unconfirmed information is "missed incoming call". If the settlement key, for example, is pressed by the user while the display screen 55-d is displayed, and the icon 52-2 displayed in the high priority unconfirmed information display area α is focused, the process is performed in the same manner.

Thereby, if the confirmation of the unconfirmed information having higher priority than the short-cut function is dictated by the user, the unconfirmed information report management information managing the number of cases of unconfirmed information having higher priority than the short-cut function can be updated. Accordingly, in the following display control process, the report of the unconfirmed information already confirmed by the user can be canceled, based on the updated unconfirmed information report management information.

If it is determined at step S35 that the icon indicating the unconfirmed information having higher priority than the short-cut function is not focused, the processing at step S36 is skipped. That is, the update process for the unconfirmed information report management information at step S36 is not performed.

At step S37, the main control part 31 activates the function associated with the icon forced when the settlement key, for example, is pressed by the user.

For example, in the case of FIG. 8, if the settlement key, for example, is pressed by the user while the display screen 51-*b* is displayed, and the icon 52-1 displayed in the high priority unconfirmed information display area α is focused, the function associated beforehand with the icon 52-1 focused when the settlement key, for example, is pressed by the user is activated, and the display screen 51-*b* transfers to the display screen 55-*g*, so that a call originating or incoming history screen is displayed. Thereafter, various processes for originating or incoming call are performed on the call originating or incoming history screen.

Also, if the settlement key, for example, is pressed by the user while the display screen 55-*d* is displayed, and the icon 52-2 displayed in the high priority unconfirmed information display area α is focused, the function associated beforehand with the icon 52-2 focused when the settlement key, for example, is pressed by the user is activated, and the display screen 51-*b* also transfers to the display screen 55-*g*, so that the call originating or incoming history screen is displayed. Thereafter, various processes for originating or incoming call are performed on the call originating or incoming history screen.

On the other hand, if the settlement key, for example, is pressed by the user while the display screen 55-*a* is displayed, and the icon 53-1 displayed in the short-cut function display area β is focused, the function (electronic calculator function) associated beforehand with the icon 53-1 focused when the settlement key, for example, is pressed by the user is activated, and the display screen 55-*a* transfers to the display screen 55-*h*, so that an electronic calculator function screen is displayed. Thereafter, various computation processes using the electronic calculator are performed oh the electronic calculator function screen.

Also, if the settlement key, for example, is pressed by the user while the display screen 55-*c* is displayed, and the icon 53-2 displayed in the short-cut function display area β is focused, the function (notepad function) associated beforehand with the icon 53-2 focused when the settlement key, for example, is pressed by the user is activated, and the display screen 55-*c* transfers to the display screen 55-*i*, so that a notepad function screen is displayed. Thereafter, a memo input process or recording process is performed on the notepad function screen.

Further, if the settlement key, for example, is pressed by the user while the display screen 55-*e* is displayed, and the icon 54-1 displayed in the low priority unconfirmed information display area γ is focused, the function (mail transmission/reception history function) associated beforehand with the icon 54-1 focused when the settlement key, for example, is pressed by the user is activated, and the display screen 55-*e* transfers to the display screen 55-*j*, so that a mail transmission/reception history screen is displayed. Thereafter, various processes for transmitting or receiving the mail are performed on the mail transmission/reception history screen.

Also, if the settlement key, for example, is pressed by the user while the display screen 5S-f is displayed, and the icon 54-3 displayed in the low priority unconfirmed information display area γ is focused, the function associated beforehand with the icon 54-3 focused when the settlement key, for example, is pressed by the user, is activated, and the display screen 55-*f* transfers to the display screen 55-*k*, so that the call originating or incoming history screen is displayed. Thereafter, various processes for originating or incoming call are performed on the call originating/incoming history screen.

At step S38, the main control part 31 ends the function associated with the icon focused when the settlement key, for example, is pressed by the user.

Thereafter, the operation returns to step S12. The newly updated unconfirmed information report management information is read at step S12, and following the step S13, the display control process is repeatedly performed based on the read unconfirmed information report management information.

For example, in the case where the display screen 55-*g* of FIG. 8 is displayed and the call originating or incoming history function is activated, if the user selects "return" by operating the operation key 14, the display screen 55-1 is displayed on the liquid crystal display 17 through the steps S12 to S18. The icon 52-1 having higher priority than the short-cut function is only displayed in the high priority unconfirmed information display area α of the display screen 55-1, whereby it is indicated that one of two pieces of unconfirmed information is confirmed by the user.

In the case where the display screen 55-*i* of FIG. 8 is displayed and the notepad function is activated, if the user selects "return" by operating the operation key 14, the display screen 55-*m* is displayed on the liquid crystal display 17 through the steps S12 to S18. No icon having higher priority than the short-cut function is displayed in the high priority unconfirmed information display area α of the display screen 55-*m*, while the icons 54-1 to 54-4 having lower priority than the short-cut function are displayed in the low priority unconfirmed information display area γ, whereby it is indicated that there are four pieces of unconfirmed information (unconfirmed information having lower priority than the short-cut function) not yet confirmed by the user.

Further, in the case where the display screen 55-*j* of FIG. 8 is displayed and the mail transmission/reception history function is activated, if the user selects "return" by operating the operation key 14, the display screen 55-*n* is displayed on the liquid crystal display 17 through the steps S12 to S18. No icon having higher priority than the short-cut function is displayed in the high priority unconfirmed information display area α of the display screen 55-*n*, while the icons 54-1, 54-3 and 54-4 having lower priority than the short-cut function are displayed in the low priority unconfirmed information display area γ, whereby it is indicated that there are three pieces of unconfirmed information (unconfirmed information having lower priority than the short-cut function) not yet confirmed by the user.

Also, in the case where the display screen 55-*k* of FIG. 8 is displayed and the call originating/incoming history function is activated, if the user selects "return" by operating the operation key 14, the display screen 55-*o* is displayed on the liquid crystal display 17 through the steps S12 to S1. No icon having higher priority than the short-cut function is displayed in the high priority unconfirmed information display area α of the display screen 55-*o*, while the icons 54-1, 54-2 and 54-4 having lower priority than the short-cut function are displayed in the low priority unconfirmed information display area γ, whereby it is indicated that there are three pieces of unconfirmed information (unconfirmed information having lower priority than the short-cut function) not yet confirmed by the user.

On the other hand, if it is determined at step S19 that the down key of the operation keys 14, for example, is not pressed by the user, the main control part 34 determines whether or not the short-cut function allocated key (e.g., a soft key for activating the mail or browser or a predetermined numeric key for calling, the same below) of the operation keys 14, for example, is pressed by the user via the operation input control part 33 at step S39.

If it is determined at step S39 that the short-cut function allocated key is pressed, the main control part 31 determines at step 40 whether or not there is the unconfirmed information having higher priority than the short-cut function, based on the read unconfirmed information report management information.

For example, in FIG. 5E, there are "2" cases of "missed incoming call" as the unconfirmed information having higher priority than the short-cut function, whereby it is determined that there is the unconfirmed information having higher priority than the short-cut function.

If it is determined at step S40 that there is the unconfirmed information having higher priority than the short-cut function, for example, the main control part 31 sets the priority of unconfirmed information set at higher priority than the short-cut function to be lower than the short-cut function at step S41, judging that the use of the short-cut function is more preferential, because the short-cut function allocated key (e.g., a soft key or a predetermined numeric key) of the operation keys 14, for example, is pressed by the user, although the icon indicating the unconfirmed information having higher priority than the short-cut function is displayed.

At step S42, the main control part 31 updates the number of cases of unconfirmed information managed in the read unconfirmed information report management information. More specifically, the unconfirmed information report management information as shown in FIG. 5E, for example, is updated to the unconfirmed information report management information as shown in FIG. 5F, and the number of cases having higher priority than the short-cut function is updated from "2" to "0" and the number of cases having lower priority than the short-cut function is updated from "0" to "2" in the unconfirmed information where the kind of unconfirmed information is "missed incoming call". That is, all the unconfirmed information having higher priority than the short-cut function is updated to the unconfirmed information having lower priority than the short-cut function in the unconfirmed information where the kind of unconfirmed information is "missed incoming call".

Thereby, the user can not only set the priority of unconfirmed information to be lower than the short-cut function, but also activate the desired short-cut function at the same time, even if the unconfirmed information having higher priority than the short-cut function exists and is displayed in the high priority unconfirmed information display area. Accordingly, the user can properly confirm the unconfirmed information not yet confirmed by seeing the icon indicating the unconfirmed information having lower priority than the short-cut function displayed in the low priority unconfirmed information display area, even after employing the desired short-cut function preferentially.

Of course, all the unconfirmed information having higher priority than the short-cut function is not updated to the unconfirmed information having lower priority than the short-cut function in the unconfirmed information where the kind of unconfirmed information is "missed incoming call", but a part of the unconfirmed information having higher priority than the short-cut function may be updated to the unconfirmed information having lower priority than the short-cut function.

Also, all the unconfirmed information having higher priority than the short-cut function is not updated to the unconfirmed information having lower priority than the short-cut function in the unconfirmed information where the kind of unconfirmed information is "missed incoming call", but the icon indicating the unconfirmed information having higher priority than the short-cut function may be temporarily undisplayed in the high priority unconfirmed information display area to allow the user to employ the desired short-cut function.

At step S43, the main control part 31 activates the short-cut function (e.g., electronic calculator function) allocated to the key (e.g., soft key or predetermined numeric key) pressed by the user.

At this time, the display screen displayed on the liquid crystal display 17 transfers from the display screen 51-*a* to the display screen 51-*h* in FIG. 7A.

At step S44, the main control part 31 ends the short-cut function (e.g., electronic calculator function) allocated to the key (e.g., soft key or predetermined numeric key) pressed by the user.

Thereafter, at step S12, the newly updated unconfirmed information report management information is read, and following the step S13, the display control process is repeatedly performed, based on the read unconfirmed information report management information.

In the case where the short-cut function allocated key (e.g., soft key or predetermined numeric key) of the operation keys 14, for example, is pressed by the user to activate any short-cut function, if the user selects "return" by operating the operation key 14, the display screen 55-*i* transferring from the display screen 51-*h* is displayed on the liquid crystal display 17 through the steps S12 to S18, as shown in FIG. 7A. No icon having higher priority than the short-cut function is displayed in the high priority unconfirmed information display area α of the display screen 55-*i* because the unconfirmed information report management information is updated, while the icons 54-1 to 54-4 having lower priority than the short-cut function are displayed in the low priority unconfirmed information display area γ, whereby it is indicated that there are four pieces of unconfirmed information (unconfirmed information having lower priority than the short-cut function) not yet confirmed by the user.

In the embodiment, when the standby screen is displayed, the high priority unconfirmed information display area, the short-cut function display area and the low priority unconfirmed information display area are provided on the standby screen, whereby the icon indicating the unconfirmed information having higher priority than the short-cut function is displayed in the high priority unconfirmed information display area on the display screen (standby screen), the icon indicating the preset short-cut function is displayed in the short-cut function display area on the display screen (standby screen), and the icon indicating the unconfirmed information having lower priority than the short-cut function is displayed in the low priority unconfirmed information display area on the display screen (standby screen).

And if the down key of the operation keys 14, for example, is pressed by the user while the icon indicating the unconfirmed information displayed in the high priority unconfirmed information display area is focused, the priority of unconfirmed information set at higher priority than the short-cut function can be set to be lower than the short-cut function, judging that the use of the short-cut function is more preferential although the icon indicating the unconfirmed information having higher priority than the short-cut function is displayed and focused. Also, if the short-cut function allocated key (e.g., soft key or predetermined numeric key) of the operation keys 14, for example, is pressed by the user while the icon indicating the unconfirmed information displayed in the high priority unconfirmed information display area is focused, the priority of unconfirmed information set at higher priority than the short-cut function can be set to be lower than the short-cut function, judging that the use of the short-cut function is more preferential although the icon indicating the unconfirmed information having higher priority than the short-cut function is displayed. Also, the unconfirmed information report management information stored in the storage part 47 can be updated based on the set priority. Further, if the settlement key of the operation keys 14, for example, is pressed by the user while the icon indicating the unconfirmed information displayed in the high priority unconfirmed information display area is focused, the number of cases of unconfirmed information managed in the read unconfirmed information report management information can be updated, judging that the confirmation of the short-cut function having higher priority than the short-cut function focused on the display screen is dictated.

Thereby, the display of the icons in the high priority unconfirmed information display area and the low priority unconfirmed information display area on the display screen displayed on the liquid crystal display 17 can be updated, and the icon displayed in each display area (high priority unconfirmed information display area, short-cut function display area and low priority unconfirmed information display area) on the display screen (standby screen) can be properly focused.

Accordingly, the user can activate the desired short-cut function at once without confirming the unconfirmed information having higher priority than the short-cut function, even if the icon is firstly displayed in the high priority unconfirmed information display area on the standby screen, because there is unconfirmed information having higher priority than the short-cut function.

As a result, the operability of the portable telephone 1 can be improved.

By the way, in the display control process for the portable telephone 1 as described with reference to the flowchart of FIG. 6, the high priority unconfirmed information display area, the short-cut function display area and the low priority unconfirmed information display area are provided on the standby screen (display screen), and the icon indicating the unconfirmed information having higher priority than the short-cut function is displayed in the high priority unconfirmed information display area to report the unconfirmed information having higher priority than the short-cut function to the user. However, the invention is not limited to the above-described embodiment, but a popup display, for example, may be employed to report the unconfirmed information having higher priority than the short-cut function to the user. The display control process for the portable telephone 1 using this method will be described below.

Referring to the flowcharts of FIGS. 9 and 10, another display control process in the portable telephone 1 of FIG. 3 will be described below. This display control process is started, when the user operates the portable telephone 1, for example, when the portable telephone 1 is turned from the closed state to the open state, or when the portable telephone 1 is kept open beyond a predetermined time (e.g., one minute) to turn off the light of the liquid crystal display 17 and make the portable telephone 1 standby, and then the user operates the operation key 14 provided on the portable telephone 1 to turn on the light of the liquid crystal display 17.

At step S51, the main control part 31 controls the LCD control part 36 to display the standby screen preset by the user (or a default standby screen if it is not preset by the user) on the liquid crystal display 17. The liquid crystal display 17 controls the LCD control part 36 to display the standby screen preset by the user.

At step S52, the main control part 31 reads the unconfirmed information report management information stored in the storage part 47. The detailed description of the read unconfirmed information report management information is fundamentally the same as that at step S12 of FIG. 6, and is omitted because the explanation is repeated. To simplify the explanation, the display control process performed using the unconfirmed information report management information as shown in FIG. 5H, for example, will be described below.

At step S53, the main control part 31 determines whether or not there is unconfirmed information having higher priority than the short-cut function based on the read unconfirmed information report management information.

For example, in the case of FIG. 5E, there are two cases of "missed incoming call" as the unconfirmed information having higher priority than the short-cut function, whereby it is determined that there is unconfirmed information having higher priority than the short-cut function.

If it is determined at step S53 that there is unconfirmed information having higher priority than the short-cut function, the main control part 31 controls the LCD control part 36 to popup display the icon indicating the unconfirmed information having higher priority than the short-cut function on the liquid crystal display at step S54. The liquid crystal display 17 popup displays the icon indicating the unconfirmed information having higher priority than the short-cut function under the control of the LCD control part 36.

The icon 57 indicating the unconfirmed information having higher priority than the short-cut function is popup displayed on the display screen 56-*a* displayed on the liquid crystal display 17, as shown in FIG. 11A, for example. This shows that there are unconfirmed information having higher priority than the short-cut function at present, including "10" cases of "missed incoming call", "5" cases of "new incoming mail", and "3" cases of "message (simple absence memo)". Accordingly, the user can know that there are unconfirmed information having higher priority than the short-cut function, including "10" cases of "missed incoming call", "5" cases of "new incoming mail", and "3" cases of "message (simple absence memo)", by seeing the icon 57 displayed on the display screen 56-*a*.

When the icon 57 indicating the unconfirmed information having higher priority than the short-cut function is popup displayed on the display screen 56-*a* displayed on the liquid crystal display 17, a partial area (e.g., area of "incoming call present, 10 cases") of the icon 57 is focused as shown in FIG. 11A, for example.

On the other hand, if it is determined at step S53 that there is no unconfirmed information having higher priority than the short-cut function, the display process at step S54 is skipped.

Thereby, no icon indicating the unconfirmed information having higher priority than the short-cut function is popup displayed on the display screen 56-*b* displayed on the liquid crystal display 17, as shown in FIG. 11B, for example.

At step S85, the main control part 31 reads the settings of the short-cut function prestored in the storage part 47, and determines whether or not the preset short-cut function (e.g., an electronic calculator function or a notepad function) exists based on the settings of the read short-cut function.

If it is determined at step S55 that the preset short-cut function exists, the main control part 31 controls the LCD control part 36 so that the liquid crystal display may display the icon indicating the preset short-cut function in the short-cut function display area on the liquid crystal display 17 at step S56. The liquid crystal display 17 displays the icon indicating the preset short-cut function in the short-cut function display area on the liquid crystal display 17 under the control of the LCD control part 36.

The icons 53-1 to 53-5 indicating the preset short-cut function are displayed in the short-cut function display area β of the display screen 56-a displayed on the liquid crystal display 17, as shown in FIG. 11B, for example. This shows that there are five preset short-cut functions at present. Accordingly, the user can know that there are five preset short-cut functions by seeing the icons 53-1 to 53-5 displayed in the short-cut function display area β.

On the other hand, if it is determined at step S55 that there is no preset short-cut function, the display process at step S56 is skipped.

Thereby, no icon indicating the preset short-cut function is displayed in the short-cut function display area β of the display screen 56-c displayed on the liquid crystal display 17, as shown in FIG. 1C, for example.

At step S57, the main control part 31 determines whether or not there is unconfirmed information having lower priority than the short-cut function based on the read unconfirmed information report management information.

For example, in the case of FIG. 5H, there are two cases of "new incoming mail" as the unconfirmed information having lower priority than the short-cut function, whereby it is determined that there is unconfirmed information having lower priority than the short-cut function.

If it is determined at step S57 that there is unconfirmed information having lower priority than the short-cut function, the main control part 31 controls the LCD control part 36 so that the liquid crystal display may display the icon indicating the unconfirmed information having lower priority than the short-cut function in the low priority unconfirmed information display area on the liquid crystal display 17 at step S58. The liquid crystal display 17 displays the icon indicating the unconfirmed information having lower priority than the short-cut function in the low priority unconfirmed information display area on the liquid crystal display 17 under the control of the LCD control part 36.

The icons 54-1 and 54-2 indicating the unconfirmed information having lower priority than the short-cut function are displayed in the low priority unconfirmed information display area γ of the display screen 56-a displayed on the liquid crystal display 17, as shown in FIG. 11A, for example. This shows that there are two pieces of unconfirmed information having lower priority than the short-cut function at present. Accordingly, the user can know that there are two pieces of unconfirmed information having lower priority than the short-cut function by seeing the icons 54-1 and 54-2 displayed in the low priority unconfirmed information display area γ.

On the other hand, if it is determined at step S57 that there is no unconfirmed information having lower priority than the short-cut function, the display process at step S58 is skipped.

Thereby, no icon indicating the unconfirmed information having lower priority than the short-cut function is displayed in the low priority unconfirmed information display area γ of the display screen 56-d displayed on the liquid crystal display 17, as shown in FIG. 11D, for example.

Herein, the process following the step S59 will be described below using a transition diagram of the display screen of FIG. 12. The transition diagram of the display screen of FIG. 12 represents the transition of the display screen started from the display screen 56-a of FIG. 11A.

At step S59, the main control part 31 determines whether or not the up or down key of the operation keys 14, for example, is pressed by the user via the operation input control part 33.

If it is determined at step S59 that the up or down key of the operation keys 14, for example, is pressed by the user, the main control part 31 determines whether or not the icon indicating the unconfirmed information having higher priority than the short-cut function is popup displayed on the display screen displayed on the liquid crystal display 17 at step S60.

If it is determined at step S60 that the icon indicating the unconfirmed information having higher priority than the short-cut function is popup displayed, the main control part 31 controls the LCD control part 36 to move the position of focus displayed on the liquid crystal display 17 at step S61. The liquid crystal display 17 moves the position of focus displayed on the liquid crystal display 17 under the control of the LCD control part 36.

For example, in FIG. 12, if the down key of the operation keys 14, for example, is pressed by the user, the display screen 56-a transfers to the display screen 58-a, whereby the position of focus is moved from the area of "incoming call present, 10 cases" to the area of "E mail present, 5 cases" for the icon 57 that is popup displayed.

If the down key of the operation keys 14, for example, is further pressed by the user, the position of focus is moved from the area of "E mail present, 5 cases" to the area of "simple absence memo" for the icon 57 that is popup displayed. Also, if the up or down key of the operation keys 14, for example, is further pressed by the user, the position of focus is moved to any of the area of "incoming call, 10 cases", the area of "E mail present, 5 cases" and the area of "simple absence memo" for the icon 57 that is popup displayed.

At step S62, the main control part 31 determines whether or not the settlement key of the operation keys 14, for example, is pressed by the user via the operation input control part 33. If it is determined at step S62 that the settlement key of the operation keys 14, for example, is pressed by the user, the main control part 31 activates the function (e.g., mail transmission/reception history function, call originating/incoming history function, electronic calculator function, etc.) associated before hand with the icon (or a partial area of the icon) focused when the settlement key, for example, is pressed by the user at step S63.

For example, in FIG. 12, when the display screen 57-a is displayed and the area of "E mail, 5 cases" for the icon 57 that is popup displayed is focused, if the settlement key, for example, is pressed by the user, the function (mail transmission/reception history function) associated beforehand with the area of "E mail, 5 cases" of the icon 57 focused when the settlement key, for example, is pressed by the user is activated, so that the display screen 58-a transfers to the display screen 58-b, whereby the mail transmission/reception history screen is displayed. Thereafter, various processes for mail transmission/reception are performed on the mail transmission/reception history screen.

More specifically, the contents of desired two cases of mail are displayed among five cases of new incoming mail, for example, using the mail transmission/reception history screen of the display screen 58-b, whereby the user confirms the two cases of new incoming mail. At this time, three cases of new incoming mail not confirmed by the user are still managed as the unconfirmed information having higher priority than the short-cut function. Of course, three cases of new incoming mail not confirmed by the user are set at lower priority than the short-cut function, judging that they are not confirmed by the user although they are displayed on the mail transmission/reception history screen, whereby the icon indicating the unconfirmed information is additionally displayed in the low priority unconfirmed information display area through the following display control process.

Also, in the case where the display screen 56-*a* is displayed and the area of "incoming call present, 10 cases" for the icon 57 that is popup displayed is focused, if the settlement key, for example, is pressed by the user, the function (call originating/incoming history function) associated beforehand with the area of "incoming call present, 10 cases" for the icon 57 focused when the settlement key, for example, is pressed by the user is activated, so that the display screen 56-*a* transfers to the display screen 58-*c*, where the call originating/incoming history screen is displayed. Thereafter, various processes for call originating/incoming are performed on the call originating/incoming history screen.

More specifically, the contents of desired three cases of missed incoming call are displayed among ten cases of missed incoming call, for example, using the call originating/incoming history screen of the display screen 58-*c*, whereby the user confirms the three cases of missed incoming call.

At step S64, the main control part 31 ends the function (e.g., mail transmission/reception history function, call originating/incoming history function, etc.) associated beforehand with the icon (or a partial area of the icon) focused when the settlement key, for example, is pressed by the user.

At step S65, the main control part 31 determines whether or not the icon indicating the unconfirmed information having higher priority than the short-cut function is focused.

For example, on the display screen 58-*b* or 58-*c* of FIG. 12, since the icon 57 indicating the unconfirmed information having higher priority than the short-cut function is focused on the passing display screen 56-*a* or 58-*a*, it is determined that the icon indicating the unconfirmed information having higher priority than the short-cut function is focused on the display screen displayed on the liquid crystal display 17.

If it is determined at step S65 that the icon indicating the unconfirmed information having higher priority than the short-cut function is focused, the main control part 31 updates the number of cases of unconfirmed information managed in the read unconfirmed information report management information at step S66, judging that the confirmation of unconfirmed information having higher priority than the short-cut function focused on the display screen is dictated when the settlement key of the operation keys 14, for example, is pressed by the user.

More specifically, when the display screen 58-*a* is displayed and the area of "E mail, 5 cases" for the icon 57 that is popup displayed is focused, if the settlement key, for example, is pressed by the user, the unconfirmed information report management information as shown in FIG. 5H is updated to the unconfirmed information report management information as shown in FIG. 5I, for example, whereby the number of cases having higher priority than the short-cut function in the unconfirmed information where the kind of unconfirmed information is "new incoming mail" is updated from "5" to "3".

Also, when the display screen 56-*a* is displayed and the area of "incoming call present, 10 cases" for the icon 57 that is popup displayed is focused, if the settlement key, for example, is pressed by the user, the unconfirmed information report management information as shown in FIG. 5H is updated to the unconfirmed information report management information as shown in FIG. 5J, for example, whereby the number of cases having higher priority than the short-cut function in the unconfirmed information where the kind of unconfirmed information is "new incoming mail" is updated from "10" to "7".

Thereby, if the user confirms the unconfirmed information having higher priority than the short-cut function, the unconfirmed information report management information managing the number of cases of unconfirmed information having higher priority than the short-cut function can be updated. Accordingly, the report of the unconfirmed information already confirmed by the user can be canceled, based on the updated unconfirmed information report management information, in the following display control process.

If it is determined at step S65 that the icon indicating the unconfirmed information having higher priority than the short-cut function is not focused, the processing at step S66 is skipped. That is, the update process for unconfirmed information report management information at step S66 is not performed.

Thereafter, the operation returns to step S52. At step S52, the newly updated unconfirmed information report management information is read, and following the step S53, the display control process is repeatedly performed based on the read unconfirmed information report management information.

For example, in the case where the display screen 58-*b* of FIG. 12 is displayed, and the mail transmission/reception history function is activated, if the user selects "return" by operating the operation key 14, the display screen 58-*d* is displayed on the liquid crystal display 17 through the process from steps S52 to S58, whereby the icon 57 indicating the unconfirmed information having higher priority than the short-cut function is popup displayed. This shows that there are unconfirmed information having higher priority than the short-cut function at present, including "10," cases of "missed incoming call", "3" cases of "new incoming mail", and "3" cases of "message (simple absence memo)". Accordingly, the user can know that there are unconfirmed information having higher priority than the short-cut function, including "10" cases of "missed incoming call", "3" cases of "new incoming mail", and "3" cases of "message (simple absence memo)", by seeing the icon 57 displayed on the display screen 58-*d*. The icon 52-1 having higher priority than the short-cut function is only displayed in the high priority unconfirmed information display area a of the display screen 58-*d*, which shows that one of two pieces of unconfirmed information is confirmed by the user.

For example, in the case where the display screen 58-*c* of FIG. 12 is displayed, and the call originating/incoming history function is activated, if the user selects "return" by operating the operation key 14, the display screen 58-*e* is displayed on the liquid crystal display 17 through the process from steps S52 to S58, whereby the icon 57 indicating the unconfirmed information having higher priority than the short-cut function is popup displayed. This shows that there is unconfirmed information having higher priority than the short-cut function at present, including "7" cases of "missed incoming call", "5" cases "new incoming mail", and "3" cases of "message (simple absence memo)". Accordingly, the user can know that there is unconfirmed information having higher priority than the short-cut function, including "7" cases of "missed incoming call", "5" cases of "new incoming mail", and "3" cases of "message (simple absence memo)", by seeing the icon 57 displayed on the display screen 58-*e*.

On the other hand, if it is determined at step S60 that the icon indicating the unconfirmed information having higher priority than the short-cut function is not popup displayed, the main control part 31 reads the settings of the short-cut function stored in the storage part 47 and determines whether or not the preset short-cut function exists based on the read settings of the short-cut function at step S67.

If it is determined at step S67 that the preset short-cut function exists, the main control part 31 controls the LCD control part 36 to focus the icon indicating the short-cut function displayed in the short-cut function display area on the liquid crystal display 17 at step S68. The liquid crystal display 17 focuses the icon indicating the preset short-cut function displayed in the short-cut function display area under the control of the LCD control part 36.

The display screen 56-*b* transfers to the display screen 56-*e*, whereby the icon 53-1 indicating the preset short-cut function displayed in the short-cut function display area β of the display screen 56-*e* is focused, as shown in FIG. 11B, for example. At this time, a message of "electronic calculator" is displayed near the icon 53-1. Thereby, the user can be informed that the short-cut function indicated by the focused icon 53-1 is the "electronic calculator".

On the other hand, if it is determined at step S67 that the preset short-cut function does not exist, the main control part 31 determines at step S69 whether or not there is unconfirmed information having lower priority than the short-cut function, based on the read unconfirmed information report management information.

If it is determined at step S69 that there is unconfirmed information having lower priority than the short-cut function, the main control part 31 controls the LCD control part 36 to focus the icon indicating the unconfirmed information having lower priority than the short-cut function displayed in the low priority unconfirmed information display area on the liquid crystal display 17 at step S70. The liquid crystal display 17 focuses the icon indicating the unconfirmed information having lower priority than the short-cut function displayed in the low priority unconfirmed information display area under the control of the LCD control part 36.

The display screen 56-*c* transfers to the display screen 56-*f*, and the icon 54-1 indicating the unconfirmed information having lower priority than the short-cut function displayed in the low priority unconfirmed information display area γ of the display screen 56-*f* is focused, as shown in FIG. 11C, for example. At this time, a message of "mail present, two cases", for example, is displayed near the icon 54-1.

The detailed description of the message displayed near each icon is fundamentally the same as for the high priority unconfirmed information display area α as described using the display screen 51-*b* of FIG. 7A, and is omitted because the explanation is repeated.

If it is determined at step S69 that there is unconfirmed information having lower priority than the short-cut function, the operation returns to step S59, and the process following the step S59 is repeated.

Herein, the process following the step S71 will be described below using a transition diagram of the display screen of FIG. 11B.

The main control part 31 determines at step S71 whether or not the up or down key of the operation keys 14, for example, is pressed by the user via the operation input control part 33. If it is determined at step S71 that the up or down key of the operation keys 14, for example, is pressed by the user, the main control part 31 controls the LCD control part 36 to move the position of focus displayed on the liquid crystal display 17 at step S72. The liquid crystal display 17 moves the position of focus displayed on the liquid crystal display 17 under the control of the LCD control part 36.

For example, in the case of FIG. 11B, the display screen 56-*e* transfers to the display screen 56-*g*, whereby the position of focus is moved from the icon 53-1 displayed in the short-cut function display area β to the icon 54-1 displayed in the low priority unconfirmed information display area γ. Thereafter, if the up or down key of the operation keys 14, for example, is pressed by the user while the display screen 56-*e* or 56-*g* is displayed, the display screen transfers between the display screens 56-*e* and 56-*g*.

Thereafter, the operation returns to step S71, whereby the process following the step S71 is repeated.

If it is determined at step S71 that the up or down key of the operation keys 14, for example, is not pressed by the user, the main control part 31 determines at step S73 whether or not the left or right key of the operation keys 14, for example, is pressed by the user via the operation input control part 33.

If it is determined at step S73 that the left or right key of the operation keys 14, for example, is pressed by the user, the operation goes to step S72. A moving process for the focus position is performed at step S72.

For example, in the case of FIG. 11B, the display screen 56-*e* transfers to the display screen 56-*h*, whereby the position of focus is moved from the icon 53-1 displayed in the short-cut function display area β to the icon 53-2. Thereafter, if the left or right key (right key or left key) of the operation keys 14, for example, is pressed by the user while the display screen 56-*e* or 56-*h* is displayed, the display screen transfers between the display screens 56-*e* and 56-*h*.

If it is determined at step S73 that the left or right key of the operation keys 14, for example, is not pressed by the user, the main control part 31 determines at step S74 whether or not the settlement key of the operation keys 14, for example, is pressed by the user via the operation input control part 33.

If it is determined at step S74 that the settlement key of the operation keys 14, for example, is not pressed by the user, the operation returns to step S71, whereby the process following the step S71 is repeated.

If it is determined at step S74 that the settlement key of the operation keys 14, for example, is pressed by the user, the operation goes to step S63. A function activation process is performed at step S63.

For example, in the case of FIG. 11B, when the display screen 56-*g* is displayed and the icon 54-1 displayed in the low priority unconfirmed information display area γ is focused, if the settlement key, for example, is pressed by the user, the function (mail transmission/reception history function) associated beforehand with the icon 57 focused when the settlement key, for example, is pressed by the user is activated, and the display screen 56-*g* transfers to the display screen 56-*i*, where the mail transmission/reception history screen is displayed. Thereafter, various processes for mail transmission/reception are performed on the mail transmission/reception history screen.

Also, when the display screen 56-*h* is displayed and the icon 53-2 displayed in the short-cut function display area β is focused, if the settlement key, for example, is pressed by the user, the function (notepad function) associated beforehand with the icon 53-2 focused when the settlement key, for example, is pressed by the user is activated, so that the display screen 56-*h* transfers to the display screen 56-*j*, where the notepad function screen is displayed. Thereafter, a memo input process or recording process is performed on the notepad function screen.

Thereafter, the operation returns to step S52. The newly updated unconfirmed information report management information is read at step S52, and following the step S53, the display control process is repeatedly performed based on the read unconfirmed information report management function.

For example, in the case where the display screen 56-*i* of FIG. 12 is displayed, and the mail transmission/reception history function is activated, if the user selects "return" by operating the operation key 14, the display screen 56-*k* is displayed on the liquid crystal display 17 through the process from steps S52 to S58. The icon 54-2 having lower priority than the short-cut function is only displayed in the low priority unconfirmed information display area γ of the display screen 56-*k*, which shows that one unconfirmed information (unconfirmed information having lower priority than the short-cut function) not yet confirmed by the user exists.

Also, for example, in the case where the display screen 56-*j* of FIG. 12 is displayed, and the notepad function is activated, if the user selects "return" by operating the operation key 14, the display screen 56-*l* is displayed on the liquid crystal display 17 through the process from steps S52 to S58. The icons 54-1 and 54-2 having lower priority than the short-cut function are displayed in the low priority unconfirmed information display area γ of the display screen 56-*l*, which shows that two pieces of unconfirmed information (unconfirmed information having lower priority than the short-cut function) not yet confirmed by the user exist.

On the other hand, if it is determined at step S59 that the up or down key of the operation keys 14, for example, is not pressed by the user, the main control part 34 determines at step S75 whether or not the short-cut function allocated key (e.g., a soft key or a predetermined numeric key), for example, is pressed by the user via the operation input control part 33.

If it is determined at step S75 that the short-cut function allocated key, for example, is pressed, the main control part 31 determines at step 76 whether or not there is the unconfirmed information having higher priority than the short-cut function, based on the read unconfirmed information report management information.

For example, in the case of FIG. 5H, there are "10" cases of "missed incoming call" as the unconfirmed information having higher priority than the short-cut function, whereby it is determined that there is the unconfirmed information having higher priority than the short-cut function.

If it is determined at step S76 that there is the unconfirmed information having higher priority than the short-cut function, for example, the main control part 31 sets the priority of unconfirmed information set at higher priority than the short-cut function to be lower than the short-cut function at step S77, judging that the use of the short-cut function is more preferential, because the short-cut function allocated key (e.g., a soft key or a predetermined numeric key) of the operation keys 14, for example, is pressed by the user, although the icon indicating the unconfirmed information having higher priority than the short-cut function is popup displayed.

At step S78, the main control part 31 updates the number of cases of unconfirmed information managed in the read unconfirmed information report management information. More specifically, the unconfirmed information report management information as shown in FIG. 5H, for example, is updated to the unconfirmed information report management information as shown in FIG. 5K, and the number of cases having higher priority than the short-cut function is updated from "10" to "0" and the number of cases having lower priority than the short-cut function is updated from "0" to "10" in the unconfirmed information where the kind of unconfirmed information is "missed incoming call". The number of cases having higher priority than the short-cut function is updated from "5" to "0" and the number of cases having lower priority than the short-cut function is updated from "2" to "7" in the unconfirmed information where the kind of unconfirmed information is "new incoming mail". The number of cases having higher priority than the short-cut function is updated from "3" to "0" and the number of cases having lower priority than the short-cut function is updated from "0" to "3" in the unconfirmed information where the kind of unconfirmed information is "message".

At step S79, the main control part 31 activates the short-cut function (e.g., an electronic calculator function) allocated to the key (e.g., a soft key or a predetermined numeric key) pressed by the user.

At this time, the display screen displayed on the liquid crystal display 17 transfers from the display screen 56-*a* to the display screen 56-*m* in FIG. 11A.

At step S80, the main control part 31 ends the short-cut function (e.g., electronic calculator function) allocated to the key (e.g., soft key or predetermined numeric key) pressed by the user.

Thereafter, at step S52, the newly updated unconfirmed information report management information is read, and following the step S3, the display control process is repeatedly performed based on the read unconfirmed information report management information.

In the case where any short-cut key is activated when the short-cut function allocated key (e.g., soft key or predetermined numeric key) of the operation keys 14, for example, is pressed by the user, if the user selects "return" by operating the operation key 14, the display screen 56-*n* transferring from the display screen 56-*m* is displayed on the liquid crystal display 17 through the process from steps S52 to S58, as shown in FIG. 11A. Since the unconfirmed information report management information is updated, the icons 54-3 to 54-5 are additionally displayed, besides the icons 54-1 and 54-2 having lower priority than the short-cut function, in the low priority unconfirmed information display area γ of the display screen 56-*n*, which shows that at least five pieces of unconfirmed information (unconfirmed information having lower priority than the short-cut function) not yet confirmed by the user exist.

As described above, in the case where two or more pieces of unconfirmed information having lower priority than the short-cut function exist and can not be displayed in the low priority unconfirmed information display area γ at a time, the most recently stored unconfirmed information is firstly displayed, and successively slid to the left or right on the liquid crystal display 17 by the user operating the operation key 14. In the case of the display screen 56-*n* of FIG. 11A, a total of twenty (10+7+3=20) icons are actually displayed in the low priority unconfirmed information display area γ. Thereby, even if there are so many pieces of unconfirmed information that can not be displayed in the low priority unconfirmed information display area γ at a time, they can be reported to the user successively.

Figure 10:
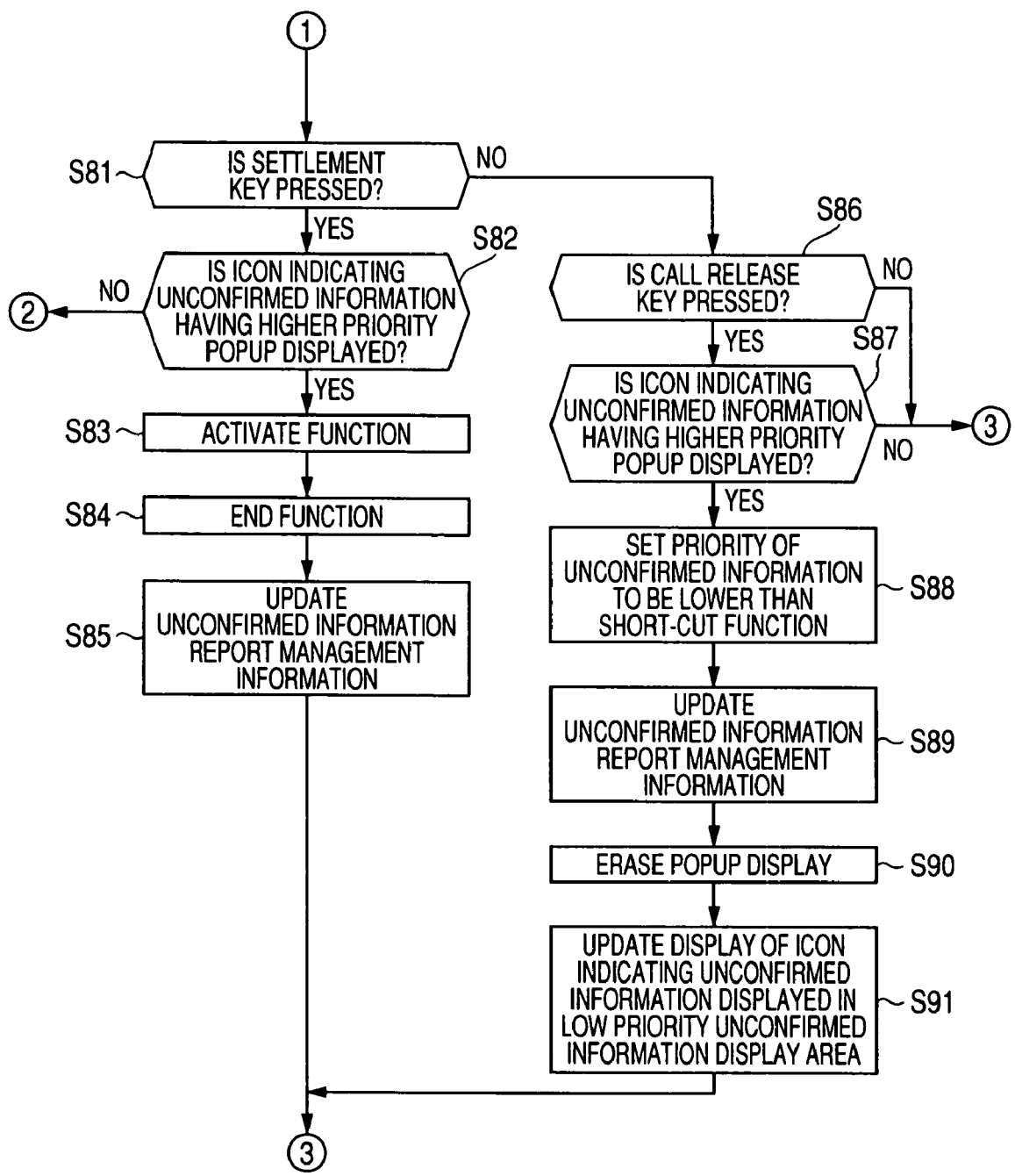
FIG. 10 is an exemplary flowchart for explaining another display control process in the portable telephone 1 of FIG. 3.

On the other hand, if it is determined at step S75 that the short-cut function allocated key, for example, is not pressed, the operation goes to step S81 of FIG. 10. The main control part 31 determines at step 81 whether or not the settlement key of the operation keys 14, for example, is pressed by the user via the operation input control part 33.

If it is determined at step S81 that the settlement key of the operation keys 14, for example, is pressed by the user, the main control part 31 determines at step S82 whether or not the icon indicating the unconfirmed information having higher priority than the short-cut function is popup displayed on the display screen displayed on the liquid crystal display 17.

For example, on the display screen 56-*a* of FIG. 11, since the icon 57 indicating the unconfirmed information having higher priority than the short-cut function is focused, it is determined that the icon indicating the unconfirmed information having higher priority than the short-cut function is focused on the display screen displayed on the liquid crystal display 17.

If it is determined at step S82 that the icon 57 indicating the unconfirmed information having higher priority than the short-cut function is not popup displayed, the main control part 31 invalidates the operation that the settlement key of the operation keys 14, for example, is pressed by the user. Thereafter, the operation returns to step S59, whereby the process following the step S59 is repeated.

If it is determined at step S82 that the icon indicating the unconfirmed information having higher priority than the short-cut function is popup displayed, the main control part 31 activates the function (e.g., mail transmission/reception history function, call originating/incoming history function, electronic calculator function, etc.) associated beforehand with the icon (or a partial area of the icon) focused when the settlement key, for example, is pressed by the user at step S83.

For example, in FIG. 12, when the display screen 56-*a* is displayed and the area of "incoming call present, 10 cases" of the icon 57 popup displayed is focused, if the settlement key, for example, is pressed by the user, the function (call originating/incoming history function) associated beforehand with the area of "incoming call present, 10 cases" for the icon 57 focused when the settlement key, for example, is pressed by the user is activated, and the display screen 56-*a* transfers to the display screen 58-*c*, where the call originating/incoming history screen is displayed. Thereafter, various processes for call origination/incoming are performed on the call originating/incoming history screen.

More specifically, the contents of desired three cases of missed incoming call among ten cases of missed incoming call, for example, are displayed, using the call originating/incoming history screen of the display screen 58-*c*, whereby the user confirms the three cases of missed incoming call.

At step S84, the main control part 31 ends the function (e.g., mail transmission/reception history function, call originating/incoming history function, etc.) associated beforehand with the icon (or a partial area of the icon) focused when the settlement key, for example, is pressed by the user.

At step S85, the main control part 31 updates the number of cases of unconfirmed information managed in the read unconfirmed information report management information, judging that the confirmation of unconfirmed information having higher priority than the short-cut function focused on the display screen is dictated when the settlement key of the operation keys 14, for example, is pressed by the user.

More specifically, when the display screen 56-*a* is displayed and the area of "incoming call present, 10 cases" for the icon 57 popup displayed is focused, if the settlement key, for example, is pressed by the user, the unconfirmed information report management information as shown in FIG. 5H is updated to the unconfirmed information report management information as shown in FIG. 5J, for example, and the number of cases having higher priority than the short-cut function is updated from "10" to "7" in the unconfirmed information where the kind of unconfirmed information is "missed incoming call".

Thereby, if the unconfirmed information having higher priority than the short-cut function is confirmed by the user, the unconfirmed information report management information managing the number of cases of unconfirmed information having higher priority than the short-cut function can be updated. Accordingly, the report of the unconfirmed information already confirmed by the user can be canceled, based on the updated unconfirmed information report management information in the following display control process.

Thereafter, the operation goes to step S52. The newly updated unconfirmed information report management information is read at step S52, and following the step S53, the display control process is repeatedly performed based on the read unconfirmed information report management information.

On the other hand, if it is determined at step S81 that the settlement key of the operation keys 14, for example, is not pressed by the user, the main control part 31 determines at step S86 whether or not the call release key (call release/power key) of the operation keys 14, for example, is pressed by the user via the operation input control part 33.

If it is determined at step S86 that the call release key (call release/power key) of the operation keys 14, for example, is pressed by the user, the main control part 31 determines at step S87 whether or not the icon indicating the unconfirmed information having higher priority than the short-cut function is popup displayed on the display screen displayed on the liquid crystal display 17.

For example, on the display screen 56-*a* of FIG. 11, since the icon 57 indicating the unconfirmed information having higher priority than the short-cut function is focused, it is determined that the icon indicating the unconfirmed information having higher priority than the short-cut function is focused on the display screen displayed on the liquid crystal display 17.

If it is determined at step S87 that the icon indicating the unconfirmed information having higher priority than the short-cut function is not popup displayed, the main control part 31 invalidates the operation that the settlement key, for example, of the operation keys 14 is pressed by the user. Thereafter, the operation returns to step S59, whereby the process following the step S59 is repeated.

If it is determined at step S87 that the icon indicating the unconfirmed information having higher priority than the short-cut function is popup displayed, the main control part 31 sets the priority of unconfirmed information set at higher priority than the short-cut function to be lower than the short-cut function at step S88, judging that the use of the short-cut function is more preferential, because the call release key of the operation keys 14, for example, is pressed by the user, although the icon indicating the unconfirmed information having higher priority than the short-cut function is popup displayed.

At step S89, the main control part 31 updates the number of cases of unconfirmed information managed in the read unconfirmed information report management information. More specifically, the unconfirmed information report management information as shown in FIG. 5H, for example, is updated to the unconfirmed information report management information as shown in FIG. 5K, and the number of cases having higher priority than the short-cut function is updated from "10" to "0" and the number of cases having lower priority than the short-cut function is updated from "0" to "10" in the unconfirmed information where the kind of unconfirmed information is "missed incoming call". The number of cases having higher priority than the short-cut function is updated from "5" to "0" and the number of cases having lower priority than the short-cut function is updated from "2" to "7" in the unconfirmed information where the kind of unconfirmed information is "new incoming mail".

The number of cases having higher priority than the short-cut function is updated from "3" to "0" and the number of cases having lower priority than the short-cut function is updated from "0" to "3" in the unconfirmed information where the kind of unconfirmed information is "message".

At step S90, the main control part 31 controls the LCD control part 36 so that the liquid crystal display 17 may erase the popup display (popup display of the icon indicating the unconfirmed information having higher priority than the short-cut function) of the display screen displayed on the liquid crystal display 17. The liquid crystal display 17 erases the popup display (popup display of the icon indicating the unconfirmed information having higher priority than the short-cut function) of the display screen displayed on the liquid crystal display 17 under the control of the LCD control part 36.

For example, in the case of FIG. 12, the display screen 56-*a* transfers to the display screen 58-*f*, and the popup display (popup display of the icon indicating the unconfirmed information having higher priority than the short-cut function) displayed on the display screen 56-*a* is erased and not displayed on the display screen 58-*f*.

At step S91, the main control part 31 controls the LCD control part 36 to update the display of the icon having lower priority than the short-cut function, displayed in the low priority unconfirmed information display area of the liquid crystal display 17. The liquid crystal display 17 updates the display of the icon having lower priority than the short-cut function, displayed in the low priority unconfirmed information display area of the liquid crystal display 17 under the control of the LCD control part 36.

For example, in the case of FIG. 12, the display screen 56-*a* transfers to the display screen 56-*f*. On the display screen 56-*f*, at least three icons 54-3 to 54-5 corresponding to the icon 57 popup displayed on the display screen 56-*a* are additionally displayed in the low priority unconfirmed information γ. Thereby, because the user presses the call release key, for example, of the operation keys 14, the priority of unconfirmed information set at higher priority than the short-cut function is set to be lower than the short-cut function, whereby the user can know that there are at least five cases of unconfirmed information having lower priority than the short-cut function.

As already described above, in the case where two or more pieces of unconfirmed information having lower priority than the short-cut function exist, and can not be displayed in the low priority unconfirmed information display area γ at a time, the most recently stored unconfirmed information is firstly displayed, and successively slid to the left or right on the liquid crystal display 17 by the user operating the operation key 14. On the display screen 58-*f* of FIG. 12, a total f twenty (10+7+3=20) icons are actually displayed in the low priority unconfirmed information display area γ. Thereby, even if there are so many pieces of unconfirmed information that can not be displayed at a time in the low priority unconfirmed information display area γ, they can be reported to the user successively.

Thereafter, the operation goes to step S52. The newly updated unconfirmed information report management information is read at step S52, and following the step S53, the display control process is repeatedly performed based on the read unconfirmed information report management information.

In the case of FIG. 12, the display screen 58-*f* transfers to the display screens 58-*g* to 58-*r*, as the display control process of FIGS. 9 and 10 is further performed. The description of this transition is fundamentally the same as for the transition of the display screens 56-*e* to 56-*l* as shown in FIG. 11B, and is omitted because the explanation is repeated.

In the embodiment, when the standby screen is displayed, the short-cut function display area and the low priority unconfirmed information display area are provided, in which the icon indicating the preset short-cut function is displayed in the short-cut function display area on the display screen (standby screen), the icon indicating the unconfirmed information having lower priority than the short-cut function is displayed in the low priority unconfirmed information display area on the display screen (standby screen), and the icon indicating the unconfirmed information having higher priority than the short-cut function is popup displayed on the display screen (standby screen).

And if the call release key, for example, of the operation keys 14 is pressed by the user, while the icon indicating the unconfirmed information having higher priority than the short-cut function is popup displayed, it is possible to set the priority of unconfirmed information set at higher priority than the short-cut function to be lower than the short-cut function, and erase the popup menu that is displayed, judging that the use of the short-cut function is more preferential, although the icon indicating the unconfirmed information having higher priority than the short-cut function is popup displayed. Also, if the short-cut function allocated key (e.g., a soft key or a predetermined numeric key), for example, of the operation keys 14 is pressed by the user, while the icon indicating the unconfirmed information having higher priority than the short-cut function is popup displayed, it is possible to set the priority of unconfirmed information set at higher priority than the short-cut function to be lower than the short-cut function, judging that the use of the short-cut function is more preferential, although the icon indicating the unconfirmed information having higher priority than the short-cut function is popup displayed.

Also, it is possible to update the unconfirmed information report management information stored in the storage part 47, based on the set priority. Further, if the settlement key, for example, of the operation keys 14 is pressed by the user, while a partial area of the popup icon indicating the unconfirmed information having higher priority than the short-cut function is focused, it is possible to update the number of cases of unconfirmed information managed in the read unconfirmed information report management information, judging that the confirmation of the unconfirmed information having higher priority than the short-cut function focused on the display screen is dictated.

Thereby, it is possible to update the display of the icons in the high priority unconfirmed information display area and the low priority unconfirmed information display area on the display screen displayed on the liquid crystal display 17, and to properly move the focus to the icon displayed in the short-cut function display area and the low priority unconfirmed information display area, even when the icon indicating the unconfirmed information having higher priority than the short-cut function is popup displayed on the display screen (standby screen).

Accordingly, the user can activate the desired short-cut function immediately without confirming the unconfirmed information having higher priority than the short-cut function, even when the icon indicating the unconfirmed information having higher priority than the short-cut function is popup displayed on the display screen (standby screen) because there is unconfirmed information having higher priority than the short-cut function.

As a result, the operability of the portable telephone 1 can be improved.

By the way, in the case where the display control process as described with reference to the flowcharts of FIG. 6 or FIGS. 9 and 10, for example, is started after the portable telephone 1 is turned from the closed state to the open state by the user operating the portable telephone 1, for example, if the portable telephone 1 is then turned from the open state to the closed state, for example, by the user operating the portable telephone 1, the priority of the unconfirmed information may be set to be lower than the short-cut function, judging that the confirmation of unconfirmed information having higher priority than the short-cut function is ignored, although the icon indicating the unconfirmed information having higher priority than the short-cut function is displayed in the high priority unconfirmed information display area, or popup displayed. The display control process for the portable telephone with this method will be described below.

To simplify the explanation, only the display control process in which this method is applied to the display control process using the flowchart of FIG. 6 will be described below. The display control process in which this method is applied to the display control process using the flowcharts of FIGS. 9 and 10 is fundamentally the same.

Figure 13:
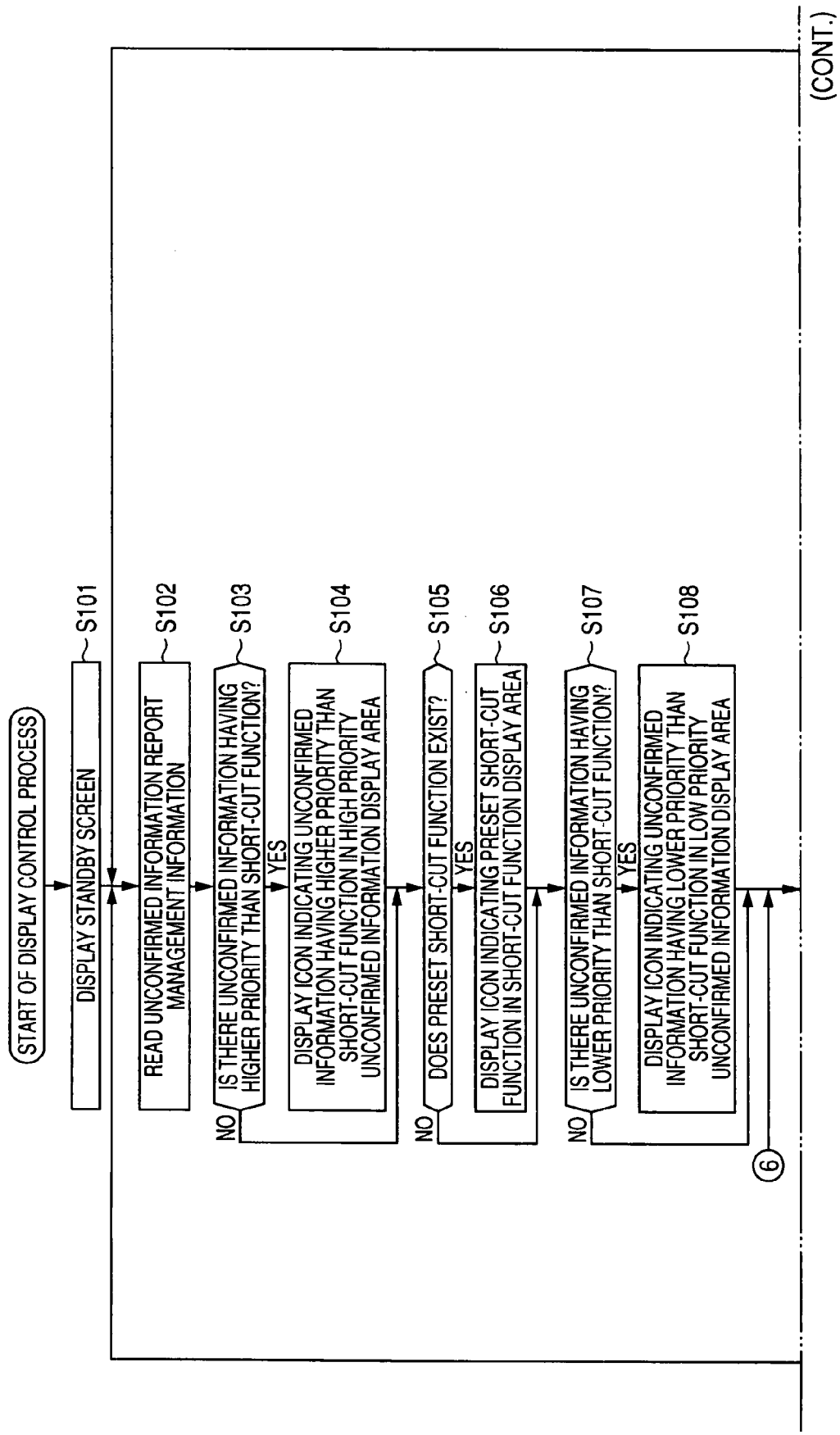
FIG. 13 is an exemplary flowchart for explaining another display control process in the portable telephone 1 of FIG. 3.
Figure 13:
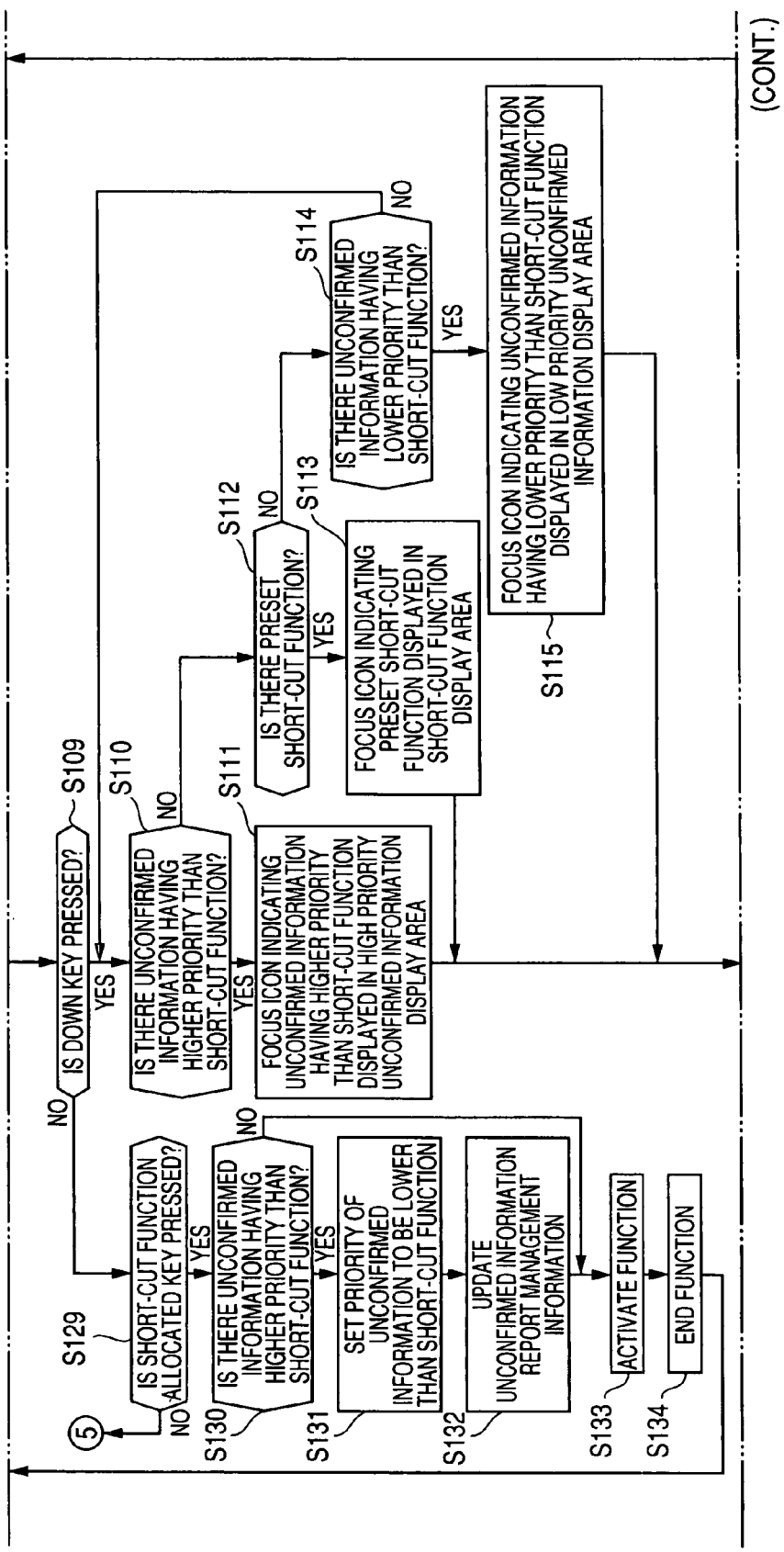
Figure 14:
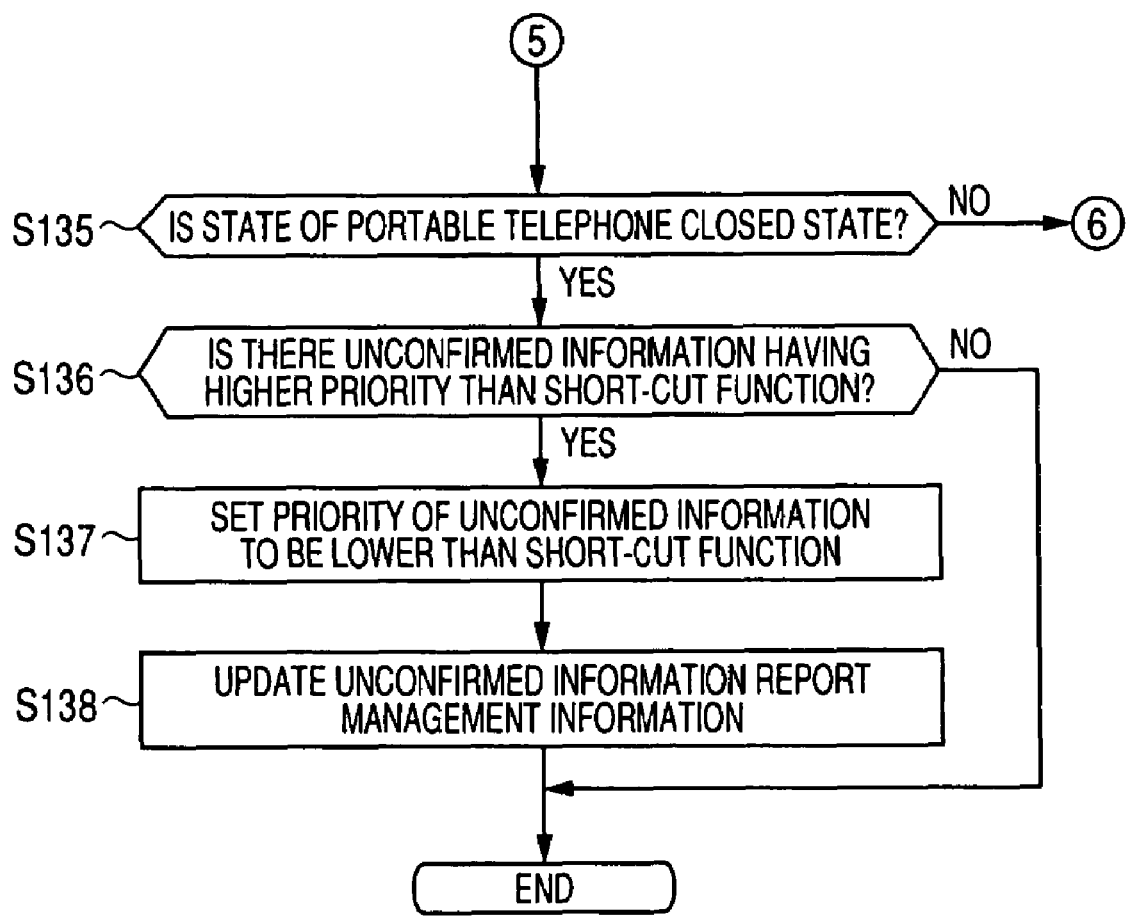
FIG. 14 is an exemplary flowchart for explaining another display control process in the portable telephone 1 of FIG. 3.

Referring to the flowcharts of FIGS. 13 and 14, the display control process for the portable telephone 1 of FIG. 3 will be described below. The process from steps S101 to S134 of FIGS. 13 and 14 is the same as the process from steps S11 to S44 of FIG. 6, and the duplicate explanation is omitted.

If it is determined at step S129 that the short-cut function allocated key, for example, of the operation keys 14 is pressed by the user, the main control part 31 determines at step S135 whether or not the portable telephone 1 is put in the closed state, based on detection signals from the magnetic sensors 19a to 19d contained at predetermined positions of the portable telephone 1.

If it is determined at step S135 that the portable telephone 1 is put in the closed state, the main control part 31 determines at step S136 whether or not there is unconfirmed information having higher priority than the short-cut function, based on the read unconfirmed information report management information.

If it is determined at step S136 that there is unconfirmed information having higher priority than the short-cut function, the main control part 31 sets the priority of the unconfirmed information set at higher priority than the short-cut function to be lower than the short-cut function at step S137, judging that the confirmation of unconfirmed information having higher priority than the short-cut function is ignored, although the icon indicating the unconfirmed information having higher priority than the short-cut function is displayed in the high priority unconfirmed information display area.

At step S138, the main control part 31 updates the number of cases of unconfirmed information managed in the read unconfirmed information report management information. More specifically, the unconfirmed information report management information as shown in FIG. 5E, for example, is updated to the unconfirmed information report management information as shown in FIG. 5F, and the number of cases having higher priority than the short-cut function is updated from "2" to "0" and the number of cases having lower priority than the short-cut function is updated from "0" to "2" in the unconfirmed information where the kind of unconfirmed information is "missed incoming call".

If it is determined at step S136 whether or not there is no unconfirmed information having higher priority than the short-cut function, the process from steps S137 and S138 is skipped, and the update process for the unconfirmed information report management information is not performed.

On the other hand, it is determined at step S135 that the portable telephone 1 is not in the closed state (i.e., it is determined that the portable telephone 1 is in the open state), the operation returns to step S109, and the process following the step S109 is repeated.

Thereby, in the case where the icon indicating the unconfirmed information having higher priority than the short-cut function, for example, is displayed in the high priority unconfirmed information display area or popup displayed, if the portable telephone 1 is turned from the open state to the closed state by the user, the priority of unconfirmed information set at higher priority than the short-cut function can be set to be lower than the short-cut function, and the unconfirmed information report management information can be updated. Also, the display of the icons in the high priority unconfirmed information display area and the low priority unconfirmed information display area on the display screen displayed on the liquid crystal display 17 can be updated immediately.

Accordingly, when the user does not need to confirm the unconfirmed information, or thinks to confirm the unconfirmed information later, the priority of unconfirmed information set at higher priority than the short-cut function can be set to be lower than the short-cut function, and the unconfirmed information report management information can be updated only by changing the portable telephone 1 from the open state to the closed state, whereby the display of the icons in the high priority unconfirmed information display area and the low priority unconfirmed information display area on the display screen displayed on the liquid crystal display 17 can be updated immediately.

As a result, the operability of the portable telephone 1 can be improved.

In the unconfirmed information report management information update process as described with reference to the flowchart of FIG. 4, in the case where there is an incoming call while the user is absent, for example, and the incoming call is disconnected without speech conversation for the incoming call, or in the case where the receiving operation of the new mail is completed and the user does not order the display of the mail contents, the unconfirmed information is generated, the priority of all the generated unconfirmed information is set to be higher than the short-cut function, and the unconfirmed information report management information (information for managing the report of unconfirmed information) is updated based on the set priority. However, the invention is not limited to the above case, but in the case where the new unconfirmed information is generated while the user is operating the portable telephone 1, the priority of the new unconfirmed information may be set to be lower than the short-cut function and the unconfirmed information report management information may be updated, if the user issues an instruction of setting the priority of the new unconfirmed information to be lower than the short-cut function.

Figure 15:
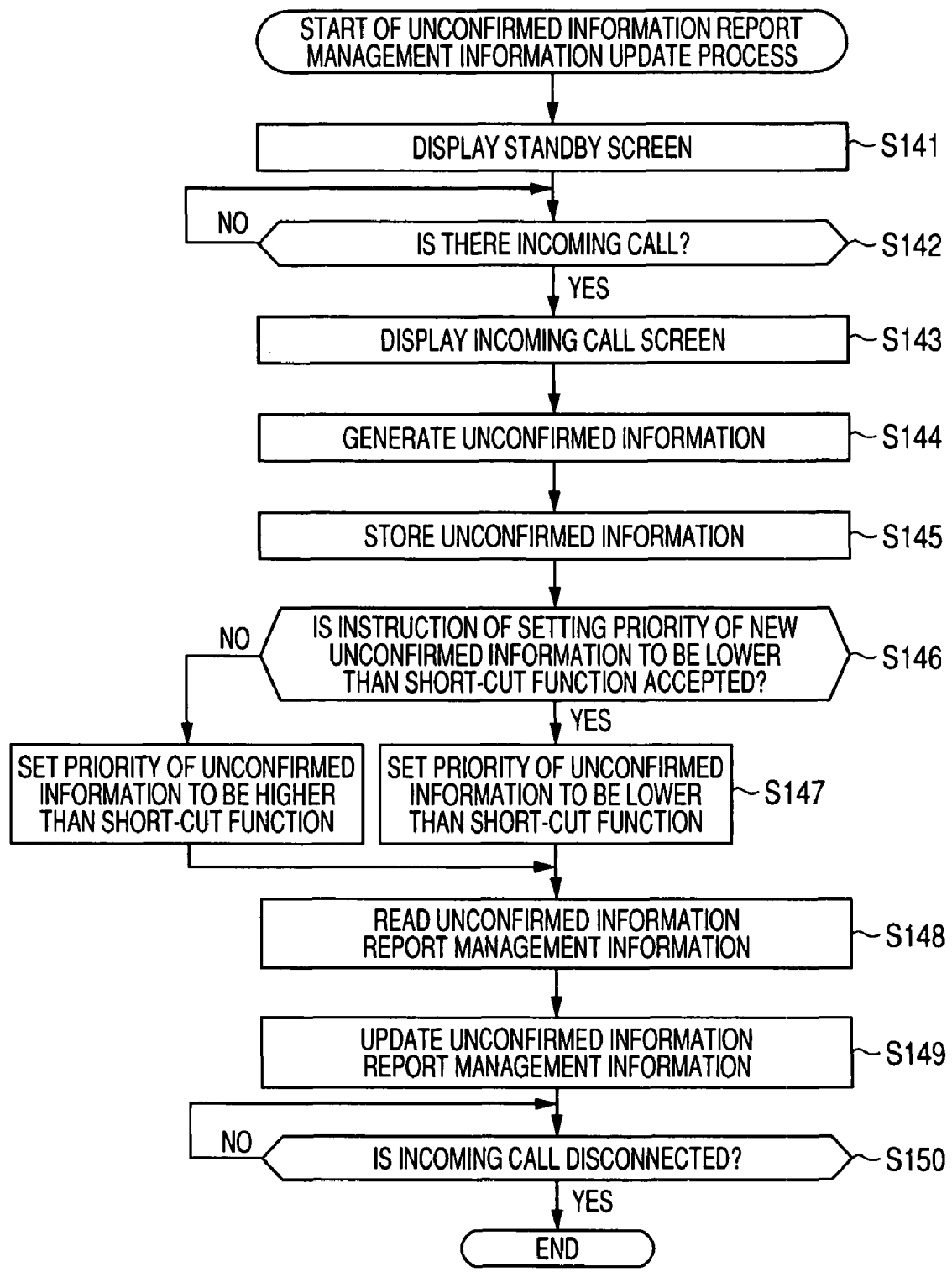
FIG. 15 is an exemplary flowchart for explaining another unconfirmed information report management information update process in the portable telephone 1 of FIG. 3.

Referring to a flowchart of FIG. 15, another unconfirmed information report management information update process for the portable telephone 1 will be described below. The process of steps S144, S145, S148, S149 and S150 of FIG. 15 is the same as the process of steps S1 to S5 of FIG. 4, and the duplicate explanation is properly omitted.

At step S141, the main control part 31 controls the LCD control part 36 to display the standby screen preset by the user (or a default standby screen if it is not preset by the user) on the liquid crystal display 17. The liquid crystal display 17 controls the LCD control part 36 to display the standby screen preset by the user.

At step S142, the main control part 31 determines whether or not there is any incoming call from another portable telephone 1 via the modulation/demodulation circuit part 39, the transmission/reception circuit part 43 and the antenna 44.

If it is determined at step S142 whether or not there is any incoming call from another portable telephone 1, the main control part 1 controls the LCD control part 36 to display an incoming call screen on the liquid crystal display 17 at step S143. The liquid crystal display 17 displays the incoming call screen under the control of the LCD control part 36.

At step S146, the main control part 31 determines whether or not an instruction of setting the priority of the new unconfirmed information to be lower than the short-cut function is accepted because the soft key (e.g., soft 1 key or soft 2 key), for example, of the operation keys 14 is pressed by the user via the operation input control part 33.

If it is determined at step S146 whether or not the instruction of setting the priority of the new unconfirmed information to be lower than the short-cut function is accepted, the main control part 31 sets the priority of the newly generated unconfirmed information to be lower than the preset short-cut function at step S147.

On the other hand, if it is determined at step S146 whether or not the instruction of setting the priority of the new unconfirmed information to be lower than the short-cut function is not accepted, the main control part 31 sets the priority of the newly generated unconfirmed information to be higher than the preset short-cut function at step S147.

Thereafter, the operation goes to step S149. At step S149, the unconfirmed information report management information stored in the storage part 47 is updated.

At step S150, the main control part 31 determines whether or not the incoming call from another portable telephone 1 is disconnected because the call release key (call release/power key), for example, of the operation keys 14 is pressed by the user via the operation input control part 33, and waits until it is determined that the incoming call from another portable telephone 1 is disconnected.

If it is determined at step S150 that the incoming call from another portable telephone 1 is disconnected, the unconfirmed information report management information update process is ended.

Thereby, in the case where the new unconfirmed information is generated while the user is operating the portable telephone 1, for example, if the user issues an instruction of setting the priority of the new unconfirmed information to be lower than the short-cut function, the priority of the new unconfirmed information can be lower than the short-cut function and the unconfirmed information report management information can be updated. Accordingly, the priority of the new unconfirmed information can be set to be lower than the short-cut function directly and simply according to the preferences of the user without performing the display control process as described with reference to the flowcharts of FIG. 6 or FIGS. 9 and 10. As a result, the operability of the portable telephone 1 can be further improved.

Figure 16:
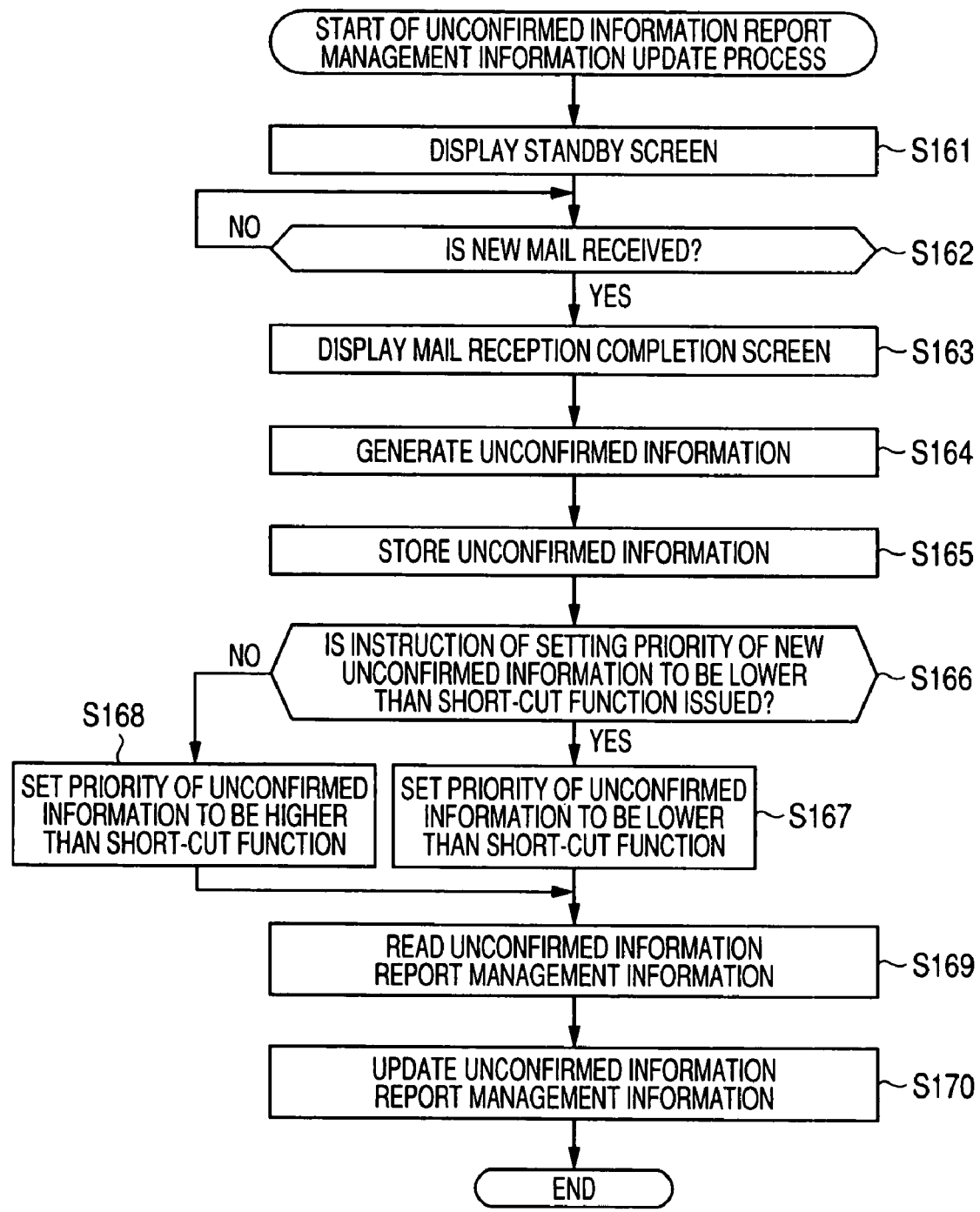
FIG. 16 is an exemplary flowchart for explaining another unconfirmed information report management information update process in the portable telephone 1 of FIG. 3.

In the unconfirmed information report management information update process as described with reference to the flowchart of FIG. 15, an instance where there is a new incoming call has been described above, but when the new mail is received, the unconfirmed information report management information update process of FIG. 16 is performed. The process from step S161 to step S170 of FIG. 16 is fundamentally the same as the process from step S141 to step S150 of FIG. 15, and the duplicate explanation is omitted.

By the way, the confirmed information (e.g., incoming call or mail) already confirmed by the user, for example, may be added to the unconfirmed information according to the preferences of the user. An unconfirmed information addition process using this method will be described below.

Referring to a flowchart of FIG. 17, the unconfirmed information addition process for the portable telephone 1 of FIG. 3 will be described below. This unconfirmed information addition process is started when the incoming call history screen is displayed on the liquid crystal display 17.

At step S181, the main control part 31 controls the LCD control part 31 to display the incoming call history screen on the liquid crystal display 17. The liquid crystal display 17 displays the incoming call history screen under the control of the LCD control part 36.

At step S182, the main control part 31 determines whether or not the up or down key (up key or down key), for example, of the operation keys 14 is pressed by the user via the operation input control part 33.

If it is determined at step S182 that the up or down key (up key or down key), for example, of the operation keys 14 is pressed by the user, the main control part 31 controls the LCD control part 36 to move the position of focus displayed on the liquid crystal display 17 at step S183. The liquid crystal display 17 moves the position of focus displayed on the liquid crystal display 17 under the control of the LCD control part 36. Thereby, the contents of incoming call as desired by the user can be displayed.

Thereafter, the operation goes to step S181, and the process following the step S181 is repeatedly performed.

If it is determined at step S182 that the up or down key (up key or down key), for example, of the operation keys 14 is not pressed by the user, the main control part 31 determines via the operation input control part 33 at step S184 whether or not an instruction of adding the currently focused incoming call to the unconfirmed information is accepted because the soft key (soft 1 key or soft 2 key), for example, of the operation keys 14 is pressed by the user.

If it is determined at step S184 that the instruction of adding the currently focused incoming call to the unconfirmed information is accepted, the main control part 31 sets the priority of the unconfirmed information for which the instruction of adding the currently focused incoming call is accepted to be lower than the short-cut function at step S185.

At step S186, the rain control part 31 reads the unconfirmed information report management information (information for managing the report of unconfirmed information) stored in the storage part 47.

The unconfirmed information report management information as shown in FIG. 5G, for example, is read out.

At step S187, the main control part 31 updates the unconfirmed information report management information, based on the priority of added unconfirmed information (i.e., priority set to be lower than the short-cut function).

The unconfirmed information report management information as shown in FIG. 5G, for example, is updated to the unconfirmed information report management information as shown in FIG. 5L. That is, the number of cases of unconfirmed information having lower priority than the short-cut function is updated from "0" to "1" in the unconfirmed information where the kind of unconfirmed information is "missed incoming call".

Thereby, in the display control process as described with reference to the flowchart of FIG. 6 or FIGS. 9 and 10, the unconfirmed information is reported to the user based on the updated unconfirmed information report management information, and the icon is additionally displayed in the low priority unconfirmed information display area. Accordingly, the user can confirmed the confirmed information (e.g., incoming call or mail), even if it is already confirmed, as needed, not to forget the return mail, for example. As a result, the operability for the portable telephone 1 can be further improved.

If it is determined at step S184 that the instruction of adding the currently focused incoming call to the unconfirmed information is not accepted, the main control part 31 determines via the operation input control part 33 at step S188 whether or not the call release key, for example, of the operation keys 14 is pressed by the user.

If it is determined at step S188 that the call release key, for example, of the operation keys 14 is not pressed by the user, the operation returns to step S182, and the process following the step S182 is repeated.

If it is determined at step S188 that the call release key, for example, of the operation keys 14 is pressed by the user, the main control part 31 controls the LCD control part 36 to end the display of the incoming call history screen displayed on the liquid crystal display 17 at step S189. The liquid crystal display 17 ends the display of the incoming call history screen under the control of the LCD control part 36.

At step S190, the main control part 31 controls the LCD control part 36 to display the standby screen preset by the user (a default standby screen if it is not preset by the user) on the liquid crystal display 17. The liquid crystal display 17 displays the standby screen preset by the user under the control of the LCD control part 36.

Thereafter, the unconfirmed information addition process is ended.

In the unconfirmed information addition process as described with reference to the flowchart of FIG. 17, an instance of adding the incoming call already confirmed by the user as the unconfirmed information has been described above. However, in the case where the mail already confirmed by the user is added as the unconfirmed information, an unconfirmed information addition process of FIG. 18 is performed. The process from step S181 to step S190 of FIG. 18 is fundamentally the same as the process from step S191 to step S200 of FIG. 15, and the duplicate explanation is omitted.

The icon (such as icon indicating the unconfirmed information having higher priority than the short-cut function) as used in the embodiment is defined as "indicative information".

According to the above-described embodiments, the operability can be improved.

The above-described embodiments may be applied to a PDA (Personal Digital Assistant), a personal computer, a handy game machine, a portable music sound-reproducing system, a portable animation reproducing system, and other information processing apparatuses, in addition to the portable telephone 1.

A series of processes as described in the embodiments may be performed by software or hardware.

Moreover, though in the embodiments, the steps of the flowchart are performed in time series according to the prescribed sequence, those steps may not be performed in time series, but may be performed in parallel or individually.

[FIG. 3]
14 Operation key
15 Microphone
17 Liquid crystal display
18 Speaker
20 CCD camera
21 Sub-display
31 Main control part
32 Power supply circuit part
33 Operation input control part
34 Image encoder
35 Camera I/F part
36 LCD control part
37 Image decoder
38 Multiplexing/demultiplexing part
39 Modulation/demodulation circuit part
40 Voice codec
43 Transmission/reception circuit part
45 Recording/reproduction part
46 Memory card
47 Storage part
48 Music control part
a. To each part

[FIG. 4]
a. Start of unconfirmed information report management information update process
S1 Generate unconfirmed information.
S2 Store unconfirmed information.
S3 Set priority of unconfirmed information to be higher than short-cut function.
S4 Read unconfirmed information report management information.
S5 Update unconfirmed information report management information.

[FIG. 5A-5L]
a. Kind of unconfirmed information
b. Missed incoming call
c. New incoming mail
d. Message
e. Number of cases having higher priority than short-cut function
f. Unconfirmed information report management information
g. Number of cases having lower priority than short-cut function

[FIG. 6]
a. Start of display control process
S11 Display standby screen.
S12 Read unconfirmed information report management information.
S13 Is there unconfirmed information having higher priority than short-cut function?
S14 Display icon indicating unconfirmed information having higher priority than short-cut function in high priority unconfirmed information display area.
S15 Does preset short-cut function exist?
S16 Display icon indicating preset short-cut function in short-cut function display area.
S17 Is there unconfirmed information having lower priority than short-cut function?
S18 Display icon indicating unconfirmed information having lower priority than short-cut function in low priority unconfirmed information display area.
S19 Is down key pressed?
S20 Is there unconfirmed information having higher priority than short-cut function?
S21 Focus icon indicating unconfirmed information having higher priority than short-cut function displayed in high priority unconfirmed information display area.
S22 Is there preset short-cut function?
S23 Focus icon indicating preset short-cut function displayed in short-cut function display area.
S24 Is there unconfirmed information having lower priority than short-cut function?
S25 Focus icon indicating unconfirmed information having lower priority than short-cut function displayed in low priority unconfirmed information display area.

S26 Is down key pressed?
S27 Is icon indicating unconfirmed information having higher priority than short-cut function focused?
S28 Set priority of unconfirmed information to be lower than short-cut function.
S29 Update unconfirmed information report management information.
S30 Update display of icon.
S31 Move focus position.
S32 Is up key pressed?
S33 Is left or right key pressed?
S34 Is settlement key pressed?
S35 Is icon indicating unconfirmed information having higher priority than short-cut function focused?
S36 Update unconfirmed information report management information.
S37 Activate function.
S38 End function.
S39 Is short-cut function allocated key pressed?
S40 Is there unconfirmed information having higher priority than short-cut function?
S41 Set priority of unconfirmed information to be lower than short-cut function.
S42 Update unconfirmed information report management information.
S43 Activate function.
S44 End function.
[FIGS. 7A-7D]
a. Functional screen
b. 12/31 (Saturday)
c. Two Incoming calls present
d. "Down key"
e. "Short-cut function allocated key"
f. "Return"
g. two males present
h. electronic calculator
[FIG. 8]
a. 12/31 (Saturday)
b. Call originating/incoming history screen
c. Notepad function screen
d. Electronic calculator function screen
e. Mail transmission/reception history function screen
f. "Settlement key"
g. "Left or right key"
h. "Up or down key"
i. "Return"
j. Incoming call present, two cases
k.
l. Activating call originating/incoming history function
m. Activating notepad function
n. Activating electronic calculator function
o. Activating mail transmission/reception history function
p. Electronic calculator
[FIG. 9]
a. Start of display control process
S51 Display standby screen.
S52 Read unconfirmed information report management information.
S53 Is there unconfirmed information having higher priority than short-cut function?
S54 Popup display icon indicating unconfirmed information having higher priority than short-cut function.
S55 Does preset short-cut function exist?
S56 Display icon indicating preset short-cut function in short-cut function display area.
S57 Is there unconfirmed information having lower priority than short-cut function?
S58 Display icon indicating unconfirmed information having lower priority than short-cut function in low priority unconfirmed information display area.
S59 Is up or down key pressed?
S60 Is icon indicating unconfirmed information having higher priority popup displayed?
S61 Move focus position.
S62 Is settlement key pressed?
S63 Activate function.
S64 End function.
S65 Is icon indicating unconfirmed information having higher priority than short-cut function focused?
S66 Update unconfirmed information report management information.
S67 Does preset short-cut function exist?
S68 Focus icon indicating preset short-cut function displayed in short-cut function display area.
S69 Is there unconfirmed information having lower priority than short-cut function?
S70 Focus icon indicating unconfirmed information having lower priority than short-cut function displayed in low priority unconfirmed information display area.
S71 Is up or down key pressed?
S72 Move focus position.
S73 Is left or right key pressed?
S74 Is settlement key pressed?
S75 Is short-cut function allocated key pressed?
S76 Is there unconfirmed information having higher priority than short-cut function?
S77 Set priority of unconfirmed information to be lower than short-cut function.
S78 Update unconfirmed information report management information.
S79 Activate function.
S80 End function.
[FIG. 10]
S81 Is settlement key pressed?
S82 Is icon indicating unconfirmed information having higher priority popup displayed?
S83 Activate function.
S84 End function.
S85 Update unconfirmed information report management information.
S86 Is call release key pressed?
S87 Is icon indicating unconfirmed information having higher priority popup displayed?
S88 Set priority of unconfirmed information to be lower than short-cut function.
S89 Update unconfirmed information report management information.
S90 Erase popup display.
S91 Update display of icon indicating unconfirmed information displayed in low priority unconfirmed information display area.
[FIGS. 11A-11D]
a. 12/31 (Saturday)
b. Functional screen
c. Mail transmission/reception history screen
d. Notepad function screen
e. "Short-cut function allocated"
f. "Return"
g. "Up or down key"
h. "Settlement key"
i. Incoming call present, 10 cases, E mail, 5 cases, Simple absence memo, 3 cases
j. Electronic calculator
k. Two mails, present l. Activating mail transmission/reception history function
m. Activating notepad function

[FIG. 12]
a. 12/31 (Saturday)
b. Mail transmission/reception history screen
c. Call originating/incoming history screen
d. Notepad function screen
e. Electronic calculator screen
f. "Return"
g. "Up or down key"
h. "Settlement key"
i. "Left or right key"
j. "Call release key"
k. Incoming call present, 10 cases, E mail, 5 cases, Simple absence memo, 2 cases
l. Mail present, two cases
m. Incoming call present, two cases
n. Activating mail transmission/reception history function
o. Activating call originating/incoming history function
p. Activating notepad function
q. Activating electronic calculator function
r. Notepad
s. Electronic calculator
t. Incoming call present, 7 cases, E mail, 5 cases, Simple absence memo, 3 cases

[FIG. 13]
a. Start of display control process
S101 Display standby screen.
S102 Read unconfirmed information report management information.
S103 Is there unconfirmed information having higher priority than short-cut function?
S104 Display icon indicating unconfirmed information having higher priority than short-cut function in high priority unconfirmed information display area
S105 Does preset short-cut function exist?
S106 Display icon indicating preset short-cut function in short-cut function display area.
S107 Is there unconfirmed information having lower priority than short-cut function?
S108 Display icon indicating unconfirmed information having lower priority than short-cut function in low priority unconfirmed information display area.
S109 Is down key pressed?
S110 Is there unconfirmed information having higher priority than short-cut function?
S111 Focus icon indicating unconfirmed information having higher priority than short-cut function displayed in high priority unconfirmed information display area.
S112 Is there preset short-cut function?
S113 Focus icon indicating preset short-cut function displayed in short-cut function display area.
S114 Is there unconfirmed information having lower priority than short-cut function?
S115 Focus icon indicating unconfirmed information having lower priority than short-cut function displayed in low priority unconfirmed information display area.
S116 Is down key pressed?
S117 Is icon indicating unconfirmed information having higher priority than short-cut function focused?
S118 Set priority of unconfirmed information to be lower than short-cut function.
S119 Update unconfirmed information report management information.
S120 Update display of icon.
S121 Move focus position.
S122 Is up key pressed?
S123 Is left or right key pressed?
S124 Is settlement key pressed?
S125 Is icon indicating unconfirmed information having higher priority than short-cut function focused?
S126 Update unconfirmed information report management information.
S127 Activate function.
S128 End function.
S129 Is short-cut function allocated key pressed?
S130 Is there unconfirmed information having higher priority than short-cut function?
S131 Set priority of unconfirmed information to be lower than short-cut function.
S132 Update unconfirmed information report management information.
S133 Activate function.
S134 End function.

[FIG. 14]
S135 Is state of portable telephone closed state?
S136 Is there unconfirmed information having higher priority than short-cut function?
S137 Set priority of unconfirmed information to be lower than short-cut function.
S138 Update unconfirmed information report management information.
a. End

[FIG. 15]
a. Start of unconfirmed information report management information update process
b. End
S141 Display standby screen.
S142 Is there incoming call?
S143 Display incoming call screen.
S144 Generate unconfirmed information.
S145 Store unconfirmed information. #S146 Is instruction of setting priority of new unconfirmed information to be lower than short-cut function accepted?
S147 Set priority of unconfirmed information to be lower than short-cut function.
Set priority of unconfirmed information to be higher than short-cut function.
S148 Read unconfirmed information report management information.
S149 Update unconfirmed information report management information.
S150 Is incoming call disconnected?

[FIG. 16]
a. Start of unconfirmed information report management information update process
b. End
S161 Display standby screen.
S162 Is new mail received?
S163 Display mail reception completion screen.
S164 Generate unconfirmed information.
S165 Store unconfirmed information.
S166 Is instruction of setting priority of new unconfirmed information to be lower than short-cut function issued?
S167 Set priority of unconfirmed information to be lower than short-cut function.
S168 Set priority of unconfirmed information to be higher than short-cut function.
S169 Read unconfirmed information report management information.
S170 Update unconfirmed information report management information.

Figure 17:
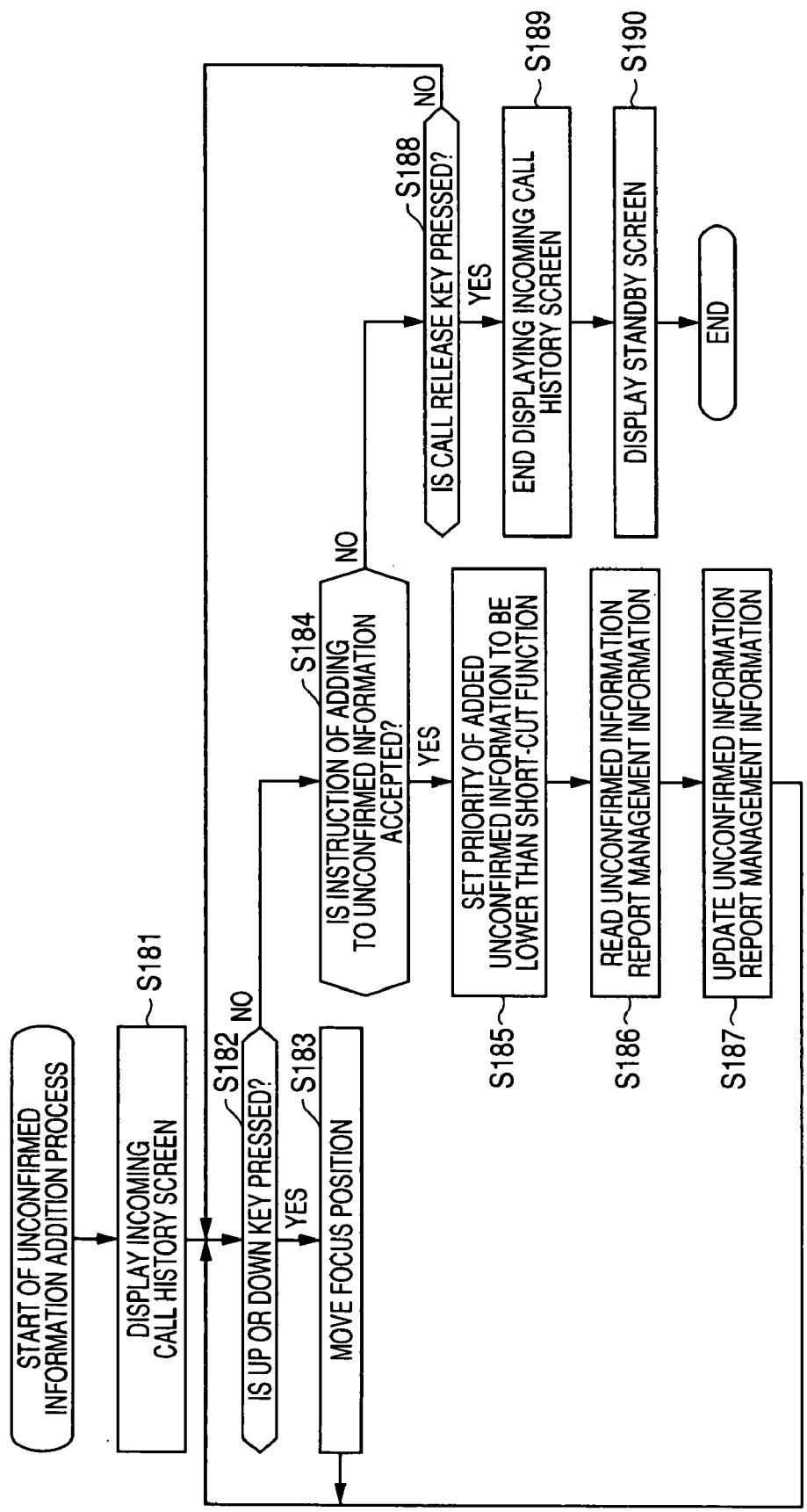
FIG. 17 is an exemplary flowchart for explaining an unconfirmed information addition process in the portable telephone of FIG. 3.
Figure 18:
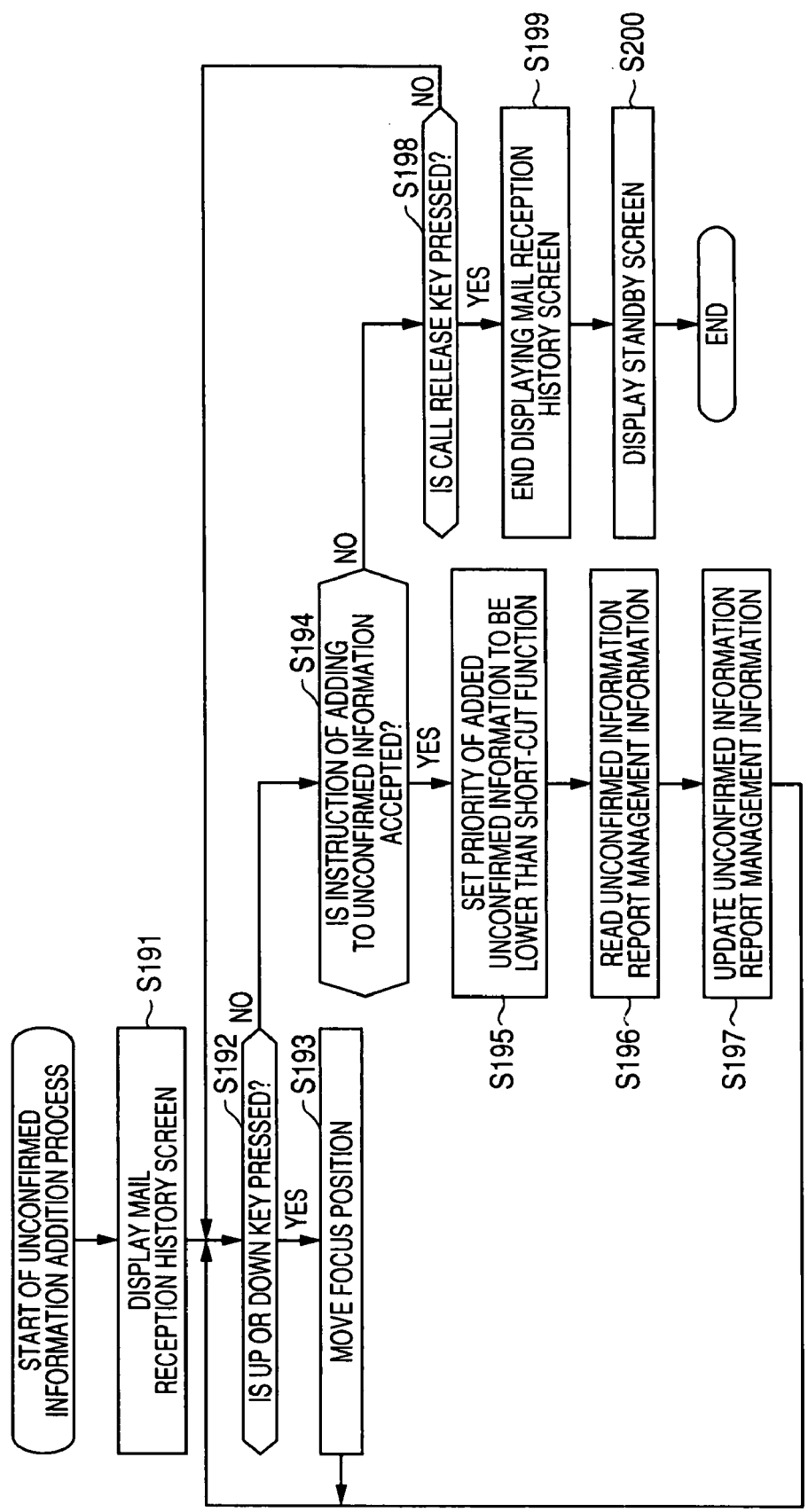
FIG. 18 is an exemplary flowchart for explaining another unconfirmed information addition process in the portable telephone of FIG. 3.

[FIG. 17]
a. Start of unconfirmed information addition process
b. End
S181 Display incoming call history screen.
S182 Is up or down key pressed?
S183 Move focus position.
S184 Is instruction of adding to unconfirmed information accepted?
S185 Set priority of added unconfirmed information to be lower than short-cut function.
S186 Read unconfirmed information report management information.
S187 Update unconfirmed information report management information.
S188 Is call release key pressed?
S189 End displaying incoming call history screen.
S5190 Display standby screen.

[FIG. 18]
a. Start of unconfirmed information addition process
b. End
S191 Display mail reception history screen.
S192 Is up or down key pressed?
S193 Move focus position.
S194 Is instruction of adding to unconfirmed information accepted?
S195 Set priority of added unconfirmed information to be lower than short-cut function.
S196 Read unconfirmed information report management information.
S197 Update unconfirmed information report management information.
S198 Is call release key pressed?
S199 End displaying mail reception history screen.
S200 Display standby screen.

What is claimed is:

1. An information processing apparatus comprising:
a first display unit configured to display on a standby screen a first indicative information indicating a high-priority unconfirmed information having a higher priority than a short-cut function;
a second display unit configured to display on the standby screen a second indicative information indicating the short-cut function; and
a third display unit configured to display on the standby screen a third indicative information indicating a low-priority unconfirmed information having a lower priority than the short-cut function,
wherein the first indicative information is displayed in a focused state by default;
wherein when a user deselects the first indicative information indicating the high-priority unconfirmed information so that the first indicative information is no longer displayed in the focused state, without having confirmed the high-priority unconfirmed information, the high-priority unconfirmed information is reassigned as low-priority unconfirmed information and is indicated by the third indicative information displayed by the third display unit;
wherein a first display area for displaying the first indicative information indicating the high-priority unconfirmed information, a second display area for displaying the second indicative information indicating the short-cut function, and a third display area for displaying the third indicative information indicating the low-priority unconfirmed information are displayed simultaneously on the standby screen;
wherein indicative information corresponding to highest priority among indicative information currently displayed on the standby screen is focused thereby to display the first indicative information in the focused state when the first indicative information is displayed on the standby screen, to display the second indicative information in the focused state when the second indicative information is displayed on the standby screen in the absence of the first indicative information on the standby screen, and to display the third indicative information in the focused state when the third indicative information is displayed on the standby screen in the absence of both the first indicative information and the second indicative information on the standby screen.

2. The information processing apparatus according to claim 1, wherein the high-priority and the low-priority unconfirmed information comprise an unconfirmed incoming call information,
wherein the unconfirmed incoming call information indicates that an incoming call was disconnected without being answered by the user.

3. The information processing apparatus according to claim 1, wherein the high-priority and the low-priority unconfirmed information comprise an unconfirmed mail information indicating that a mail has been received and has not yet been read.

4. An information processing apparatus comprising:
a display unit configured to display on a standby screen a first indicative information indicating a its high-priority unconfirmed information having a higher priority than a short-cut function, a second indicative information indicating the short-cut function, and a third indicative information indicating a low-priority unconfirmed information having a lower priority than the short-cut function, wherein the display unit displays the first indicative information in a focused state by default;
a first determination unit configured to determine whether or not a first key is pressed;
a setting unit configured to set a priority of an unconfirmed information so as to assign the unconfirmed information to be one of the high-priority unconfirmed information and the low-priority unconfirmed information; and
a control unit configured to update a prestored unconfirmed information report management information serving as an information for managing a report of the high-priority and low-priority unconfirmed information in accordance with the priority set by the setting unit when the first determination unit determines that the first key is pressed;
wherein the display unit updates a display of the first indicative information and the third indicative information, based on the unconfirmed information report management information updated by the control unit;
wherein when the user presses the first key to deselect the first indicative information indicating the high-priority unconfirmed information so that the first indicative information is not displayed in the focused state, without having confirmed the high-priority unconfirmed information, the setting unit reassigns the high-priority unconfirmed information as low-priority unconfirmed information;
wherein a first display area for displaying the first indicative information indicating the high-priority unconfirmed information, a second display area for displaying the second indicative information indicating the short-cut function, and a third display area for displaying the third indicative information indicating the low-priority unconfirmed information are displayed simultaneously on the standby screen;

wherein indicative information corresponding to highest priority among indicative information currently displayed on the standby screen is focused thereby to display the first indicative information in the focused state when the first indicative information is displayed on the standby screen, to display the second indicative information in the focused state when the second indicative information is displayed on the standby screen in the absence of the first indicative information on the standby screen, and to display the third indicative information in the focused state when the third indicative information is displayed on the standby screen in the absence of both the first indicative information and the second indicative information on the standby screen.

5. The information processing apparatus according to claim 4, wherein the display unit makes a pop-up display of the first indicative information.

6. The information processing apparatus according to claim 5, comprising:
   a second determination unit configured to determine whether or not a second key is pressed, wherein, when the second determination unit determines that the second key is pressed, the display unit erases the pop-up display of the first indicative information.

7. The information processing apparatus according to claim 4, wherein the control unit is further configured to control activation of a predetermined function associated with the short-cut function indicated by the second indicative information.

8. The information processing apparatus according to claim 4, further comprising:
   a state determination unit configured to determine a state of the information processing apparatus,
   wherein, when the state determination unit determines that the state of the information processing apparatus is a predetermined state, the setting unit sets the priority of the high-priority unconfirmed information to be lower than the short-cut function so as to reassign the high-priority unconfirmed information as low-priority unconfirmed information, and
   wherein the display unit updates the display of the first indicative information and the third indicative information, based on the unconfirmed information report management information updated in accordance with the priority set by the setting unit set in accordance with a determination by the state determination unit.

9. The information processing apparatus according to claim 4, further comprising:
   a priority indication acceptance unit configured to accept a priority of new unconfirmed information to be lower than the short-cut function,
   wherein, when the priority indication acceptance unit accepts the indication of setting the priority of the new unconfirmed information to be lower than the short-cut function, the setting unit sets beforehand the priority of the new unconfirmed information to be lower than the short-cut function so as to assign the new unconfirmed information to be low-priority unconfirmed information.

10. The information processing apparatus according to claim 4, further comprising:
    an additional indication acceptance unit configured to accept an indication of adding a confirmed information to the unconfirmed information to be displayed on the standby screen as a low-priority unconfirmed information.

11. The information processing apparatus according to claim 10, wherein the confirmed information comprises a confirmed incoming call information,
    wherein the confirmed incoming call information indicates that an incoming call was answered by a user.

12. The information processing apparatus according to claim 10, wherein the confirmed information comprises a confirmed mail information, and wherein, the confirmed mail information indicates that a received mail has been read by a user.

* * * * *